United States Patent
Eliyahu et al.

(10) Patent No.: US 11,797,339 B2
(45) Date of Patent: Oct. 24, 2023

(54) SYSTEMS AND METHODS FOR MAINTAINING DATA OBJECTS TO MANAGE ASYNCHRONOUS WORKFLOWS

(71) Applicant: TONKEAN, INC., San Francisco, CA (US)

(72) Inventors: Sagi Eliyahu, San Francisco, CA (US); Offir Talmor, Tel Aviv (IL)

(73) Assignee: TONKEAN, INC., San Francisco, CA (US)

( * ) Notice: Subject to any disclaimer, the term of this patent is extended or adjusted under 35 U.S.C. 154(b) by 0 days.

(21) Appl. No.: 18/129,322

(22) Filed: Mar. 31, 2023

(65) Prior Publication Data

US 2023/0236880 A1    Jul. 27, 2023

Related U.S. Application Data

(63) Continuation of application No. PCT/US2021/053271, filed on Oct. 2, 2021.

(60) Provisional application No. 63/086,853, filed on Oct. 2, 2020, provisional application No. 63/086,841, filed on Oct. 2, 2020, provisional application No. 63/086,848, filed on Oct. 2, 2020, provisional application No. 63/086,856, filed on Oct. 2, 2020, provisional application No. 63/108,328, filed on Oct. 31, 2020, provisional application No. 63/108,330, filed on Oct. 31, 2020.

(51) Int. Cl.
G06F 9/48 (2006.01)
G06F 16/28 (2019.01)
G06F 16/21 (2019.01)
G06F 16/23 (2019.01)

(52) U.S. Cl.
CPC ......... *G06F 9/4881* (2013.01); *G06F 16/219* (2019.01); *G06F 16/2358* (2019.01); *G06F 16/288* (2019.01)

(58) Field of Classification Search
CPC .... G06F 9/4881; G06F 16/219; G06F 16/288; G06F 16/2358
See application file for complete search history.

(56) References Cited

U.S. PATENT DOCUMENTS

| | | | |
|---|---|---|---|
| 2014/0215474 A1* | 7/2014 | Dong | G06Q 10/103 718/102 |
| 2014/0282571 A1* | 9/2014 | Baldwin | G06F 9/4881 718/102 |
| 2016/0292374 A1* | 10/2016 | Hutchins | H04L 67/12 |

(Continued)

*Primary Examiner* — Wissam Rashid
(74) *Attorney, Agent, or Firm* — Foley & Lardner LLP

(57) ABSTRACT

Systems and methods for maintaining data objects include receiving an event in a queue indicating a change to a data source; obtaining data corresponding to the event from the data source; determining that a monitored item condition defined in a workflow is satisfied based on the data corresponding to the event; generating a data object responsive to the monitored item condition being satisfied; identifying, using a mapping between fields and triggers generated based on the workflow, a trigger defined in the workflow that uses a first field of one or more fields; determining that the value of the first field satisfies a trigger condition of the trigger; and performing, responsive to determining that the value satisfies the trigger condition, an action corresponding to the trigger defined in the workflow.

20 Claims, 20 Drawing Sheets

(56) References Cited

U.S. PATENT DOCUMENTS

2023/0176928 A1\* 6/2023 John .................... G06F 9/5016
              712/220

\* cited by examiner

| | | 706(1) | 706(2) | 706(3) | 706(4) | 706(5) | 706(6) | 706(7) |
|---|---|---|---|---|---|---|---|---|
| | | Due Date | Status | Owner | NPS Score | NPS Comments | Contact Email | Is Product I... |
| 702(1) | EBAY | | | | | | | |
| 704(A) | • Follow up with Bob | 🗓 | Assign to product | Sagi Elyahu / Next ping 5d | 3 | i have so many bugs... | ron.burgundy.tonkea... | Yes |
| 704(B) | • Discuss upgrade options | 🗓 | Not Started | Rory O'Brien / Next ping 6d | | | ron.burgundy.tonkea... | |
| 702(2) | Google | 🗓 | In Progress | Rory O'Brien / Next ping 6d | 7 | i don't think its very g... | ron.burgundy.tonkea... | No |
| 702(3) | Adobe | 🗓 | Has comments | Ben Shipley / Next ping Today | 7 | Bad | ron.burgundy.tonkea... | No |
| 702(4) | Salesforce | 🗓 | Has comments | Ben Shipley / Next ping Today | 1 | really bad bugs | ron.burgundy.tonkea... | Yes |

FIG. 7

SYSTEMS AND METHODS FOR MAINTAINING DATA OBJECTS TO MANAGE ASYNCHRONOUS WORKFLOWS

CROSS-REFERENCE TO RELATED PATENT APPLICATIONS

This application is a bypass continuation application of P.C.T. Application No. PCT/US2021/053271, filed Oct. 2, 2021, which claims the benefit of and priority to U.S. Provisional Patent Appl. No. 63/086,841, filed Oct. 2, 2020, U.S. Provisional Patent Appl. No. 63/086,848, filed Oct. 2, 2020, U.S. Provisional Patent Appl. No. 63/086,853, filed Oct. 2, 2020, U.S. Provisional Patent Appl. No. 63/086,856, filed Oct. 2, 2020, U.S. Provisional Patent Appl. No. 63/108,328, filed Oct. 31, 2020, and U.S. Provisional Patent Appl. No. 63/108,330, filed Oct. 31, 2020, the content of each of the aforementioned applications are incorporated herein by reference in their entirety.

BACKGROUND

Various systems and methods are provided to facilitate coding of software for performing various computing functions. Typically, any coding of software requires fundamental knowledge of one or more coding language, syntax, and other formatting. Even with the sufficient knowledge, troubleshooting code can be difficult.

SUMMARY

One embodiment relates to a method. The method may include receiving, by one or more processors, from a data source, an event in a queue indicating a change to the data source; obtaining, by the one or more processors, from the data source, data corresponding to the event; determining, by the one or more processors, that a monitored item condition defined in a workflow is satisfied based on the data corresponding to the event; generating, by the one or more processors, a data object responsive to the monitored item condition being satisfied, the data object including one or more fields defined in the workflow and one or more corresponding values that are obtained from the data corresponding to the event; identifying, by the one or more processors, using a mapping between fields and triggers generated based on the workflow, a trigger defined in the workflow that uses a first field of the one or more fields; determining, by the one or more processors, that the value of the first field satisfies a trigger condition of the trigger; and performing, by the one or more processors, responsive to determining that the value satisfies the trigger condition, an action corresponding to the trigger defined in the workflow.

BRIEF DESCRIPTION OF THE DRAWINGS

FIG. 7 is an example report corresponding to one or more executables, according to an illustrative embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments below, the following descriptions of the sections of the specification and their respective contents may be helpful:

Section 1 describes a workflow management system leveraging stateful and contextual data;

Section 2 describes a visual programming interface for configuring a workflow to automatically track and complete processes;

Section 3 describes a run-time implementation of an executable generated via the workflow management system;

Section 4 describes the architecture for the workflow management system for run-time implementation of an executable;

Section 5 describes stateful data objects generated and maintained by the executable for automatically track and complete processes;

Section 6 describes data objects;

Section 7 describes generating and managing reports;

Section 8 describes methods for generating a workflow and maintaining a stateful data object;

Section 9 describes automated check-in messages based on historical activity data;

Section 10 describes improved matching between external entity items and monitored items based on updates;

Section 11 describes updating an entity relationship data structure based on relationships between monitored items and entities;

Section 12 describes actions triggered by formula-based conditions; and

Section 13 describes an example computer system which may be useful for practicing embodiments described herein.

Section 1. Workflow Management System Leveraging Stateful and Contextual Data

Figure 1A:
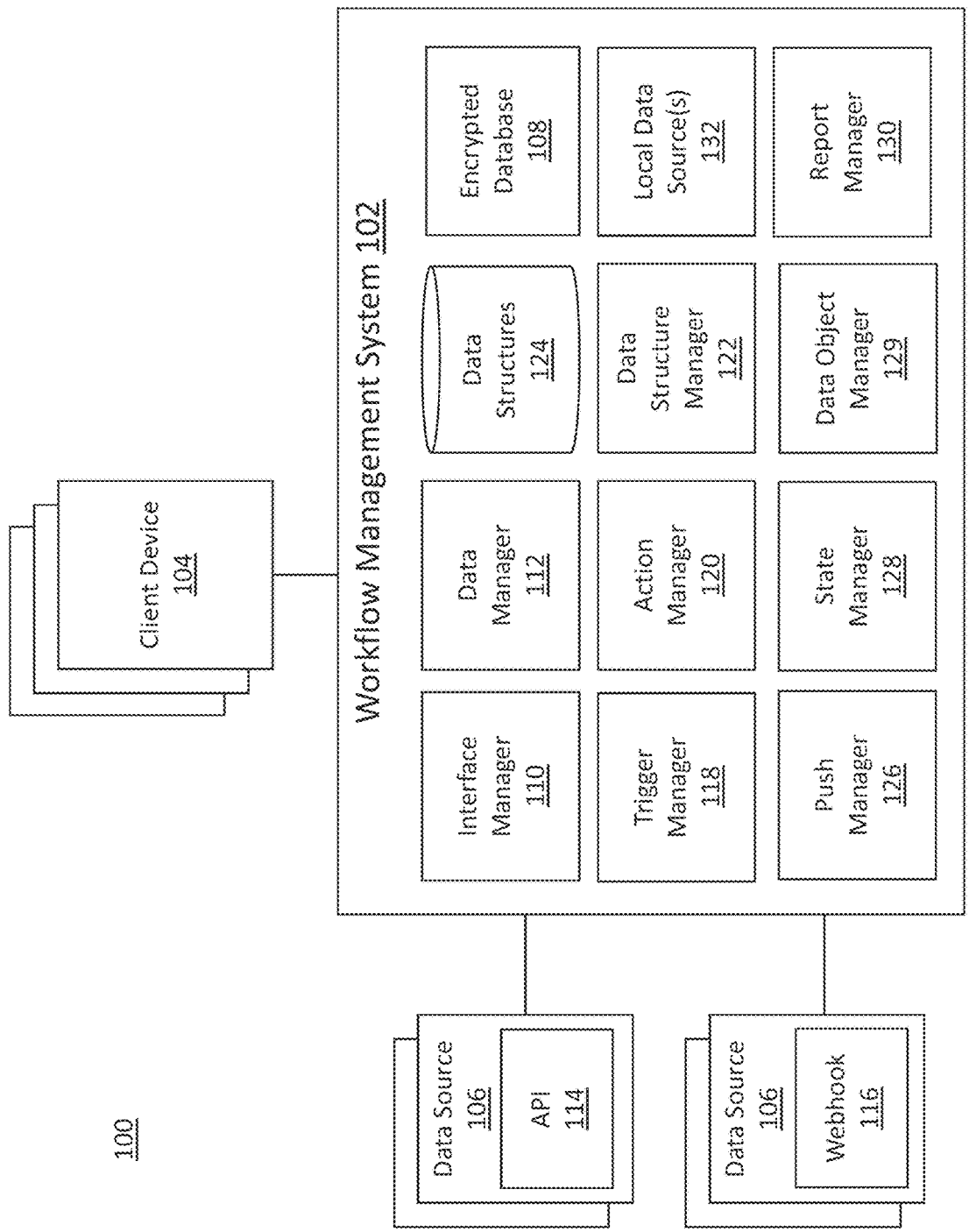
FIGS. 1A-1B are block diagrams of an environment for workflow management, according to an illustrative embodiment.
Figure 1B:
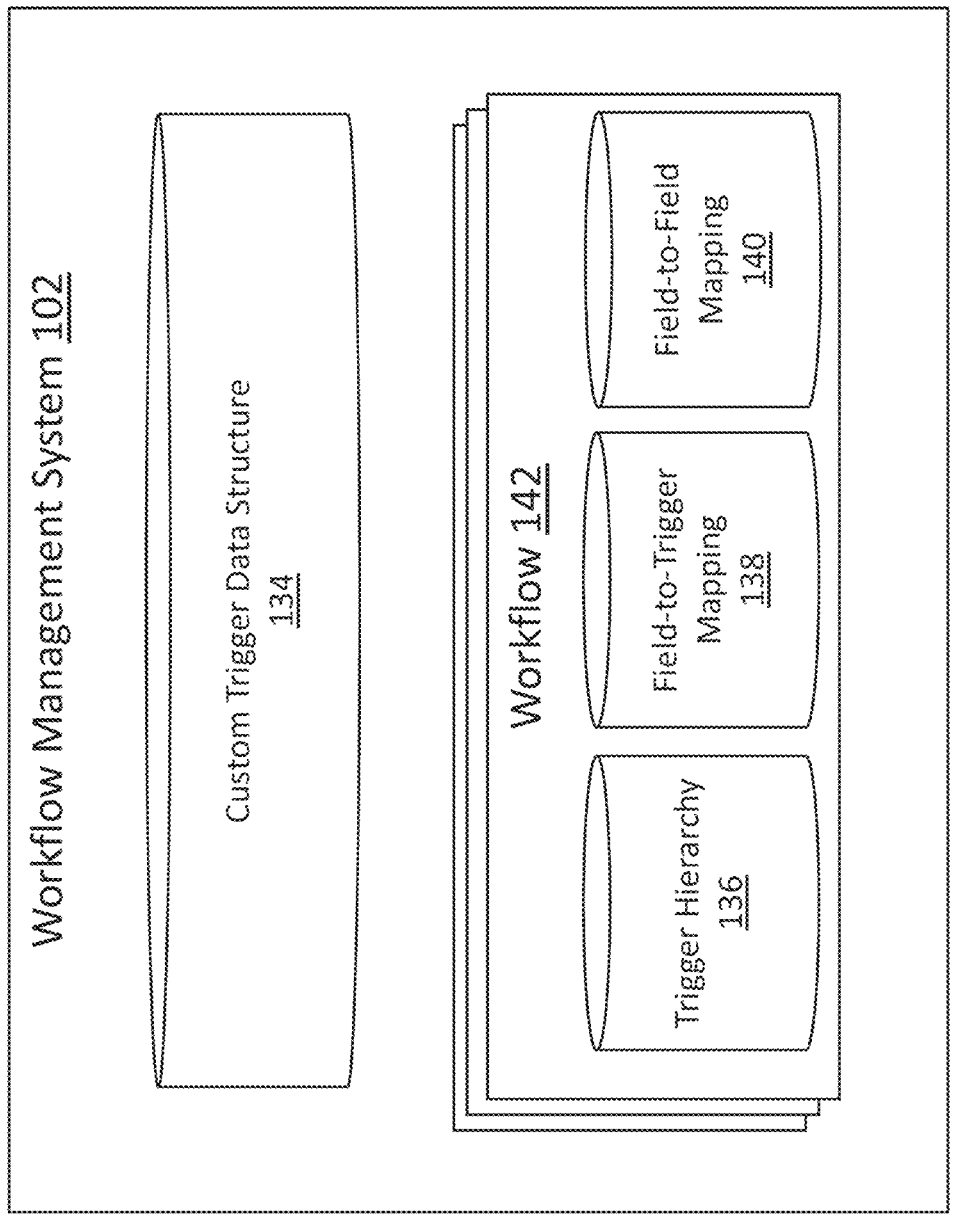

Referring to FIGS. 1A-1B (FIG. 1), depicted is an environment 100 for workflow management, according to an illustrative embodiment. The environment 100 is shown to include a workflow management system 102 communicably coupled to a plurality of client devices 104, a plurality of data sources 106, and an encrypted database 108. Each of the devices and components shown in FIG. 1 may be implemented using or including one or more of the components shown in FIG. 19 and described herein.

The workflow management system 102 may be communicably coupled to the client device 104. The workflow management system 102 may be communicably coupled to the client device 104 via a series of network connections (e.g., LAN, WAN, or the Internet through a variety of wired and/or wireless or cellular connections. The client device 104 may be configured to enroll with the workflow management system 102 for generating various executables, which may be enterprise-specific, as described in greater detail below.

The workflow management system 102 may include a plurality of managers. Each of the managers may be various combinations of hardware and/or software which are configured to perform various aspects of the systems and methods described herein. For example, each of the managers may include one or more of the components shown in FIG. 19. While the managers are described as performing specific steps of a workflow, it is noted that, in some embodiments, one manager may cause another manager or device to perform a specific step or function of the workflow. Accordingly, the present disclosure is not limited to the particular managers performing their respective steps. Additionally, some managers may be grouped with other managers to perform a group of steps.

Figure 2:
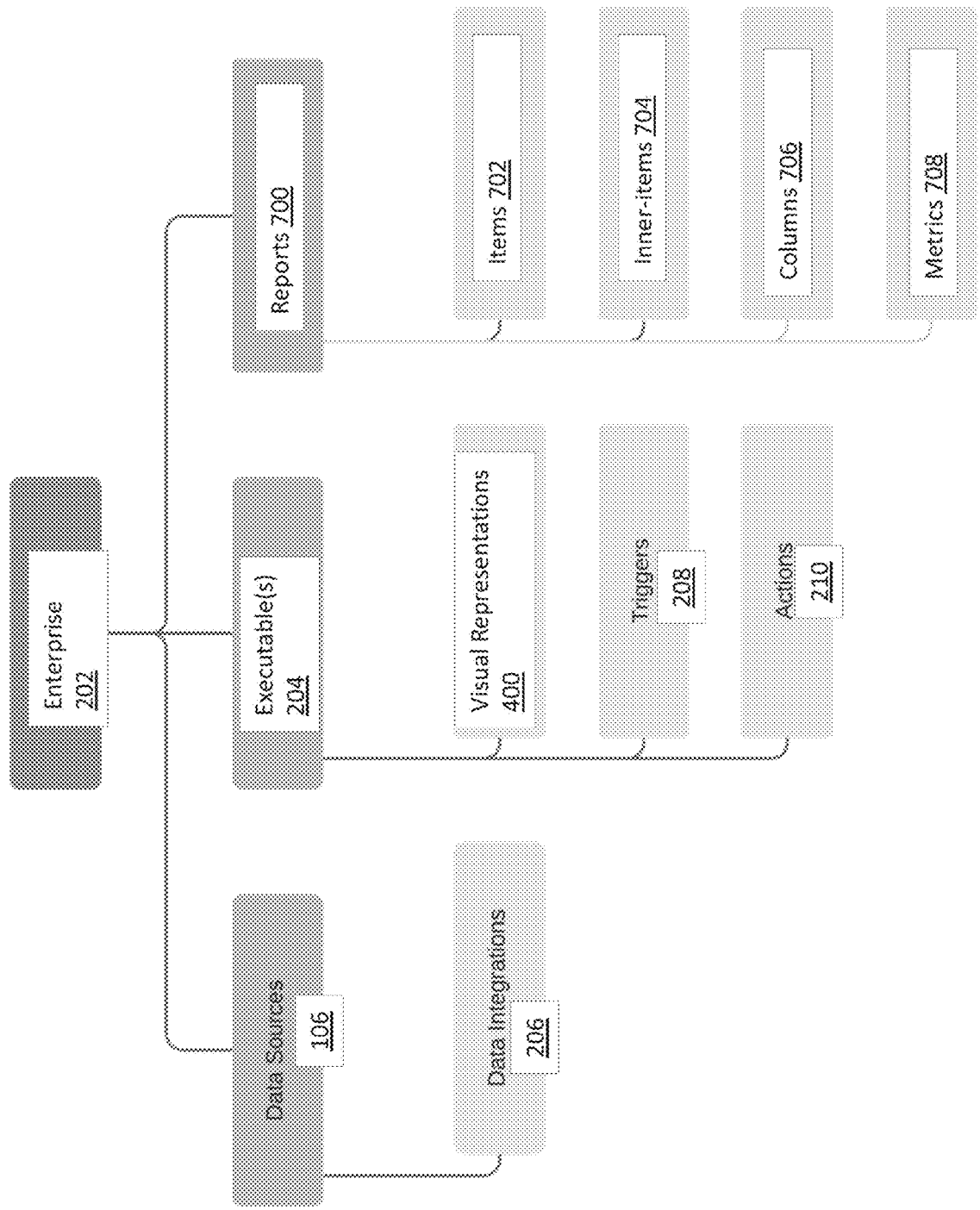
FIG. 2 is a graphical representation of components corresponding to an entity which is managed by a workflow management system of the environment of FIG. 1, according to an illustrative embodiment.

Referring briefly to FIG. 2, depicted is a graphical representation 200 the components corresponding to an entity 202 (such as an organization, company, or other enterprise) which is managed by the workflow management system 102, according to an illustrative embodiment. Each enterprise 202 may generate, formulate, or otherwise establish one or more executables 204 using data from various data source(s) 106. As shown in FIG. 1 and FIG. 2, the client device 104 may select a plurality of data sources 106 for which to integrate or interface with the workflow management system 102. The interface manager 110 may be any device, component, script, computer-code, or combination of software and/or hardware configured to provide an interface for configuring a workflow used to generate an executable. The workflow management system 102 may include a data manager 112. The data manager 112 may be configured to establish a connection for integrating or interfacing with a particular data source 106 using one or more data integrations 206, in accordance with a selection from the client device 104. The workflow management system 102 may include interface manager 110.

The workflow management system 102 may include a trigger manager 118 and an action manager 120. The trigger manager 118 and action manager 120 may be any device, component, script, computer-code, or combination of software and/or hardware configured to provide and manage triggers and actions corresponding to an executable. Once each of the triggers and actions corresponding to a workflow are selected and/or configured (e.g., by an administrator or other user), the workflow may be compiled. For example, the workflow management system 102 may include an data structure manager 122. The data structure manager 122 may be any device, component, script, computer-code, or combination of software and/or hardware configured to generate, build, assemble, or otherwise populate data structures for defining or otherwise configuring an executable, based on a workflow configured using the client device 104, as described in greater detail below. In this regard, the interface manager 110, trigger manager 118, action manager 120, and data structure manager 122 may operate together to configure a workflow used to generate an executable.

As described in greater detail below, the interface manager 110 may be configured to provide an interface for generating a workflow which forms the basis of an executable. A user may provide various inputs to the user interface provided by the interface manager 110 for generating or establishing a connection with a data source 106, and building a workflow using various triggers and actions (e.g., provided by the trigger manager 118 and action manager 120), which corresponds to data or items from the data source 106. As the user configures or otherwise builds the workflow, the data structure manager 122 may be configured to generate and or update different data structures from which information may be pulled to determine whether triggers of the workflow are satisfied and/or whether to perform actions identified in the workflow.

Section A. Data Sources and Data Integrations

The interface manager 110 may be configured to provide an interface for facilitating or establishing a connection with one or more data sources 106 using one or more data integrations 206. The interface manager 110 may be configured to receive various inputs from an administrator or user for facilitating or establishing a connection with the data source(s) 106. In some embodiments, the workflow management system 102 may include a data manager 112. The data manager 112 may be any device, component, script, computer-code, or combination of software and/or hardware configured to establish, form, generate, or otherwise manage one or more connections to one or more data sources 106. The interface manager 110 may be configured to receive inputs for the data manager 112 to establish connections with one or more data sources 106. For example, the data manager 112 may be configured to establish a connection with a particular data source 106 based on authentication credentials provided by a user of the client device 104. The authentication credentials may correspond to a service account that is shared by multiple users or by an account specific to the user. The data manager 112 may be configured to establish a connection with a particular data source using an application program interface (API) 114. The data manager 112 may be configured to establish a connection with a particular data source using a webhook 116. In some embodiments, data sources 106 may be or include inbound data sources 106 (e.g., data sources 106 which provide data to the workflow management system 102) and/or outbound data sources 106 (e.g., data sources 106 which receives data from the workflow management system 102). In these embodiments, the interface manager 110 may be configured to receive inputs from a user to provide to the data manager 112 such that the data manager 112 establishes the connection with the data source 106.

In some embodiments, the interface manager 112 may be configured to provide a search interface for performing a search for a particular data source 106 for which to establish a connection. The workflow management system 102 may support connections with plurality of data sources 106, which may be searched using the search interface provided by the interface manager 112. As an example, the workflow management system 102 may support connections with ASANA, SALESFORCE, SLACK, OKATA, TABLEAU, GREENHOUSE, GOOGLE SHEETS, GOOGLE DRIVE, GITHUB, BITBUCKET, TEAMWORK, GITLAB, WUNDERLIST, WRIKE, BASECAMP, MONDAY, KANBANIZE, HARVEST, ZUORA, NAMELY, SQL, GOOGLE ANALYTICS, and so forth. In some embodiments, as additional data sources 106 are added to a support list, the workflow management system 102 may be configured to update the search interface to facilitate establishing a connection with the additional data sources 106.

The data manager 112 may be configured to support establishing a connection to a particular data source 106 through authentication. In other words, the data manager 112 may include or otherwise support an authentication layer between the workflow management system 102 and a data source 106. In some embodiments, the data manager 112 may support an administrator authentication layer such that any updates to the data source 106 are "performed" by "ADMIN." This may be effectuated by using a service account assigned to the enterprise for the data source. In some embodiments, the data manager 112 may support a user authentication layer (or "OAuth"), such that any updates to the data source 106 are performed by a particular user. For example, once a particular data source 106 is selected via the client device 104, the interface manager 110 may be configured to redirect the client device 104 to an authentication page corresponding to the data source 106. A user operating the client device 104 may provide login credentials (e.g., a username and password, for example) for authenticating the user. Once the user authenticates themselves at the authentication page, the data manager 112 may be configured to automatically sync with the data source 106 in which the user was authenticated, thus establishing a connection with the particular data source 106.

The data manager 112 may be configured to support establishing a connection to a particular data source 106 through an API key or token. For example, the data manager 112 may be configured to establish a connection with a particular data source 106 using an API 114 for the data source 106. A user corresponding to the client device 104 may navigate to a page corresponding to the data source 106 for obtaining a particular API key corresponding to the data source 106. The user may provide the API key corresponding to the data source 106 to an API input field on an interface provided by the interface manager 110. Once the API key is provided to the API input field, the data manager 112 may establish a connection with the corresponding data source 106 using the API key.

The data manager 112 may be configured to support establishing a connection to a particular data source 106 using a webhook 116. The webhook 116 may be or include inbound webhooks which facilitate data from the data source 106 being sent to the workflow management system 102. The webhook 116 may be or include outgoing webhooks which facilitate data from the workflow management system 102 being sent to the data source 106. The data manager 112 may facilitate establishing an inbound webhook 116 to a particular data source 106. The interface manager 110 may be configured to receive an endpoint uniform resource locator (URL) which corresponds to a particular data source 106 for which to establish an inbound webhook 116. Once the interface manager 112 receives the endpoint URL for the data source 106, the interface manager 110 may be configured to prompt the user to configure the data source 106 for sending data to the workflow management system 102. The user of the client device 104 may navigate to a page corresponding to the data source 106 for defining or selecting which data of the data source 106 is to be sent to the workflow management system 102. The user may provide a URL corresponding to the workflow management system 102 to a callback URL field at a webhook setup page for the data source 106. The user may then select various combinations of data which is to be sent from the data source 106 to the workflow management system 102, and complete setup. Once setup is complete at the data source 106 side, the user of the client device 104 may return to the setup page provided by the interface manager 110 to complete the setup at the client device 104 side, to map or define the data which is received from the data source 106. The setup page may provide various fields for receiving a display name for the data source 106, an identification field (e.g., a unique identifier which is used by the data source 106 for the data that is sent to the workflow management system 102), and a title field (e.g., a label for the data which is received by the workflow management system 102). A user may thus provide a label for the data, which is received from the data source 106, which may be used for defining triggers, actions, creating various reports, etc., as described in greater detail below.

Where a particular data source 106 is not included in the search interface, the user may establish a new custom data source 106. The workflow management system 102 may be configured to support various options for custom data sources 106. For example, the workflow management system 102 may support a manual data source (by including custom fields and editable values). The workflow management system 102 may support uploaded data files (e.g., spreadsheets, CSVs, etc.). The workflow management system 102 may support webhooks, as described above. Where the custom data source 106 is a manual data source, the interface manager 112 may be configured to provide a series of interfaces for labeling the data source 106 and building out a custom data set (e.g., by adding manual items, adding custom fields, adding corresponding values, etc. to populate a custom data set). Where a custom data source 106 corresponds to an uploaded data file, the interface manager 112 may be configured to provide a series of interfaces for uploading the data file (e.g., a CSV) and identifying (and labeling) each of the rows in the data file. In these and other embodiments, the interface manager 112 may be configured to facilitate generation of a data source 106 which is maintained by the workflow management system 102.

In some embodiments, some data sources 106 may have data access limits. For example, a data source 106 may have a limit on API calls which may be made by the workflow management system 102, or other types of data access limits. However, for the systems and methods described herein to execute workflows (e.g., protocols of respective workflows) as set forth herein, the workflow management system 102 may leverage persistent (or continuous) connections between the workflow management system 102 and the data source 106, while still being within the data access limits of the particular data source 106. According to the systems and methods of the present solution, to not exceed the data access limits, the workflow management system 102 may maintain one or more local data sources 132. The local data source 132 may be or include a shadow data source 106 which includes or maintains mirrored (or copied) data from the data source 106. For example, when a particular data source 106 is enrolled with the workflow management system 102, the workflow management system 102 may request or otherwise access a first copy of a portion of the data (such as data for particular monitored items as described below). The workflow management system 102 may maintain, include, incorporate, or otherwise store the portion of the data in the local data source 132. In some embodiments, the workflow management system 102 may request additional data related to the monitored item, which may be used in other steps of a workflow. The workflow management system 102 may store this data in the local data source 132 such that the data is readily accessible by the workflow management system 102, without having to request it and risk exceeding the data access limits for the particular data source 106. As data for the data source 106 is updated, added, deleted, etc., the data source 106 may push the updated data to a queue for the workflow management system 102 (i.e., via the API 114 and/or webhook 116). The workflow management system 102 may synchronize the data from the queue with the local data source 132, thereby ensuring that the local data source 132 includes "fresh" data.

In addition to restrictions relating to data access limits that for example, may be imposed by the data source, there are other technical challenges that the workflow management system 102 can face by not maintaining a local copy of the data. First, the workflow management system would need to either maintain a live connection or otherwise be able to readily access and retrieve data from the data source when the workflow management system needs the data. This may conflict with the data source's ability to be available, for instance, if the data source is down for maintenance or due to unexpected circumstances. Second, by maintaining a local copy, the workflow management system can easily link or reference the data in the local copy in other data structures or data operations without the risk of the data source modifying certain settings or API call formats that could create errors or disrupt the execution of the data operations using the data to be accessed. Third, the local copy allows for data retention of historical versions of the data stored in the data source. If no local copy was created or retained, values that are replaced with newer values in an item at the data source would be lost and not readily (if at all) accessible to the workflow management system. Fourth, the workflow management system can include workflows that include formula based triggers. These formula based triggers may involve multiple values from different data sources, and some of these values may need to be computed periodically or based on certain time based conditions. Specially in such situations, by maintaining a local copy of the various data sources, the workflow management system can readily access all of the data it needs to perform various computations for the values that are used in the formulas without having to deal with authentication issues or signing into various third-party data sources or data availability issues due to network related restrictions or data source restrictions/downtimes.

Section B. Monitored Items

Figure 3:
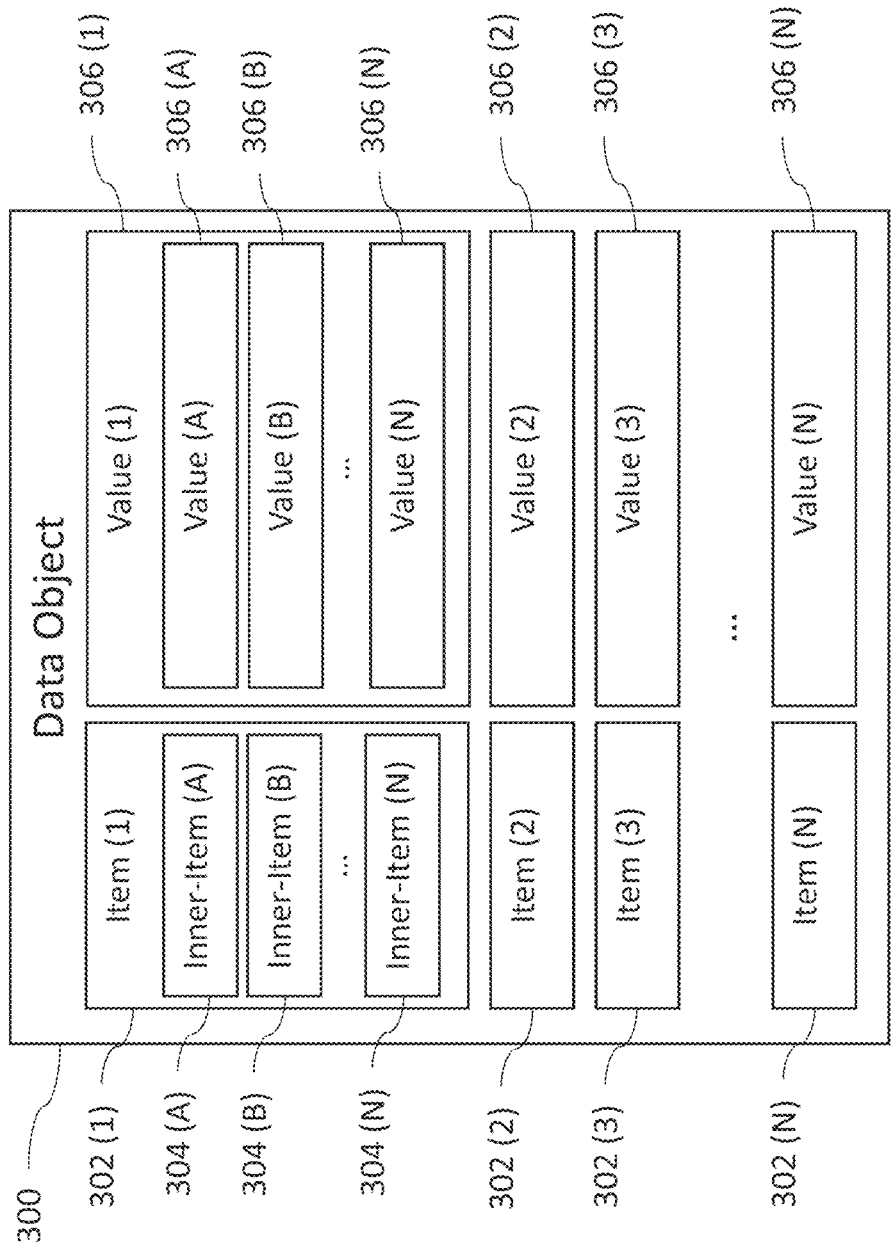
FIG. 3 is an example data object corresponding to a data source of the environment of FIG. 1, according to an illustrative embodiment.

Referring now to FIG. 3, depicted is an example data object 300 corresponding to a data source 106. As shown in FIG. 3, the data object 300 may include a plurality of items 302 and inner-items 304. Each of the items 302 and inner-items 304 may have a corresponding value 306. Some values 306 may be or include a status (e.g., completed, in-progress, not yet started, etc.), a numerical value, an empty value, etc. The items 302 may be or include data which is unique to a particular item. An item 302 may be or include a particular data type from a data source 106. For example, an item 302 may be a main (or root) item of data received from a data source 106, such a spreadsheet, account information within SALESFORCE, or any other item from Zendesk, Hubspot, Intercom, or an email service, etc. In some embodiments, the items 302 may be or include fields. For example, an item 302 may include a particular field or set of fields from a spreadsheet (such as particular rows within a spreadsheet), a particular field or set of fields corresponding to a record object from SALESFORCE, or other field(s) from account information from Zendesk, Hubspot, Intercom, etc. In some embodiments, the items may be emails or certain fields that are included in emails or generated from emails.

Inner-items 304 may reside within or correspond to a respective item (e.g., sub-tasks within a particular item). Inner-items 304 may be or include sub-tasks or sub-items which together form the main (or root) item. As an example, where the root item 302(1) is a new record object corresponding to a new account being opened within SALESFORCE, inner-items 304 (A)-304 (N) for the root item 302(1) may include each of the steps under the new account open (e.g., create account number, sign an agreement, receive payment, etc.). In some embodiments, and according to various implementations, inner-items 304 may be processed in a manner similar to root items, while in other implementations, inner-items 304 may not necessarily be monitored or processed. For example, inner-items 304 may be selectively processed according to settings for a particular trigger 208, as described in greater detail below. In some embodiments, inner-items 304 may be manually or automatically created for a particular item 302 (e.g., by generating default inner-items 304 for each item, such as where there is a standard operating procedure for a particular item).

As noted above, where a user generates a connection with a particular data source 106, the user may specify the data which is shared, received, or otherwise accessible to the workflow management system 102. In this regard, rather than accessing each of the items 302 and inner-items 304 from a particular data source 106 (such as all record objects from SALESFORCE), the data manager 112 may establish a connection to the data source 106 such that the data manager 112 receives any new data, information, inputs, or other updates to a subset of items 302 and inner-items 304 specified when establishing the connection. In the example shown in FIG. 3, when establishing a connection with the data source 106 corresponding to the data object 300, an administrator may set up monitors for the first item 302(1) (including inner-items 304(A) and 304(N)), and third item 302(3). As such, the workflow management system 102 may only monitor (or otherwise have access to) data from the specified monitored items and inner items (rather than each of the items and inner items from the data object 300). When a new event is detected in a queue that satisfies the monitored item condition defined by the administrartor (e.g., as part of configuring which items are to be monitored), the workflow management system 102 may be configured to generate a data object for the monitored item as described in greater detail below in Section 6. Providing an administrator control over which items of the data source 106 to receive or otherwise have access to can increase the security of the data source and control the amount of data that the workflow management system ingests from the data source, thereby reducing the amount of memory and other computational resources consumed by the workflow management system 102. In addition, the administrator can further control how the workflow management system 102 maintains the data received from the data source, in particular, how long the data is stored in the local data store of the workflow management system 102, which entities within the enterprise may have access to it, and how frequently the data is to be refreshed or synced with the data source from which it was received.

The data manager 112 may be configured to generate an identifier for each data source 106 and/or monitored item 302 (or monitored inner-item 304) of the data source 106 of a given workflow. For example, when a particular event corresponding to a data source 106 is identified in a queue (e.g., by a populator or data manager 112), the data manager 112 may determine whether the event satisfied a monitored item condition for a given workflow. Where the event matches a monitored item condition, the data manager 112 may generate, build, or otherwise construct a data object as described in greater detail below. Additionally, because data sources 106 and monitored item conditions are defined for several workflows, a given event may satisfy several monitored item conditions for several workflows. As such, the data manager 112 may be configured to generate any number of data objects depending on the monitored item conditions for respective workflows, and each of the data objects may be specific to a workflow. The data manager 112 may assign an object identifier to the data object.

In some embodiments, the interface manager 110 may be configured to provide one or more interfaces for matching fields corresponding to one or more data sources 106. In some embodiments, two (or more) data sources 106 may store similar data. For example, a data source 106 corresponding to SALESFORCE may store data corresponding to an email address of a particular entity, and a data source 106 corresponding to an email exchange server may similarly store data corresponding to email addresses and contacts. The interface manager 110 may be configured to provide one or more interfaces for matching, associating, or otherwise corresponding two or more fields from a plurality of monitored items. Once the inputs for field matching are received, the data manager 112 may be configured to store an association between the monitored fields in one or more data structures (e.g., field-to-field mapping data structure). As such, where either monitored item of the associated items are updated, the data manager 112 may process the update seamlessly based on the association between the monitored item. Continuing the example above, where the email exchange server provides a new entry for an email address for an entity, but the email address is not included in SALESFORCE for the same entity, the data manager 112 may consider the email address for the entity according to the new entry from the email exchange. Such embodiments provide enriched root monitored items by providing linking to additional items which may include similar data for updating the root monitored item.

As described in greater detail below in Section 6, the data manager 112 and/or other components of the workflow management system 102 may be configured to store received data from the data sources 106 in one or more databases. For example, the data manager 112 may be configured to store the data in the encrypted database 108. While shown as being external to the workflow management system 102, in some embodiments, the encrypted database 108 may be a component of the workflow management system 102. The data manager 112 may be configured to receive the data from the data sources 106 via the connections established via the inputs received from the interface manager 110. The data manager 112 may be configured to encrypt the data, and store the data in the encrypted database 108. Such embodiments may maintain the integrity of data from the data sources 106.

The interface manager 110 may be configured to provide an interface for generating an workflow using monitored data (e.g., items and inner-items) from the data sources 106 in which the data manager 112 establishes a connection.

Section C. Triggers

The trigger manager 118 may be any device, component, script, computer-code, or combination of software and/or hardware configured to generate and manage triggers 208 corresponding to a workflow. Trigger, as used herein, refers to an occurrence, change, update, or other condition corresponding to a particular monitored item (or inner-item) which causes one or more actions to occur. In some embodiments, the trigger manager 118 may be configured to generate and manage a plurality of triggers 208 corresponding to a particular item or inner-item. Additionally, the trigger manager 118 may be configured to generate and manage a plurality of triggers 208 corresponding to a plurality of data sources 106 (including monitored items and inner-items of the data source(s) 106). In this regard, any condition which occurs from a particular item or inner-item may cause one or more triggers 208 to be satisfied.

The trigger manager 118 may be configured to provide various triggers 208 for defining a workflow. For example, the interface manager 110 may be configured to provide a user interface for generating a trigger 208 (e.g., which is generated, managed, or otherwise provided by the trigger manager 118) from items of a data source 106. Triggers 208, as used herein, refer to a particular occurrence or result which causes an action 210 to be performed. The trigger manager 118 may be configured to provide a plurality of trigger 208 types. For example, the trigger manager 118 may be configured to provide a matched conditions trigger 208, a field changed trigger 208, an item added trigger 208, a form filled trigger 208, and an on scheduled trigger 208. Each of these triggers 208 are described in greater detail below.

In some embodiments, the trigger manager 118 may be configured to provide a matched conditions trigger 208. The matched conditions trigger 208 may function as (or according to) an "IF" statement. The matched conditions trigger 208 may be configured to operate or execute on new and existing items in a dataset from a particular data source 106.

The matched conditions trigger 208 may be configured with a selectable run once setting such that, when a run once setting is selected, the matched conditions trigger 208 executes once on each individual data item from a particular dataset of a data source 106. Such a configuration may be advantageous where particular data may not need a particular action 210 to be performed again, regardless of whether the data item subsequently changes. Where the run once setting is not selected, the matched conditions trigger 208 may execute each time a data item matches the particular condition. In some embodiments, the matched conditions trigger 208 may be configured with a selectable run on action items setting such that, when the run on action items setting is selected, the matched conditions trigger 208 executes on each root data item and inner item (as described in greater detail below). Where the run on action items setting is not selected, the matched conditions trigger 208 may execute on root items (as opposed to root items and inner items).

The matched conditions trigger 208 may be defined according to one or more IF statements in relation to a particular condition. In some embodiments, the matched conditions trigger 208 may have a setting for selecting a qualification for the IF statements. For example, the matched conditions trigger 208 may be defined by an IF statement whereby if any of the conditions are met, the matched condition trigger 208 is satisfied. As another example, the matched conditions trigger 208 may be defined by an IF statement whereby if each of the conditions are met, the matched condition trigger 208 is satisfied. A user may select a setting for a particular qualification to define the matched condition trigger 208 according to occurrence of each particular condition(s) or occurrence of one or more of a set of particular condition(s).

The trigger manager 118 may be configured to receive a definition for the matched condition trigger 208 (e.g., based on inputs provided by a user via the client device 104 to the interface manager 110). The definition may be or form the basis of the matched condition trigger 208. The definition may include master fields, a condition, and/or a qualifying value. The master field may be a particular data item for which the matched condition trigger 208 is compared against. The master field may be a default field for the workflow management system 102, a field from a particular data source 106 (e.g., SALESFORCE Opportunity Stage, Zendesk Tag Name, etc.), a field from a particular form which is stored in or maintained by the workflow management system, and/or any custom field from a custom data source, as described above. In some embodiments, the interface manager 110 may be configured to provide an interface element for searching for available fields (e.g., fields which have been defined for particular data sources 106, fields for data maintained by the workflow management system 102, etc.). The condition may specify the particular occurrence for the master field which triggers the matched condition trigger 208, and may include various options (e.g., equal to, not equal to, is not empty, contains, etc.). The qualifying value may be used depending on the particular condition and/or master field type. For example, where the field type of the master field corresponds to free text, a date field, a drop-down item, a checkbox, currency, etc., the qualifying value may have a corresponding format or option. The qualifying value may include a predefined value with a limited set of options (e.g., a date, one of the drop-down items, a checkbox option, etc.), or may include a free-text field. The trigger manager 118 may be configured to generate the matched condition trigger 208 (e.g., in the trigger data structure) using the specified definition, including the master field, the condition, and/or the qualifying value received via the interface manager 110 from the client device 104.

In some embodiments, the trigger manager 118 may be configured to provide a field changed trigger 208. The field changed trigger 208 may be a trigger which is satisfied based on a field in any data source 106 or data maintained by the workflow management system 102. For example, the field changed trigger 208 may be satisfied when any defined field has a change from a previous value or state. In some embodiments, the field changed trigger 208 may be satisfied when an item changes from a data source 106 and/or when an inner-item changes from the data source 106. The interface manager 110 may be configured to provide an interface for receiving one or more predefined inputs for which the trigger manager 118 is to generate the field changed trigger 208. The interface manager 110 may be configured to receive each of the fields which are to be monitored (similar to the master field described above). The field changed trigger 208 may include nested IF conditions. In some implementations, the field changed trigger 208 may cause the trigger manager 118 (or one or more other components/elements of the workflow management system 102) to monitor changes to particular field where the field meets a particular condition. In this regard, the field changed trigger 208 may, in some implementations, further include one or more additional conditions similar to the matched condition trigger 208, as described above. For example, the field changed trigger 208 may include a condition which may be satisfied based on a value of the particular field which changed, or a value from a different field from the same item (or a different item). Once each of the inputs for the field changed trigger 208 is received via the interface manager 110, the trigger manager 118 may be configured to generate the field changed trigger 208 using the inputs provided by the user.

In some embodiments, the trigger manager 118 may be configured to provide an item added trigger 208. The item added trigger 208 may be a trigger which is satisfied when a new data item is received by the workflow management system 102 (e.g., either being received from a data source 106, a particular form, manually entered in a live report, etc.). The item added trigger 208 may therefore be satisfied whenever an item (or inner-item, if selected) is received by the workflow management system 102. Once each of the inputs for the item added trigger 208 is received via the interface manager 110, the trigger manager 118 may be configured to generate the item added trigger 208 using the inputs provided by the user.

In some embodiments, the trigger manager 118 may be configured to provide a form filled trigger 208. The form filled trigger 208 may be a trigger which is satisfied where a form generated and maintained by the workflow management system 102 is completed. In some embodiments, the interface manager 110 may be configured to generate one or more interfaces for generating, establishing, or otherwise providing a form (including various fields which are to be completed by users or persons) which is stored at or by the workflow management system 102. In some embodiments, the form filled trigger 208 may include various conditions (similar to the matched conditions trigger 208 described above) which cause the form filled trigger 208 to be satisfied. For example, once a particular form is selected for a particular form filled trigger 208 via the interface manager 110, the interface manager 110 may be configured to provide an option for defining a condition in which a particular set of actions are performed (e.g., depending on particular responses or inputs to various fields of the selected form). Once each of the inputs for the form filled trigger 208 is received via the interface manager 110, the trigger manager 118 may be configured to generate the form filled trigger 208 using the inputs provided by the user.

In some embodiments, the trigger manager 118 may be configured to provide an on schedule trigger 208. The on schedule trigger 208 may be a trigger which is scheduled according to a particular schedule (e.g., every N minutes, every N hours, daily, weekly, monthly, quarterly, etc.), or on a particular date or at a particular time. In some embodiments, the on schedule trigger 208 may include an option for defining a condition in which the on schedule trigger 208 is to be satisfied (e.g., similar to the matched conditions trigger 208 defined above). Once each of the inputs for the on schedule trigger 208 is received via the interface manager 110, the trigger manager 118 may be configured to generate the on schedule trigger 208 using the inputs provided by the user.

In some embodiments, the trigger manager 118 may be configured to provide a wait trigger 208. The wait trigger 208 may be a trigger which maintains a position or state of the workflow until the wait trigger 208 is satisfied. In some embodiments, each of the above-mentioned triggers 208 may be configured as a wait trigger 208 (for example, the matched conditions trigger 208 may be a wait matched conditions trigger 208, the form filled trigger 208 may be a wait form filled trigger 208, and so forth). The interface manager 110 may be configured to provide an interface element for configuring each of the triggers 208 as a wait trigger 208. When a particular trigger 208 is configured as a wait trigger 208, the trigger manager 118 may function with the state manager 128 to maintain the position or state of the workflow until the wait trigger 208 is satisfied.

Once the input for generating the trigger 208 are received via the interface manager 110 from an administrator or other user, the trigger manager 118 may be configured to build, construct, or otherwise generate the trigger 208 using the received inputs. In some embodiments, the trigger manager 118 may be configured to generate an unique trigger identifier for each trigger 208. The trigger manager 118 may be configured to generate the trigger 208 (e.g., as a new item or entry in a trigger data structure), and link or otherwise associate the trigger to the particular data source 106 which is associated with the condition for the trigger 208. For example, the trigger manager 118 may be configured to associate the trigger identifier for the trigger 208 with a data source identifier for the data source 106 and/or the monitored item (or monitored inner-item) identifier for the particular monitored item associated with the data source 106 in a field-to-trigger mapping or data structure. In this regard, the trigger 208 may be associated with a particular monitored item (or inner-item) which corresponds to the condition defined for the trigger 208.

Section D. Formulas

As noted above, a trigger may be satisfied where a condition corresponding to an item or inner-item is satisfied or met. In some embodiments, the condition may be based on a value from the item or inner-item. For example, the condition may be satisfied based on occurrence of a particular value or range of values for a monitored item (or inner-item). As noted above, the trigger may be defined or configured based on various user inputs for defining, at least, the condition. In some instances, the condition may be defined as a formula (or equation). A formula may be configured to output a calculated value (e.g., based on data from one or more monitored items or other items received from a data source). A formula may be configured to output a statement value (e.g., a true or false return based on a comparison, or other Boolean answer). The formula may use a combination of functions (e.g., including constants, variables, and outputs from other formulas), as described in greater detail below. As such, the systems and methods described herein may provide a more diverse and versatile trigger which is capable of more complex configuration.

The trigger manager 118 may be configured to receive data corresponding to the formula responsive to a user defining a particular trigger (e.g., when the user is generating a particular workflow). In some embodiment, the trigger manager 118 may be configured to receive inputs from the client device(s) 104 for defining the formula. The formula may be an equation, function, or other relationship between one or more data points (e.g., between one or more fields, between a field and a time, etc.). As one example, the formula may be or include a relationship between one field and a static value. As another example, the formula may be or include a relationship between a field and a time or date. As yet another example, the formula may be or include a relationship between two data points (such as a Boolean formula, a string formula, etc.). In these and other embodiments, the trigger manager 118 may be configured to receive one or more inputs for defining a particular formula corresponding to various items to be monitored (e.g., monitored items).

In some embodiments, the trigger manager 118 may be configured to receive data corresponding to inputs for defining a formula. In some embodiments, the trigger manager 118 may be configured to provide a plurality of predefined formula options to a user (e.g., via a user interface) for selection and configuration. Such predefined formula options may include, for instance, a sum of two (or more) items, subtracting a value corresponding to an item from a list of items, identifying a greatest (or least) value from a list of items, or other predefined formula options which may be used by several different clients. The trigger manager 118 may be configured to receive a selection of a particular monitored item corresponding to the formula. In some embodiments, the trigger manager 118 may receive the selection of the monitored item via a field of a formula configuration interface. For example, a user may select the monitored item from a drop-down menu, may type a name or identifier of the monitored item into the field, etc. In these and other embodiments, the trigger manager 118 may be configured to receive a selection of the monitored item for configuring the formula.

The trigger manager 118 may be configured to receive data corresponding to the functions for the formula in relation to the monitored item or fields of a data source. The functions may be a relationship between fields which define the formula. The functions may be include various mathematical, Boolean, or other logical operators which together define a relationship between two or more data points of respective monitored item(s) or fields. The functions may include a maximum function for the monitored item, a minimum function for the monitored item, a sum function for the monitored item, a difference function for the monitored item, a true-false function, an if function, etc. The trigger manager 118 may be configured to receive the function in relation to the monitored item selected for configuring the formula. The trigger manager 118 may be configured to receive the function at the formula configuration interface. Once the trigger manager 118 receives an input for selecting a field and the function of the formula, the trigger manager 118 may be configured to generate, present, or otherwise provide a preview of a value computed for the formula. For example, the preview may show a result from a plurality of data points of the monitored item and the corresponding function for the formula. Such embodiments may provide an efficient way for which a user can validate or verify that the formula is properly capturing the requested data.

In some embodiments, the trigger manager 118 may be configured to receive data corresponding to a plurality of user inputs for defining the function. For example, the trigger manager 118 may be configured to receive inputs from a user interface (e.g., as described in greater detail below in Section 2) for defining the formula. In some embodiments, the formula may be or include or identify a plurality of monitored items and a function corresponding to a relationship between the monitored items. For example, as described above, the trigger manager 118 may be configured to receive a user selection of a first field, a user selection of a second field, a user selection of a third field, and so forth. In some implementations, the fields may each be from separate data sources (e.g., the first field may be from a first data source, the second field may be from a second data source, etc.).

In some embodiments, one or more of the monitored items may be or include time or date (or a formula based on a particular time or date). For example, a formula may be configured based on a function of a field from a data source in relation to a current time (or a date, or a day of the week, etc.). The trigger manager 118 may be configured to receive a selection of a monitored item corresponding to time via the formula user interface. In some embodiments, the trigger manager 118 may be configured to receive inputs for defining a formula in relation to a particular time or date (e.g., a formula for determining an amount of time until a particular date, a formula for adding time to a particular time or date, etc.). Accordingly, a formula may leverage data from data sources as well as temporal data (or relationships to temporal data).

In some embodiments, one or more monitored items may be a formula monitored item (e.g., a monitored item corresponding to a particular formula as opposed to a monitored item from a data source). As described in greater detail below in, responsive to establishing an workflow having a condition corresponding to a formula, the data structure manager 122 may be configured to generate, establish, or otherwise provide a new formula-based monitored item. The new formula-based monitored item may include field-value pairs corresponding to the formula (e.g., with values being computed using the formula applied to data from the monitored item(s)). In this regard, the data structure manager 122 may be configured to generate a new monitored item (e.g., a formula monitored items). The trigger manager 118 may be configured to receive a selection of a formula monitored item as an input to another formula. In other words, a formula monitored item may be nested with or otherwise use data from another formula monitored item.

Once a selection of the monitored items are received, the trigger manager 118 may be configured to receive data corresponding to the function or relationship between the monitored items for configuring the formula. In this regard, the formula may be defined in relation to the first, second (and so forth) monitored item. The function may be, for example, a multiplier, a divider, a sum, a subtraction, and so forth. In some embodiments, the relationship of a formula may include a multiplier, weight, or other fixed value which is to be applied to a monitored item (or items). In some embodiments, the formula may include a plurality of functions.

The trigger manager 118 may be configured to receive data corresponding to conditions in which the formula is to be applied to data of the monitored item(s). For example, the condition may specify that the formula is to be applied to data of the monitored item(s) responsive to an update to the monitored item(s). As another example, the condition may specify that the formula is to be applied to data of the monitored item(s) at predetermined intervals (e.g., once a day, once an hour, once a month, etc.). The trigger manager 118 may be configured to receive data corresponding to the conditions via the formula configuration interface.

Various examples of formulas which may be used for generating new monitored items are described in greater detail below. However, the present disclosure is not limited to these particular formulas. Rather, various combinations of monitored items, function(s) for formulas, and conditions may be selected for defining a formula to support new monitored items according to different needs and workflows.

As one example, the trigger manager 118 may be configured to receive inputs corresponding to a formula for a number of outstanding tickets per customer. The trigger manager 118 may be configured to receive a selection of a first monitored item corresponding to outstanding tickets (e.g., by selecting a particular monitored item from a ticket manager, such as ZENDESK). The trigger manager 118 may be configured to receive a selection of a second monitored item corresponding to customers (e.g., from SALESFORCE). The trigger manager 118 may be configured to receive data corresponding to a relationship between the first monitored item and the second item for defining the formula (e.g., a divider function of the first monitored item relative to the second monitored item). Responsive to receiving the selection of the monitored items and function, the trigger manager 118 may be configured to provide a preview of the field-value pair from the formula, which may include a plurality of sample values computed using the formula for a respective plurality of customers. The trigger manager 118 may be configured to receive a condition which specifies that the formula is to be applied as new tickets are received at the ticket manager (e.g., as new updates are received at the data source corresponding to the ticket manager).

As another example, the trigger manager 118 may be configured to receive inputs corresponding to a formula for an estimated probabilistic amount of quarterly earnings. The trigger manager 118 may be configured to receive a selection of a first monitored item corresponding to opportunities values (e.g., by selecting a particular monitored item from SALESFORCE). The trigger manager 118 may be configured to receive a selection of a second monitored item for a closing date (e.g., from SALESFORCE). The trigger manager 118 may be configured to receive a selection of a monitored item of a current time. The trigger manager 118 may be configured to receive data corresponding to a relationship between the first through the third monitored item for defining the formula (e.g., a relationship of the first monitored item multiplied by a weight which corresponds to a difference between the third monitored item and the second monitored item). Responsive to receiving the selection of the monitored items and relationship, the trigger manager 118 may be configured to provide a preview of the field-value pair from the formula, which may include a plurality of sample values computed using the formula and corresponding listing of opportunity values and their respective closing dates. The trigger manager 118 may be configured to receive a condition which specifies that the formula is to be applied as new tickets are received at the ticket manager (e.g., as new updates are received at the data source corresponding to the ticket manager).

As described in greater detail below in Sections 10-11, the data structure manager 122 may be configured to generate an entity relationship data structure including various identifiers corresponding to the monitored item(s) and formulas. Additionally, the data structure manager 122 may be configured to generate a field-value pair for the formula. The field-value pair may include values computed using the formula. Once an update to the data source corresponding to a monitored item occurs, a device may compute a new value corresponding to the update and determine whether the value satisfies the condition of the trigger. Where the condition of the trigger is satisfied, the device may perform one or more actions which are configured for the workflow, as described in greater detail below.

Section E. Actions

The workflow management system 102 may include an action manager 120. The action manager 120 may be any device, component, script, computer-code, or combination of software and/or hardware configured to generate and manage actions 210 corresponding to a trigger 208 of the trigger manager 118. Action, as used herein, refers to a task, step or series of steps, or other form of an output which are to occur based on a particular trigger 208 being satisfied. In other words, actions 210 are to be performed responsive to a particular trigger 208. In some embodiments, the action manager 120 may be configured to generate and manage a plurality of actions 210 corresponding to a particular trigger 208. In this regard, a particular trigger 208 being satisfied may result in a plurality of actions 210 being executed. The action manager 120 may be configured to provide various action types, including entity coordination actions 210, workflow actions 210, and/or data source actions 210. Each of these actions are described in greater detail below.

The action manager 120 may be configured to provide one or more entity coordination actions 210. Entity coordination actions 210 may include generating notifications or alerts, generating one or more prompts to solicit response(s) or feedback, and so forth. In some embodiments, the interface manager 110 may be configured to provide one or more interfaces for generating an entity coordination action 210. In general, the interface may request inputs for defining the entity coordination action, including inputs for a particular entity (such as a person or group of people), a channel in which a prompt or notification is to be provided to the entity, and an option for text to accompany the prompt or notification.

In some embodiments, the entity coordination action 210 may be configured to ask a question to a particular entity. The interface manager 110 may be configured to request an input corresponding to an entity who is to receive a notification or prompt. For example, an entity coordination action 210 may be assigned to an owner which is assigned to or otherwise corresponding to an item (e.g., which satisfies or corresponds to the trigger 208). As another example, an entity coordination action 210 may be assigned to specific entities within the enterprise. Still another example, an entity coordination action 210 may be assigned to a particular address from a field from a data source 106. In these and other embodiments, a user corresponding to the client device 104 may operate the client device 104 to input or select an address via the interface provided by the interface manager 110 corresponding to the entity who is to be assigned to the entity coordination action 210 (e.g., by providing a specific address, by selecting a particular field in a manner to selecting master fields described above with reference to generating a trigger 208, etc.). Additionally, the user may select a medium in which the notification is to be sent (e.g., email, Slack, etc.). In some embodiments, the entity coordination action 210 may be sent via a public channel, a private channel, or a custom channel (e.g., a custom slack channel which may be public or private). The entity coordination action 210 may include accompanying text, such as contextual information, data from fields, free text space, etc. The interface manager 110 may be configured to provide an interface for inputting free text, adding in fields (e.g., inner items count, root item, title, description, owner name, owner email, due date, status, etc.) which are to be filled with corresponding values, and so forth. Such contextual information may be customizable and formattable (e.g., using HTML and markdown).

In some embodiments, the interface manager 112 may be configured to provide an interface for adding one or more action interaction objects (such as buttons or other user interface elements) to a notification or prompt for an entity. Selection of an action button may trigger one or more additional actions. For example, where a particular question corresponding to an entity coordination action 210 has predefined answers, the notification corresponding thereto may include buttons for each of the predefined answers. In some embodiments, an action button may be a continue flow action button, an open URL to user action button, and an open forum button. The continue flow action button may be followed by one or more additional action items 210 such that, where the continue flow action button is selected, the additional action items 210 are subsequently executed. The open URL action button may trigger opening or launching a different platform or webpage which corresponds to the URL for the open URL action button. Similarly, the open forum button may trigger opening, launching, or creating a form which corresponds to the question.

In some embodiments, an entity coordination action 210 may be configured to prompt for a status update. As described above, the entity coordination action 210 may define an entity which is to receive the prompt (e.g., a flow item owner, specific people, or an address from a field), and may include text accompanying the message. The text accompanying the message may include field values, such as due dates, current status, etc. The entity coordination action 210 may include one or more buttons which can be selected (e.g., post an update, ask me later, or more information). Each button may trigger a corresponding action or interface. For example, upon selection of the "post an update" button, a user may be prompted to provide a current status, write an update, provide an ETA, etc. As another example, upon selection of the "ask me later" button, a user may be prompted to provide a date or time in which the user is to be reminded of the status update (e.g., later today, tomorrow, in a week, in two weeks, etc.). As yet another example, selection of the "more information" button may list, import, or otherwise provide additional information corresponding to the particular item which is being requested. In embodiments in which an action 210 includes various buttons, the action 210 may be a wait action 210 (similar to the wait trigger 208 described above). In this regard, a status of the workflow (e.g., a protocol of the workflow which is in deployment) may be maintained until the action 210 receives a button selection from a user.

In some embodiments, an entity coordination action 210 may be configured to monitor a thread of messages. The interface manager 110 may be configured to provide an option when configuring the entity coordination action 210 for selecting whether a thread is to be monitored. Once selected, the action manager 120 may be configured to monitor a thread corresponding to a message sent by the action manager 120 to a particular entity according to the entity coordination action 210. For example, rather than waiting on a selection of a button, the entity coordination action 210 may be configured for monitoring a thread of messages (e.g., in SLACK). In some embodiments, the workflow management system 102 may include a natural language processor. The natural language processor may be native to the workflow management system 102 and/or external to the workflow management system 102. The action manager 120 may be configured to provide free-text to the natural language processor to detect specific inputs (such as keywords or phrases). For example, the entity coordination action 210 may be configured to cause the action manager 120 to generate a message for an entity and await a response from the entity. Once a reply is received, the action manager 120 may be configured to provide the body or subject (or other free-text) from the reply to the natural language processor for parsing. The action manager 120 may be configured to perform one or more actions 210 based on the parsed text (similar to the actions 210 performed responsive to selection of a particular interface element or button as described above). Hence, rather than a user being required to select a button for "send to legal," a user may respond to a message generated by the action manager 120 with the same or similar text, and the action manager 120 may be configured to perform substantially the same results.

In some embodiments, the action manager 120 may be configured to provide a workflow action 210. For example, a workflow action 210 may include update field actions 210 (e.g., for updating the value of a field maintained by the workflow management system 102, for updating the value of a field maintained by a particular data source 106, etc.). In some embodiments, the update field actions 210 may be configured to update multiple fields within one action item 210 by adding additional fields to be updated. Each update field action 210 may include or specify a particular field name, which may be selected from a drop down menu or identified as described above with reference to identification of a master field, etc. The update field action 210 may further specify a value which is to be updated for the field, which may be hardcoded (e.g., typed in free-text, variable data selected from another field, data from a form, a previous action, a formula, etc.), may be an empty value (e.g., to clear or nullify a field), etc. In some embodiments, the action manager 120 may perform the workflow action 210 by updating a value in the local data source, and synchronizing the update with the third-party or external data source 106. In some embodiments, the action manager 120 may perform the workflow action by transmitting (e.g., via a queue) an update to the third-part or external data source 106.

In some embodiments, the action manager 120 may be configured to provide a data source action 210. For example, a data source action 210 may include an action which corresponds to a particular data source 106. Each of the data source actions 210 may be specific to a particular data source 106. The data source actions 210 may include writing to a particular data source (e.g., local and/or external), generating tickets or assigning tasks to particular users, etc. The data source action 210 may include features similar to the update field action 210. For example, the data source action 210 may include or specify a particular field name and a value which is to be written or included in the corresponding field for the data source 106. The value may be or include a static or fixed value, a value from another field, an equation or variable, etc.

Once each of the inputs used for defining a particular action 210 are received via the interface provided by the interface manager 110, the action manager 120 may be configured to generate the corresponding action 210. The action manager 120 may be configured to generate the action 210 in association with the corresponding trigger 208. In this regard, each action 210 may be linked, associated with, or otherwise correspond to a particular trigger 208 such that a particular trigger 208 being satisfied causes one or more actions 210 to be performed, as described in greater detail below.

The action manager 120 may be configured to generate an action identifier for each action 210. The action identifier may be similar in some regards to the trigger identifier, data source identifier, and monitored item identifier in that the action identifier is uniquely associated with a particular action 210. The action manager 120 may be configured to store an association with the action identifier for a generated action 210 and the trigger identifier for a particular trigger 208 which causes the action 210 to be performed.

In some embodiments, such as where a particular trigger 208 being satisfied causes a plurality of actions 210 to be performed, the actions 210 may be executed in series or in parallel. The interface manager 110 may be configured to provide an interface for selecting whether a particular action 210 is to be performed in parallel or in series. For example, the interface manager 110 may be configured to provide an option for selecting sequential execution while the action 210 is being configured (or following configuring the action 210). Where the sequential execution option is selected for a group of actions 210, the action manager 120 may be configured to serially execute the actions 210 (during execution of the workflow). The action manager 120 may be configured to generate a sequential execution identifier (or tag) for each of the actions 210 which are serially executed. The sequential execution identifier may include, for example, the action identifier corresponding to the action 210, an identifier which indicates that the action 210 is to perform in a particular sequence, an order of the sequence, and/or a position of the action 210 within the particular sequence. As such, upon the corresponding trigger 208 being satisfied, each of the actions 210 may be performed in a particular sequence. Where sequential execution option is not selected, each of the actions 210 may be performed in parallel. Such embodiments provide for a dynamic and adaptable configuration of the workflow which may be suitable for different types of workflows.

Section 2. Visual Programming Interface for Generating a Workflow

Figure 4:
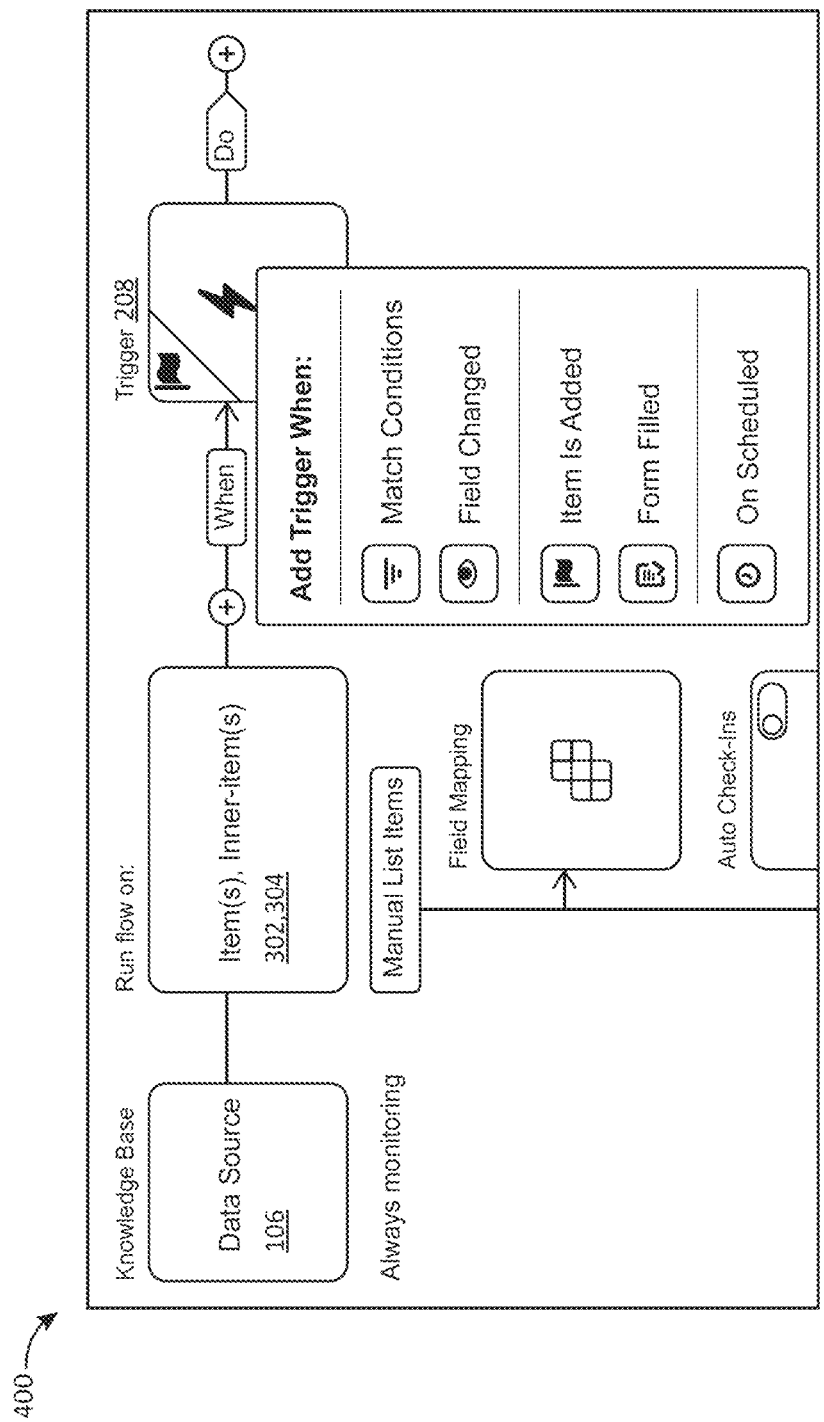
FIG. 4 is an example of a user interface for creating a trigger corresponding to a particular data source, according to an illustrative embodiment.

In some embodiments, the interface manager 110 may be configured to provide a visual programming interface for generating a workflow. Referring now to FIG. 4, depicted is an example of a user interface 400 for creating a trigger 208 corresponding to a particular data source 106. Each of the triggers 208 may be configured based on data from a particular data source 106. In some embodiments, triggers 208 may be defined according to all data received from the data source 106. In some embodiments, triggers 208 may be defined according to a particular field mapping (e.g., an update from a particular data field from the data source 106). In embodiments in which a trigger 208 is to be defined according to a particular field mapping, a user may select a particular title or identification field corresponding to the data source 106 (as described above in Section A). The interface manager 110 may be configured to provide the user interface 400 to the client device 104 for generating the trigger 208.

Figure 5:
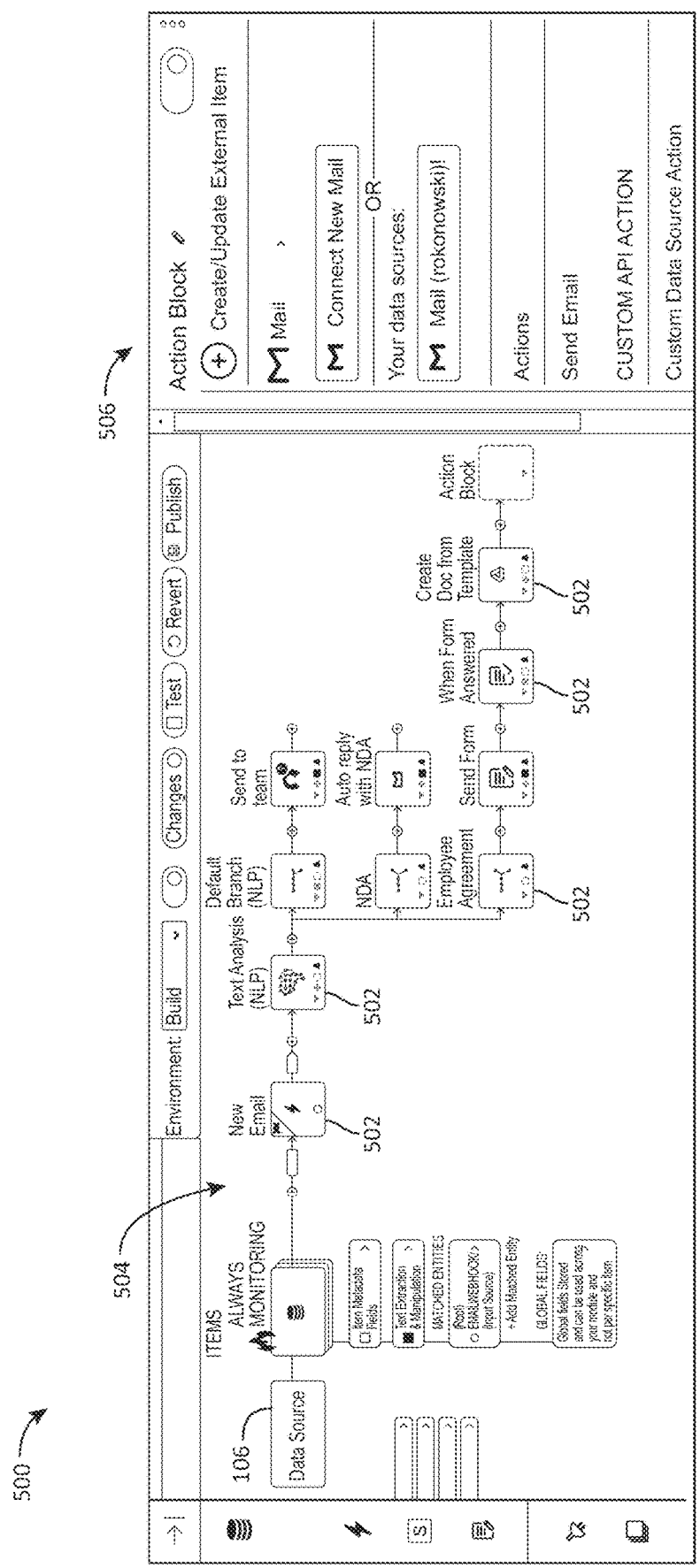
FIG. 5 is a visual representation or workflow which corresponds to an executable generated by the workflow management system, according to an illustrative embodiment.

Referring now to FIG. 5, depicted is a visual representation 500 or workflow which corresponds to a workflow generated by the workflow management system 102 using data and/or inputs received from the client device 104. The interface manager 110 may be configured to generate, build, assemble, or otherwise update data corresponding to the workflow generated using the client device 104, as described in greater detail below.

As shown in FIG. 4 and FIG. 5, the interface manager 110 may be configured to provide an interface for a modular coding construct for generating a visual representation 500 which forms the basis of an executable. Executable refers to a combination of one or more data structures or databases which include data representing a version of a workflow (e.g., a protocol of the workflow) which is currently in deployment and executed by the workflow management system 102. In some embodiments, generating an executable can include users configuring a workflow. Users configuring a workflow for generating an executable (for example, one or more data structures or databases) may add objects 502 to a canvas region 504 (e.g., by selecting a plus symbol and selecting an object 502, by dragging and dropping objects 502 onto the canvas 504, etc.). Once an object 502 is added, the user may configure the object 502 (e.g., by providing inputs to fields displayed in a configuration region 506). The visual representation 500 may include a plurality of objects 502 (or modules) which together form a workflow for defining the executable. Each object 502 may correspond to a particular object type, which may include object types corresponding to particular data sources 106, object types corresponding to particular triggers, and object types corresponding to particular actions. The interface manager 110 may include a plurality of object types which are selectable via the client device 104 for configuring or generating a workflow. The interface manager 110 may be configured to generate or provide a user interface at the client device 104 for constructing the visual representation 500.

In the example shown in FIG. 5, the visual representation 500 is generated by first selecting a particular data source 106 which is to be monitored. In the example shown in FIG. 5, a field corresponding to a product review for a particular product may be monitored. The interface manager 110 may be configured to provide a user interface for selecting the data source 106. Once the data source 106 is selected, the configuration region 506 may automatically expand to provide fields for configuring the item(s) of the data source 106 to be monitored, including individual fields of items from the data source 106. Upon selecting a plus symbol downstream from the data source 106, the interface manager 112 may be configured to display an interface for selecting a particular trigger 208 (as described above with reference to FIG. 4). A user may select a trigger 208 from the interface, a trigger object may be added to the canvas region 504 downstream from the object corresponding to the data source 106. The configuration region 506 may or otherwise be displayed to include various fields for defining the trigger 208, as described above. Continuing the example from FIG. 5, the data source 106 which is being monitored may include a new email trigger 208. Once a trigger 208 is established or generated as described above, the interface manager 110 may be configured to update the visual representation 500 to include a corresponding object 502.

Once a trigger 208 is generated and corresponding object 502 is included in the visual representation 500, one or more actions 210 may be added for the particular trigger 208. As shown in FIG. 5, each trigger 208 includes a corresponding series of actions 210 (which may still include further triggers 208 and corresponding actions 210). Actions 210 may be added in a manner similar to the triggers 208. For example, upon selection of the plus symbol downstream from a trigger object 502, the user may select a particular action 210 to be performed responsive to the trigger 208 being satisfied. The user may configure the action 210 by providing inputs to various fields in the configuration region 506, and the action object 502 may be added to the canvas region 504 downstream from the trigger object 502. The action 210 may be or include updating a particular data source 106 value for a corresponding item (e.g., a net promoter score (NPS) in SALESFORCE). The action 210 may be or include sending a message (e.g., via Slack) including data corresponding to the trigger 208. The action 210 may be or include sending an email requesting comments. In some embodiments, and as shown in the example in FIG. 5, the action 210 may be or include performing natural language processing (NLP) on a particular email to identify particular keywords (e.g., a default branch, a non-disclosure agreement (NDA) branch where the email includes keywords corresponding to an NDA, and an employee agreement branch where the email includes keywords corresponding to a new employee). As shown in FIG. 5, some actions 210 may include additional actions 210, which may similarly be added by selecting the plus symbol and configuring the action 210 via the configuration region 506. For example, the default NLP branch may include an automatic forward to a particular team or team member (such as a legal team), the NDA branch may include an action 210 corresponding to an automatic reply with a non-disclosure agreement, and the employee agreement branch may include a series of actions 210 including sending a form to the person requesting the email, waiting until the form is filled, and when the form is answered, generating an employee agreement from the responses to the form. In other words, some actions 210 may include further triggers 208 (e.g., waiting for a form to be filled, waiting for an approval cycle, waiting for comments received via an email, etc.). Such triggers 208 may further include actions 210. In each of these embodiments, responsive to various actions 210 and triggers 208 being added and configured at the client device 104, the interface manager 112 may be configured to generate a corresponding object 502 for the visual representation 500.

Referring back to FIG. 1, as the visual representation 500 is completed at the client device 104, the visual representation 500 may be used to generate an executable (e.g., in real-time). The workflow management system 102 may include an data structure manager 122. The data structure manager 122 may be any device, component, script, computer-code, or combination of software and/or hardware configured to generate, update, or otherwise define the executable (e.g., in real-time) using data from or generated by the data manager 112, the trigger manager 118, and the action manager 120. In some embodiments, the data structure manager 122 may be configured to update one or more data structures as the workflow is configured (e.g., based on inputs received by the data manager 112, the trigger manager 118, and/or the action manager 120).

The workflow management system 102 may include data structures 124. The data structures 124 may include one or more data structures that store global data for multiple workflows, or that are dedicated to storing data for individual workflows. For example, referring now to FIG. 1B, the workflow management system 102 may store a custom trigger data structure 134, a trigger hierarchy 136, a field-to-trigger mapping 138, and a field-to-field mapping 140. In brief overview, the custom trigger data structure 134 may be a data structure configured to store trigger data related to the triggers of multiple different workflows. The trigger hierarchy 136 may be a data structure that includes a hierarchy between different triggers indicating when to evaluate individuals triggers of the workflow 142 (e.g., according to a hierarchy of the triggers as defined in the workflow). The field-to-trigger mapping 138 may be a data structure configured to store relationships between fields and triggers of a workflow 142. The field-to-field mapping 140 may be a data structure configured to store relationships between different fields or items identified in the workflow 142. Each or a subset of these data structures together may define the execution of a version of a workflow 142 (e.g., a protocol).

In further detail, the custom trigger data structure 134 may be or include a master list of triggers that have been created across different workflows. In some embodiments, the custom trigger data structure 134 can be specific to a particular workflow or a particular version of a workflow. The master list of triggers may include trigger identifiers for the triggers. In some implementations, the master list of triggers may include a description of the triggers, such as the trigger conditions of the individual triggers which are satisfied for the triggers to be satisfied. As users create workflows on a respective user interface, any triggers that the users add to the workflow may be added to the master list of triggers with corresponding trigger identifiers. Thus, the custom trigger data structure 134 may maintain a real-time list of the triggers across workflows.

The trigger hierarchy 136 may be a data structure that stores a hierarchy or order of execution of the triggers of a respective workflow 142. The trigger hierarchy 136 may be generated from the custom trigger data structure 134, such that the triggers identified in the trigger hierarchy 136 are specific to the workflow 142. In some implementations, the trigger hierarchy 136 may only include identifiers of the triggers from the workflow 142 (e.g., a trigger ID for the triggers). The trigger hierarchy 136 may include a flow of the order of the triggers of the workflow 142 in which the triggers may be executed. For example, if the workflow 142 includes triggers that are configured to be triggered in sequential order (e.g., nested or dependent triggers), the trigger hierarchy 136 may indicate the order in which the triggers may satisfied. Consequently, when determining whether any triggers are satisfied from the workflow 142, the workflow management system 102 may initially only evaluate the values of the monitored fields against the conditions of the first trigger of the trigger hierarchy 136. Upon determining the first trigger is satisfied, the workflow management system 102 may then determine if the second trigger is satisfied (e.g., based on values of the monitored field(s) of the workflow 142). Accordingly, the workflow management system 102 may avoid using processing resources to determine if every trigger of the workflow 142 is satisfied each time the workflow management system 102 detects an event (e.g., a change or update or update to a monitored item of the workflow 142).

In some implementations, some triggers may be evaluated in parallel. For instance, multiple triggers may be on the same level of the trigger hierarchy 136 such that the triggers on the same level are evaluated without other triggers being satisfied. For example, the workflow 142 may include three triggers, trigger A, trigger B, and trigger C. The workflow 142 may be configured such that trigger C may only be evaluated once either trigger A or trigger B has been satisfied. Accordingly, trigger A and trigger B may be on the same level in the trigger hierarchy 136. When the workflow management system 102 detects an event related to the monitored item of the workflow 142, the workflow management system 102 may evaluate the conditions of the triggers A and B. If the workflow management system 102 determines one of the triggers A or B are satisfied, the workflow management system 102 may then evaluate the trigger conditions of trigger C based on the trigger hierarchy 136.

The field-to-trigger mapping 138 may be an example data structure that stores relationships between fields (e.g., monitored fields) of monitored items and triggers of the workflow 142. For instance, the field-to-trigger mapping 138 may include stored relationships between the fields and triggers for which the values of the fields may be used as inputs to determine if the triggers are satisfied. For example, if a field indicates the number of days until a particular deal closes and a trigger condition for a trigger is satisfied once the number of days reaches five days, the field-to-trigger mapping 138 may indicate that there is a relationship between the field indicating the number of days and the trigger. In some implementations, the field-to-trigger mapping 138 may include relationships between the trigger and multiple fields of one or more monitored items. Such may be the case if a trigger has a trigger condition that is satisfied based on values from multiple fields and/or multiple trigger conditions that are satisfied based on values from multiple fields. Consequently, when a value of a field changes, the computer may identify any triggers from the field-to-trigger mapping 138 that have a stored relationship with the field. The computer may do so based on the stored relationship without using the computational resources that would be required to evaluate the trigger conditions of each trigger each time a value of a field is updated. When a trigger is added to the workflow, the trigger is generated using fields that are exposed to the user and selected by the user. Upon adding the trigger to the workflow, the workflow management system 102 can update the field-to-trigger mapping 138 to include a mapping between the field specified in the trigger and the trigger itself. In this way, when the worflow management system 102 detects an update to the particular field, the system 102 can identify each of the triggers that are related to the particular field using the field-to-trigger mapping 138.

The field-to-field mapping 140 may be an example data structure that stores relationships between individual fields of monitored items and one or more fields of any matched entities. The stored relationships may indicate that the fields are both related to the same trigger and/or trigger condition. For example, the field-to-field mapping 140 may include a relationship between a field A and a field B if a formula for a trigger condition to be satisfied indicates the trigger condition is satisfied if field A has a value of 1 and field B has a value of 0. Thus, if a computer detects or determines field A has a value of 1, the workflow management system 102 may identify the relationship between field A and field B to identify the value of field B and determine if the trigger condition is satisfied based on those values. This helps enable the workflow management system 102 quickly identify trigger conditions that are satisfied based on changes to values of various fields.

In some implementations, the trigger hierarchy 136, the field-to-trigger mapping 138, and the field-to-field mapping 140 may be specific to a version of the workflow 142 (e.g., a protocol). For instance, upon a user creating the workflow 142, the data structure manager 122 may generate the trigger hierarchy 136, the field-to-trigger mapping 138, and the field-to-field mapping 140 based on the inputs into the workflow 142. The same user may then update the workflow 142 by adding monitored items, monitored fields, and/or triggers to the workflow 142. Upon doing so, the data structure manager 122 may generate new versions of the trigger hierarchy 136, the field-to-trigger mapping 138, and the field-to-field mapping 140 based on the updates to the workflow 142. In doing so, the data structure manager 122 may store copies of the trigger hierarchy 136, the field-to-trigger mapping 138, and the field-to-field mapping 140 from the initial version of the workflow 142 such that if a user wishes to revert to a previous version of the workflow 142, the user may select a setting or option to use the data structures from the initial version.

The data structure manager 122 may be configured to generate an executable using data from the data manager 112. As described above in Section 1A, the data manager 112 may be configured to establish connections with various data sources 106 as specified by an administrator or other user. The data manager 112 may be configured to establish connections for receiving and/or transmitting data corresponding to particular items and inner-items. As noted in Section 1B, the data manager 112 may be configured to generate one or more identifiers corresponding to each data source 106, including monitored item identifiers for each monitored item of the data source 106. Such items and inner-items may be monitored and used establishing one or more triggers 208, as described above with reference to Section 10. The trigger manager 118 may be configured to generate a trigger identifier which is associated with a data source identifier and/or monitored item identifier. The data structure manager 122 may be configured to identify each of the triggers 208 associated with a monitored item by identifying each trigger identifier which is associated with a monitored item identifier for the monitored item. The data structure manager 122 may be configured to build, assemble, or otherwise compile data in various data structures for each of the triggers 208 for a particular monitored item using the trigger identifiers for the particular monitored item. As such, the data structure manager 122 may be configured to map the monitored items to each of the triggers 208 for generating the executable.

Once the monitored items and triggers 208 are mapped and associated with one another, the data structure manager 122 may be configured to identify each action 210 which is associated with a respective trigger 208. As noted above in Section 1E, each action 210 may have an action identifier which is associated with a trigger identifier for the corresponding trigger 208. Similar to identifying the triggers 208 associated with a monitored item, the data structure manager 122 may be configured to identify each of the actions 210 corresponding to a trigger 208 by identifying each of the action identifiers which correspond to a respective trigger identifier. The data structure manager 122 may be configured to build, assemble, or otherwise compile data in one or more data structures for each of the actions 210 for a particular trigger 208 using the action identifiers for the particular trigger 208. As such, the data structure manager 122 may be configured to map the actions 210 to each of the triggers 208.

In some embodiments, a particular action 210 may cause one or more triggers 208 to be satisfied. For example, a first trigger 208 may cause an action 210, which in turn results in a second trigger 208 to be satisfied, which is followed by another action 210 when the second trigger 208 is satisfied. The data structure manager 122 may be configured to map, build, or otherwise compile each of the triggers 208, actions, 210, and so forth in one or more data structures. The data structure manager 122 may be configured to validate each of the triggers 208 and actions 210. For example, the data structure manager 122 may be configured to validate the triggers 208 and actions 210 by verifying each of the required inputs for a particular trigger 208 or action 210 are received, checking a syntax of various conditions configured for the triggers 208 and/or actions 210, verifying inputs are acceptable inputs, etc. Where the data structure manager 122 determines that a particular trigger 208 or action 210 is not valid, the data structure manager 122 may be configured to generate a flag which causes the interface manager 110 to render an interface indicating that the trigger 208 or action 210 is not valid. The interface may include fields for correcting the issue (e.g., to add the required inputs, correct the syntax, provide an acceptable input, etc.). Once each of the triggers 208 and actions 210 are validated by the data structure manager 122, the data structure manager 122 may be configured to construct the executable as a computer data object which implements the workflow defined by the user.

In some implementations, when generating an executable, the data structure manager 122 may establish a feed with a data source of any monitored items that are identified in a workflow. The data structure manager 122 may establish such feeds by establishing connections with each of the data sources of the monitored items via an API. The data structure manager 122 may establish the feeds to pull in data from the data sources at defined intervals (e.g., every five seconds, 10 seconds, 20 seconds, etc.). Such defined intervals may be defined by a user when the user creates the workflow or pre-defined by the data structure manager 122 such that each feed pulls data at the same rate. In some implementations, the pull rate may be defined based on the data source from which the data is being pulled (e.g., Company A's API may enable data to be pulled every five seconds while Company B's API may enable data to be pulled every 10 seconds). In each of these implementations, the data structure manager 122 may retrieve the pull rate and set the retrieved pull rate so the feeds pull data according to the pull rate.

In some implementations, the data structure manager 122 may configure the API calls to the data sources to pull data specific to individual field-value pairs of the data source 106. For example, if a field to be monitored is a cell in a spreadsheet of a data source, the data structure manager 122 may establish a connection to pull data from the cell of the data source at the pull rates as described above. The data structure manager 122 may configure the API calls to pull data from any number of monitored items and/or field-value pairs of a single data source with such API calls. In some implementations, the data structure manager 122 may establish the API connection to pull all of the data from a data source (e.g., all of the data the data source makes available for retrieval) identified in a workflow at such pull rates.

In some implementations, in addition to or instead of establishing API connections with the data sources identified in a workflow, the data structure manager 122 may establish webhooks at such data sources. The webhooks may be configured to push data to the device executing the executable upon an event (e.g., a predefined event) occurring either at specific field-value pairs (e.g., field-value pairs identified in the workflow) or at the data source in general.

Following building a workflow, the data structure manager 122 may be configured to receive a selection of a publish button on a user interface used to build the workflow. Following receiving the selection, the data structure manager 122 may define the version of the workflow represented on the user interface as a protocol version of the workflow. The protocol version may be the version of the workflow which is currently in deployment. The data structure manager 122 may store any previous versions of the workflow such that a user may switch between one version to another version of the workflow as the protocol version.

In some implementations, while the data structure manager 122 generates the workflow, the data structure manager 122 may also generate one or more data structures 124 which represent or otherwise define the workflow (e.g., and together form the executable). The data structures 124 may include, for example, a mapping of items and triggers, a trigger hierarchy, a custom trigger database, a field-to-field database, etc. During run-time, as new events are identified in a queue, the events may be cross-referenced against monitored item conditions to determine whether to generate a data object for a workflow, fields may be populated to the data object responsive to generating the data object, and the fields may be checked against the triggers to determine whether the triggers for the workflow are satisfied.

In some implementations, the relationship data structure may include stored relationships between triggers and actions. For instance, if the executable is configured such that when a trigger is satisfied the executable performs a particular action, the relationship data structure may include a relationship between the trigger and the action. For example, if the workflow of the executable includes an action to send an email to an individual upon a trigger being satisfied, the relationship data structure may include a stored relationship between the trigger and the action to send the email. Consequently, when a computer executing the executable determines the trigger is satisfied, the computer may identify the action based on the stored relationship the trigger has with the action in the relationship data structure. The relationship data structure may include relationships between any number of actions and/or triggers.

Section 3. Run-Time Implementation of a Protocol of a Deployment of a Workflow Generated Via the Workflow Management System Referring back to FIG. 1, once an executable is established, the workflow management system 102 may be configured to implement the executable. In some embodiments, the data manager 112, trigger manager 118, and action manager 120 may be configured to implement the executable (though, in some embodiments, other managers or engines of the workflow management system 102 may be configured to implement the executable). For example, the data manager 112 may be configured to implement the executable by detecting new data corresponding to monitored items, the trigger manager 118 may be configured to determine whether the new data satisfies any triggers 208, and the action manager 120 may be configured to perform the corresponding actions 210 for any satisfied triggers 208, as described in greater detail below. Additionally, and as described in greater detail in Section 6, the data object manager 128 may be configured to maintain data objects corresponding to each of the monitored items such that executables may be asynchronously executed as new data, inputs, or other updates are received.

The data manager 112 may be configured to intake, receive, or otherwise ingest data received from data sources 106. In some embodiments, the data manager 112 may be configured to ping (e.g., transmit a request for data) each of the data sources 106 in which the data manager 112 maintains a connection for updates to various monitored items and inner-items. The data manager 112 may be configured to ping the data sources 106 at various intervals (e.g., once a minute, once every five minutes, once every 15 minutes, once every 30 minutes, once an hour, etc.). The data manager 112 may be configured to detect, intake, receive, or otherwise ingest new data from the data sources 106 (or updates to the data sources 106). In some embodiments, the data manager 112 may be configured to detect new data from various forms maintained by the workflow management system 102. In this regard, the data manager 112 may be configured to ingest new data from data sources 106 as well as updated or new data (or completed data) maintained by the workflow management system 102.

The data manager 112 may be configured to analyze, inspect, or otherwise parse the data from the data sources 106 to determine an applicable executable which may use the data. For example, the data manager 112 may be configured to parse the data to determine an address of the data source 106, an identification field of the data, etc. The data manager 112 may be configured to cross-reference the identification field or address with a monitored item identifier to determine which applicable executables correspond to the monitored item. In this regard, the data manager 112 may be configured to map the address of the ingested data to one or more executables. The data manager 112 may be configured to detect, determine, or otherwise identify a matched item condition responsive to determining that the updated data from the data source 106 corresponds to a monitored item for a particular executable. Where the data manager identifies a matched item condition corresponding to a monitored item, the executable may automatically generate a track or instance corresponding to the monitored item. As an example, where the monitored item corresponds to opportunities for SALESFORCE, and an executable is to generate a request for a status update on opportunities which have a close date within a week, the data manager 112 may identify a matched item condition when data corresponding to a new opportunity added to a data source 106 corresponding to SALESFORCE has been identified by the data manager 112. The executable may then generate a track or instance corresponding to the opportunity. Once an executable has newly relevant data which is associated therewith (and generates a track or instance), one or more of the components described in greater detail below may execute the executable to determine whether any triggers 208 are detected based on the newly relevant data. Additionally, and as described below in Section 6, the state manager 128 may be configured to generate a data object (e.g., corresponding to the track or instance).

The trigger manager 118 may be configured to detect triggers based on data ingested by the data manager 112. As described above in Section 10, each trigger 208 may be satisfied based on data from a data source 106 (or a form being completed, etc.). The trigger manager 118 may be configured to parse, analyze, inspect, or otherwise process ingested data (e.g., from the data manager 112) to detect any triggers 208 which are satisfied by the new data. For example, the trigger manager 118 may be configured to process ingested data to determine whether any conditions of the data match a matched conditions trigger 208. The trigger manager 118 may be configured to apply the definition of a matched conditions trigger 208 to data ingested by data manager 112 to determine whether the condition of the matched conditions trigger 208 is satisfied. As another example, the trigger manager 118 may be configured to process the ingested data to determine whether a field specified in a field changed trigger 208 has been changed. As yet another example, the trigger manager 118 may be configured to process the ingested data to determine whether an item specified in an item added trigger 208 has been ingested by the data manager 112. As still another example, the trigger manager 118 may be configured to process the ingested data to determine whether a form specified in a form filled trigger 208 has been completed as identified by the data manager 112. As another example, the trigger manager 118 may be configured to detect an on scheduled trigger 208 is satisfied based on a lapse in time, based on the current date or time, etc.

In some embodiments, the trigger manager 118 may be configured to process the ingested data to determine whether one of the triggers 208 are satisfied and a condition corresponding to the trigger 208 is also satisfied (e.g., a form is filled out and an IF statement regarding data from the particular form is satisfied, an item is ingested by the data manager 112 and an IF statement regarding data from the particular item is satisfied, etc.). The trigger manager 118 may be configured to detect one or more triggers 208 being satisfied based on any particular new item or inner-item being detected and ingested. Where the trigger manager 118 detects a trigger 208 being satisfied, the trigger manager 118 may be configured to transmit, send, pass, or otherwise provide an indication corresponding to the detected trigger(s) 208 to the action manager 120.

The action manager 120 may be configured to generate, implement, perform, or cause one or more actions 210 to be performed according to a particular trigger 208 being satisfied. As noted above in Section 1E, actions 210 may be performed responsive to particular triggers 208. As such, the action manager 120 may be configured to perform one or more actions 210 (or cause one or more actions 210 to be performed) responsive to a particular trigger 208 being satisfied. The action manager 120 may be configured to implement the actions 210 by generating one or more notifications, prompts, updates, etc. using the data which caused the trigger 208 to be satisfied and/or other related data corresponding thereto.

In one implementation, the action manager 120 may be configured to determine a trigger 208 which was satisfied has a corresponding action 210 which causes an email to be sent from the workflow management system 102 to a particular entity (as defined in an entity coordination action 210). The action manager 120 may be configured to construct, compose, or otherwise generate the email, including an address specified in the action 210 or within a field of a particular item of a data source, for sending to the address. The action manager 120 may be configured to compose the email by pulling, retrieving, or otherwise accessing data from various data sources 106 for including in the email, as well as any free text specified or defined in the action 210. In this regard, the action manager 120 may be configured to automatically construct, generate, or compose an email responsive to one or more triggers 208 for transmission to a particular client.

In another implementation, the action manager 120 may be configured to determine a trigger 208 which was satisfied has a corresponding action 210 which causes a message to be sent via Slack from the workflow management system 102 to a particular entity (as defined in an entity coordination action 210). The action manager 120 may be configured to construct, compose, or otherwise generate the message, including an address specified in the action 210 or within a field of a particular item of a data source, for sending to the address. Similar to composing the email as described above, the action manager 120 may be configured to compose the message by pulling, retrieving, or otherwise accessing data from various data sources 106 for including in the message, as well as any buttons for which the user(s) receiving the message are to interact with the message. In this regard, the action manager 120 may be configured to automatically construct, generate, or compose a message responsive to one or more triggers 208 for transmission to a particular client. Furthermore, each of the buttons may function as a trigger 208, which cause further actions 210 to be performed (such as sending a form to legal, marking the form as completed, updating SALESFORCE, etc.).

In yet another implementation, the action manager 120 may be configured to determine a trigger 208 which was satisfied has a corresponding action 210 which causes an update to be sent from the workflow management system 102 to a particular data source (as defined in a data source action 210). The action manager 120 may be configured to construct, compose, or otherwise generate the update to include free text specified in the data source action 210, variable data from another data source 106 or the same data source 106, an equation, etc. The action manager 120 may be configured to generating the update by pulling, retrieving, or otherwise accessing data from various data sources 106 and applying any formula or equation specified in the data source action 210. In this regard, the action manager 120 may be configured to automatically cause a data source 106 to be updated responsive to a particular trigger 208.

The push manager 126 may be configured to push data to a data source 106, push data to a particular client device 104, etc. In some embodiments, the push manager 126 may be a component or element of the action manager 120. For example, where the action manager 120 generates a notification for transmission to a particular email address, the push manager 126 may push the notification to the client device 104 by sending the notification from the workflow management system 102 to the email address corresponding to the client device 104. As another example, where the action manager 120 generates a message or question via Slack, the push manager 126 may push the message or question to the client device 104 by sending the message or question via Slack to an address corresponding to the client device 104. As still another example, where the action manager 120 generates an update for a data source 106, the push manager 126 may push the update to an address corresponding to the data source 106 (e.g., via the corresponding Webhook, API, address, etc.). In this regard, the push manager 126 may execute or implement an interface for transmitting data to one or more external devices relative to the workflow management system 102.

Section 4. Architecture for Run-Time Implementation

To implement aspects of the present disclosure, the workflow management system 102 is configured and/or designed to address various technical problems that arise from the automation of workflow processes. First, the workflow management system is configured to Collection of data items from disparate data sources such that the workflow management system can process data locally, without having to rely on the availability of data at the third-party data sources. For instance, servers of the third-party data sources may be unavailable at certain times due to scheduled and unscheduled maintenance or due to other reasons beyond the control of the third-party data source. Furthermore, the servers of the third-party data sources may have limits on the amount of data that can be obtained from the data source within a given time period, or may have limits on the number of API calls or requests a particular customer, service, or account can make in a given time period (for instance, daily API call limits).

By maintaining local copies of the data stored in the third-party data sources, the workflow management system 102 can further perform certain actions that may not otherwise be performed on the third-party data source due to restrictions of the third-party data source. For instance, the workflow management system 102 may want to add a new value to a field of a data item of the third-party data source for tracking purposes or to map the data item to another data item of a different data source within the workflow management system 102.

Figure 6:
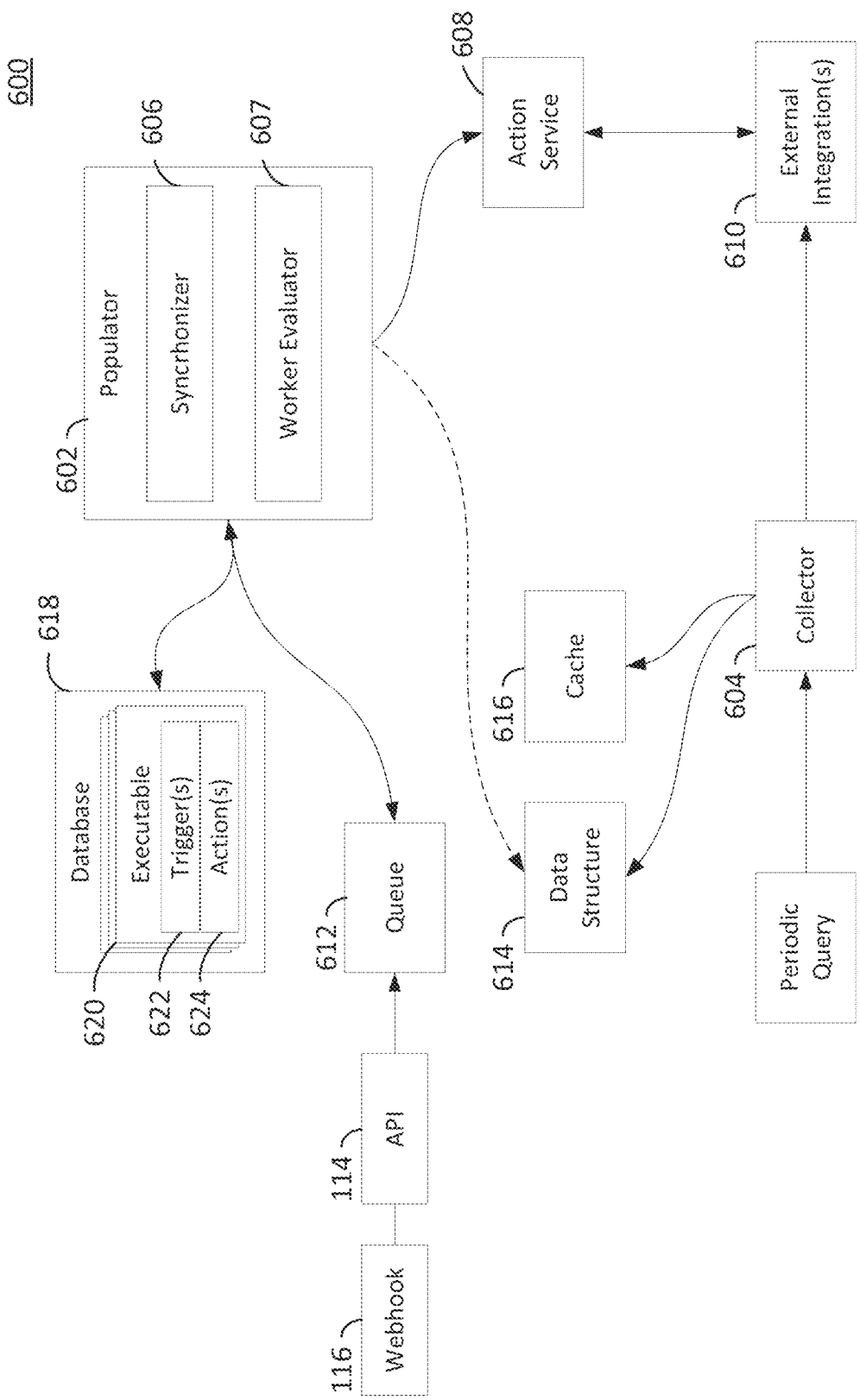
FIG. 6 is a block diagram of the system architecture of the workflow management system of the environment of FIG. 1 for run-time implementation, according to an illustrative embodiment.

Furthermore, maintaining local copies of the data stored in the third-party data sources can allow the workflow management system 102 to allow for workflows to include triggers and/or actions that rely on data from other data sources without the need to maintain live connections to each of the data sources identified in the respective workflow. This reduces the amount of connections the workflow management system 102 may need to maintain or manage during execution of an executable or subsequent to an event that invokes or involves the use of data from the third-party data source. Referring now to FIG. 6, depicted is a diagram of an architecture 600 of the systems and methods described herein during run-time, in accordance with one or more embodiments. In some implementations, the architecture 600 may include one or more of the components described above in Sections 1-3 or below in Sections 5-12. For example, the architecture 600 may include APIs 114 and/or Webhooks 116, one or more databases 108 and/or data structures 124, and so forth, which are described above. Additionally, the architecture 600 may include a populator 602, a collector 604, a worker evaluator 606, an action service 608, and external integrations 610. The populator 602 and/or collector 604 may be similar in some aspects to the data manager 112 described above in Section 1A. The worker evaluator 606 may be similar in some aspects to the trigger manager 118 and action manager 120 described above in Sections 1C and 1D. Additionally, the action service 608 may be similar in some aspects to the action manager 120 described above in Section 1D.

During run-time (i.e., following a protocol of the workflow being deployed in the computing environment), an API service 114 may publish events for each webhook 116 to a queue 612. The API service 114 may publish the events to keep persistence with a data source 106 (via an external integration 610 or channel) and to support a high amount of traffic between the data source 106 and the system architecture 600. The API services 116 may publish events, such as updates, additions, changes, etc. to the data source 106/external integration 610 to the queue 612. The API services 116 may publish the events, including any payload of the event received from the webhook 116, to the queue 612. In some embodiments, the queue 612 may be a KAFKA queue 612. The queue 612 may include a list or ledger of each of the events published by the API services 114 for webhooks 116 for a plurality of data sources 106 and monitored items (and sub-items).

The populator 602 may access the queue 612 to identify the events included in the queue 612. The events may identify any updates, additions, changes, etc., to items of a data source 106 or external integration 610. In some instances, some events may include the data which was updated, added, changed, etc., in the data source 106. For instance, some events may identify an update to an item, and some events may identify the update and include the data which was updated. The populator 602 may fetch, query, or request a copy of the data from the data source 106 or external integration 610 relating to the event responsive to identifying the event in the query. For example, where the event identifies an update to an item of a data source 106 or external integration 610, the populator 602 may request a copy of the data for the item of the data source 106 or external integration 610. The populator 602 may transmit, send, or otherwise provide the request to the collector 604 for collecting (e.g., a single collect) the data from the data source 106 and/or external integration 610.

The collector 602 may query a data source 106 or external integration 610 for updated, refreshed, or new data. In some implementations, the collector 602 may query the data source 106 or external integration 610 responsive to receiving a request for refreshed data from the populator 602 (e.g., a single collect). In some implementations, the collector 602 may periodically query a data source 106 or external integration 610 (e.g., a periodic query). For example, the collector 602 may periodically query a data source 106 or external integration 610 (i.e., every five minutes, 10 minutes, 15 minutes, 20 minutes, 25 minutes, 30 minutes, etc.) to identify any items of a data source 106 or external integration 610 which have been added or changed within the data source 106. The collector 602 may periodically query the data source 106 via the API 114. The collector 602 may periodically query the data source 106 or external integration 610 via a direct channel or connection. For instance, the collector 602 may access a predefined endpoint or item within a data source 106 or external integration 610 to determine or identify any additions or changes to the endpoint.

When the collector 602 receives data responsive to a query, the collector 602 may canonize the data into a searchable data structure 614. In some embodiments, the searchable data structure 612 may be the ELASTICSEARCH data structure or accessible via the ELASTICSEARCH software stack. A data visualization application called KIBANA may be used to form visualizations of data. For instance, KIBANA may obtain data to visualize from an ELASTICSEARCH database. In some embodiments, the collector 602 may be configured to determine whether or not to store data in the data structure 614. For example, upon storing data of a data source 106 in the data structure 614, the collector 602 may be configured to compute a hash of the data (such as, for example, a check-sum function). The collector 602 may store the computed hash for the data in cache 616. When subsequent data is received by the collector 602, the collector 602 may compute another hash of the data, and compare the computed hash to the hash stored in cache 616. If the hashes match, the collector 602 may determine that the data stored in the data structure 614 is the same as the data received by the collector 602 (and therefore, the collector 602 will not store the data in the data structure 614). However, where the hashes do not match, the collector 602 may determine that the data stored in the data structure 614 is different from the data received by the collector 602. The collector 602 may populate the data structure 614 with the differences between the data identified responsive to a comparison of the data stored in the data structure 614 to the data received by the collector 602.

The collector 602 may be configured to store the data in the searchable data structure 614 to maintain locks (i.e., to particular data for a data source 106 or external integration 610) and save temporary data, such that other components of the architecture 600 (such as the populator 602, the worker evaluator 606, the action service 608, etc.) may use the data for any number of actions or executables. Additionally or alternatively, and in some implementations, the populator 602 may receive the data from the collector 604 and/or read data from the queue 612. The populator 602 may be configured to store, save, or otherwise provide the data (i.e., received from the collector 604 and/or published to the queue 612) to the searchable data structure 614 so that the populator 602 and/or other components of the architecture 600 can search for the data later (i.e., during subsequent actions or tasks).

Once the populator 602 receives the external activities or data (i.e., from the collector 604 from the external integrations 610 and/or data source 106, from the queue 612 published by the API service 114 using data received from the external webhooks 116, etc.), the populator 602 may determine whether to generate a data object corresponding to the event. The populator 602 may be configured to query, check, or cross-reference the data with monitored item conditions for a plurality of workflows. For example, a workflow may have a monitored item condition which indicates that a data object should be generated if a field equals a certain value (e.g., an opportunity in SALES-FORCE has a value greater than $1M). The populator 602 may determine whether an update to a data source 106 satisfies the monitored item condition. The populator 602 may determine to generate a data object responsive to the update satisfying the monitored item condition.

The populator 602 is shown to include a synchronizer 606. The synchronizer 606 may be or include any device, component, or element designed or implemented to generate a data object responsive to determining that the monitored item condition is satisfied. The synchronizer 606 may be configured to generate the data object to identify the data which satisfied the monitored item condition, and each of the fields or items monitored in the workflow. The synchronizer 606 may be configured to populate the fields in the data object with each of the fields from the searchable data structure 614. As such, the data object may include data which identifies current values of the fields related to a particular instance or process of the workflow which was satisfied by a particular update.

The populator 602 may be configured to determine whether a data object has any triggers which are satisfied. The populator 602 may be configured to identify any triggers which are related to fields in the data object. The populator 602 may be configured to cross-reference fields from the data object with the field-to-trigger mapping 138 generated as part of configuring the workflow related to the data object. The populator 602 may be configured to identify any trigger identifiers which match fields that are updated or populated in the data object. In some embodiments, the populator 602 may first determine, according to the trigger hierarchy set forth or defined in the trigger hierarchy data structure 136, whether the field is related to a trigger which is next in line in the hierarchy. For example, where the trigger hierarchy data structure 136 for the workflow includes a first trigger which has been satisfied, followed by a second trigger and third trigger which both have not been satisfied, the populator 602 may identify the second trigger as being next in line in the hierarchy. The populator 602 may identify the trigger identifier for the trigger which is next in line, and perform a look-up function using the trigger identifier in the custom trigger data structure 134 to identify the corresponding trigger. The populator 602 may use the values for the fields corresponding to the trigger to evaluate whether the trigger has been satisfied. For example, the populator 602 may apply the values to the trigger condition included in the custom trigger data structure 134 associated with the trigger identifier.

In some embodiments, an event may relate to an existing data object. In such instances, the populator 602 identifies the data objects which have been generated and include fields which are associated with the event. The populator 602 may be configured to cross-reference fields corresponding to the event with fields corresponding to data object. The populator 602 may populate fields of the data object to store the data from the event relating to the data sources 106 and/or external integrations 610. The populator 602 may be configured to re-evaluate any triggers related to workflows for the respective data objects using the updated data, to determine whether any of the triggers were satisfied. The populator 602 may evaluate the triggers as described above.

In some embodiments, a worker evaluator 607 of the populator 606 may apply the data relating to the update to the monitored item (published to the queue 610 and/or received by the collector 604) to each of the triggers 622 which were identified by the populator 602 as being connected to the monitored item in the item-trigger data structure. In some embodiments, the worker evaluator 606 may apply the data received from the collector 604 and/or published to the queue 610 to the triggers 622. In some embodiments, the worker evaluator 606 may apply the data updated in the data structure and stored locally on the architecture 600 to the triggers 622. In some embodiments, the worker evaluator 602 may apply the data to each of the triggers 622 of a workflow according to an order of dependence of the triggers 622. The worker evaluator 606 may apply the data to the triggers 622 to determine whether a corresponding trigger condition for the trigger 622 has been satisfied.

Where a trigger 622 has been satisfied, the worker evaluator 606 may identify any actions to be performed. In some instances, the worker evaluator 606 may forward data relating to the satisfied trigger 622 to the action service 608. For example, the worker service 606 may forward the data which caused the trigger 622 to be satisfied and a trigger identifier for the trigger 622 to the action service 608. In some embodiments, the worker service 606 may forward additional data relating to the monitored item for the data, such as additional or relevant data to the data which caused the trigger to be satisfied.

The action service 608 may identify any actions 624 which are dependent on the trigger 622 for the executable 620. For example, the action service 608 may identify the sequential actions 624 which are to follow the trigger 622 being satisfied. The action service 608 may perform one or more of the sequential actions 624 following satisfaction of the trigger 622. In some embodiments, the actions 624 may include actions relating to an external integration 610 or data source 106 (such as read-write actions). The action service 608 may perform the action 624 by transmitting data or instructions via a direct channel (or via an API 114) to the external integration 610 and/or data source 106. In some embodiments, the action service 608 may ping the collector 604 to perform a single collect for related data for the data source 106 or external integration 610. The action service 608 may ping the collector 604 before, while, or following performance of an action 624. The action service 608 may ping the collector 604 to retrieve relevant data to the action 624 being performed (or that was performed). The action service 608 may ping the collector 604 so that the relevant data may be used (as needed) in performing one or more of the subsequent actions 624 of the executable 620.

The collector 604 may query the external integration 610 and/or data source 106 for the relevant data responsive to receiving the request/ping from the action service 608. The collector 604 may receive the relevant data, canonize the relevant data for storage in the searchable data structure 614 and/or cache 616 for subsequent use by the action service 608. Such implementations and embodiments provide for on-demand access to data on an as-needed basis for the action service 608, and ensures that the most relevant (or fresh) data is used in performing actions 624. Additionally, by storing the data locally (i.e., shadow copies of the data), the data may be more readily available to the action service 608 rather than having delays in waiting for the collector 604 to query the external integration 610 when the data is needed and waiting for a response. Rather, the action service 608 may query the searchable data structure 614 and/or cache 616 for the relevant data as needed without any delays in retrieving the data from the external integration 610.

Section 5. Stateful Data Objects

The workflow management system 102 may include a state manager 128. The state manager 128 may be configured to generate one or more stateful data objects corresponding to a track or instance of an executable associated with monitored items and inner-items. For example, the state manager 128 may be configured to generate, build, construct, or otherwise provide a stateful data object responsive to identifying an instance corresponding to a particular executable. The stateful data object may include data corresponding to each of the steps or processes of the workflow corresponding to the executable which are to be performed or detected for a particular instance. For example, the stateful data object may include data corresponding to particular fields of the data item from the data source 106 which are to be monitored for updates corresponding to particular triggers, actions which are to be performed corresponding to the triggers, etc. Each executable may correspond to a plurality of stateful data objects such that the items and inner-items corresponding thereto may include a respective stateful data object. When a monitored item includes new data objects which are received from a data source 106 and determined to be an instance of an executable, the state manager 128 may be configured to automatically generate a stateful data object for the item.

In some embodiments, the state manager 128 may be configured to generate a stateful data object for each executable for a particular monitored item corresponding thereto. For example, where a particular monitored item is used for a plurality of executables, the state manager 128 may be configured to generate a stateful data object for the monitored item for each of the plurality of executables. The stateful data object may include data corresponding to the executable (such as an executable ID), data corresponding to each of the triggers 208 and actions 210 corresponding to the executable, as well as data corresponding to the monitored item. An example of a stateful data object for a monitored item corresponding to an instance of an executable is shown in Table 1 below.

In the stateful data object shown in Table 1, the corresponding executable may be associated with a legal email intake workflow. The executable may be configured to automatically parse inbound legal email requests to determine whether the email includes a non-disclosure agreement request, employee agreement request, or other request. The executable may be configured to automatically generate responses with additional information, generate documents, or route the request to proper entities. For example, the executable may include a trigger corresponding to an incoming email, an action to perform natural language processing on the email, an action which determines the email corresponds to an employee agreement, an action which sends a form, a form filled trigger, an action which generates a document corresponding to the employee agreement using data from the form, and an action which shares the document.

As shown in Table 1 above, when a monitored item (e.g., an email exchange) includes new data item (e.g., an email) which is received by the data manager 112 and is determined to be relevant to a particular executable (e.g., corresponding to a legal email intake workflow), the data manager 112 may identify an instance of the particular executable. The state manager 128 may be configured to generate a stateful data object corresponding to the instance of the executable (e.g., for the particular email). The stateful data object may include an identifier corresponding to the executable (such as an executable ID corresponding to the executable). The state manager 128 may be configured to store the stateful data object in the encrypted database 108.

The trigger manager 118 may be configured to determine whether the new data item satisfies any triggers 208 corresponding to the executable. For example, the executable may include an item added trigger 208 corresponding to a new email. As such, the trigger 208 may be satisfied when a new item (e.g., an email) is received via the email exchange. In some embodiments, the item added trigger 208 may include a condition which indicates that the trigger 208 is satisfied when a new item is received and a field of the item includes a value corresponding to legal (e.g., an email address, a subject which includes the word "legal", etc.). As such, the item added trigger 208 may be satisfied when a new email which satisfies the condition is received via the email exchange. When the trigger manager 118 detects a trigger 208 which is satisfied, the trigger manager 118 may be configured to generate a flag or alert corresponding to the trigger 208. The state manager 128 may be configured to update the stateful data object corresponding to the data item to include data corresponding to the trigger 208 which is satisfied (e.g., a data entry within the stateful data object).

TABLE 1

Stateful Data Object

| Executable ID | | | | | | | EX102990 | | |
|---|---|---|---|---|---|---|---|---|---|
| Trigger1 ID | TR006 | Item | EXCH | Value | New EM | Time | Sep. 1, 2020 12:15:00 | | |
| Action1 ID | NL015 | Trigger ID | TR006 | Status | Complete | Time | Sep. 1, 2020 12:15:05 | | |
| Action2 ID | EA058 | Action1 ID | NL015 | Status | Complete | Time | Sep. 1, 2020 12:15:07 | | |
| Action3 ID | SF064 | Action2 ID | EA058 | Status | Complete | Time | Sep. 1, 2020 12:15:10 | | |
| Trigger2 ID | FF165 | Action3 ID | SF064 | Status | Wait | Time | Sep. 1, 2020 14:15:10 | | |

The data entry within the stateful data object may include an identifier for the trigger 208 (TR006), data corresponding to the monitored item (EXCH), data corresponding to the value which satisfied the trigger 208 (New EM), and a timestamp in which the trigger 208 was satisfied.

As noted above in Section 1 E and Section 3, when a trigger 208 is satisfied, the action manager 120 may be configured to automatically perform one or more actions 210. For example, when the trigger 208 described above is satisfied, the executable may include actions 210 for performing natural language processing on the email, determining that the email corresponds to an employee agreement, and sending a form. When each of the actions 210 are performed (e.g., by the action manager 120 or another component of the workflow management system 102), the state manager 128 may be configured to update the stateful data object to include a new data entry which identifies the action 210 performed, the previous action 210 or trigger 208, a status of the action 210, and a timestamp.

In some instances, the executable may include one or more steps which require some entity action (such as an entity coordination action 210, waiting for a form to be filled by an entity, etc.). The state manager 128 may be configured to maintain the status or state of the stateful data object to indicate that certain steps have yet to be performed. For example, as shown in Table 1, following the form corresponding to the employee agreement being sent to a particular entity, the state manager 128 may indicate that the form filled trigger 208 corresponding to the form has a wait status. As such, the stateful data object may indicate a real-time or near real-time status or state of the executable. Once the form filled trigger 208 is satisfied (as detected by the trigger manager 118), the state manager 128 may be configured to update the status of the data entry corresponding to the form filled trigger 208 and a corresponding timestamp.

Section 6. Data Objects

The workflow management system 102 may include a data object manager 129. The data object manager 129 may be or include any device, component, or element designed or implemented to generate a data object corresponding to a track, process, or instance of a workflow. The data object manager 129 may be configured to generate a data object responsive to an event from a queue causing a monitored item condition of a workflow to be satisfied. As described briefly above, when a workflow is configured, a user may establish or select a data source and identify fields of the data source which the workflow management system 102 is to intake. The fields may be fields which are used for configuring the workflow. The user may define a monitored item condition for generating a data object. The monitored item conditions may be defined in relation to a particular field in the data source, a combination of fields, and so forth. The data object manager 129 may be configured to identify a change of a field in the local data sources 132 corresponding to the event.

When an event is published to a queue, the populator 602 (of FIG. 6) may be configured to identify fields corresponding to the event (e.g., in the event itself, or in the local data sources 132). The populator 602 may be configured to populate the local data sources 132 with the data corresponding to the event. The populator 602 may be configured to identify any monitored item conditions in relation to the fields which were updated/populated in the local data sources 132 (e.g., by performing a look-up using the fields in a list of monitored item conditions in association with fields used for defining the respective monitored item). The data object manager 129 may be configured to evaluate the value for the field(s) against the monitored item condition to determine whether the monitored item condition is satisfied. If the monitored item condition is satisfied, the data object manager 129 may generate a data object.

In some embodiments, the data object may include a plurality of field-value pairs corresponding to each of the fields used in or otherwise defined in the workflow (including field-value pairs corresponding to custom or formula-based fields, or fields of any matched entities). As subsequent events are identified in the queue as being updates to fields in data objects, the data object manager 129 may be configured to perform a look-up in the data objects to identify any data objects which include that field. The data object manager 129 may update the value for the field according to the update to the local data source 132. In some embodiments, the trigger manager 118 may use the initial (and subsequently, the updated) values of the data object to evaluate or determine whether any triggers of the workflow corresponding to the data object are satisfied. As subsequent updates to field-value pairs in data objects are incorporated, triggers may correspondingly be satisfied, thereby providing for asynchronous detection of triggers without having to maintain any state of execution of a workflow or process.

By maintaining data objects, trigger hierarchies, field-to-trigger mappings, and other data structures as set forth herein, the workflow management system 102 can asynchronously detect events and determine whether triggers are satisfied without having to maintain or track the state of a workflow, which reduces computational resources. Additionally, since the data objects include multiple fields which are updated in a real-time basis based on detected events published from a third-party data source or periodic collection process, the workflow management system 102 may re-evaluate triggers on a rolling basis which are independent of previous determinations as to whether triggers have been satisfied. Furthermore, since the fields are included in the data objects, the workflow management system 102 may quickly and efficiently map an update to a field to each of the data objects without having to perform brute-force analysis of data objects.

In some embodiments, a method may include identifying, by one or more processors, a first update to a first item of a data source that satisfies a monitored item condition of a workflow; generating, by the one or more processors, responsive to the monitored item condition being satisfied, a data object for the workflow, the data object including a plurality of field-value pairs corresponding to the first item; determining, by the one or more processors, based on values of at least one of the plurality of field-value pairs of the data object, that a first trigger condition corresponding to a first trigger of the workflow is satisfied; performing, by the one or more processors, a first action of the workflow responsive to the first trigger condition being satisfied; identifying, by the one or more processors, a second update to the first item of the data source; determining, by the one or more processors, that the second update corresponds to a field of the data object; updating, by the one or more processors, the data object based on the update to the second item; determining, by the one or more processors, based at least on a value for the field of the data object, that a second trigger condition corresponding to a second trigger of the workflow is satisfied; and performing, by the one or more processors, a second action of the workflow responsive to the second trigger condition being satisfied.

In some embodiments, the method may include determining, by the one or more processors, a hierarchy of the first trigger relative to the second trigger using a graph including the hierarchy of triggers based the workflow. In some embodiments, the method may include determining, by the one or more processors, using a mapping between fields and triggers generated based on the workflow, a second trigger defined in the workflow that uses the first field of the one or more fields; determining, by the one or more processors, using the graph, that an execution order of the second trigger does not satisfy a second execution order condition; and responsive to determining that the execution order of the second trigger does not satisfy the second execution order condition, restricting, by the one or more processors, determining that the value of the first field satisfies the second trigger condition of the second trigger. In some embodiments, the method may include identifying, by the one or more processors, an update to a second item of the data source that satisfies the monitored item condition of the workflow; and generating, by the one or more processors, a second data object for the workflow corresponding to the update to the second item of the data source.

Section 7. Generating and Managing Reports

The workflow management system 102 may include a report manager 130. The report manager 130 may be configured to generate one or more reports which correspond to a particular executable or set of executables. Referring now to FIG. 7, depicted is an example report 700 corresponding to one or more executables, according to an illustrative embodiment. As shown in FIG. 7, the report manager 130 may be configured to generate the reports 700 to include data corresponding to monitored items, inner items, various data columns, and metrics. In the example shown in FIG. 7, the report 700 may correspond to Tier 1 Accounts from SALESFORCE. Each row may include data corresponding to a monitored item 702 (e.g., a monitored account). The sub-rows within a main row may include monitored inner-items 704 (e.g., steps or sub-tasks for performing a main task corresponding to the monitored item 702).

The report 700 may include various columns 706 of data for each row. As such, each row may include data corresponding thereto represented in various columns 706. The data which is included in the columns 706 may be or include values from the data source 106, variable or computed data (e.g., according to a formula) generated by the action manager 70, user-defined data, a status of monitored items (and inner-items), etc. The report manager 130 may be configured to compile the data for populating the report 700. In some embodiments, the columns may be configurable by a user. For example, the interface manager 110 may be configured to provide an interface for selecting which columns are to be included in the report 700. For example, a user may select the columns from a drop-down menu. In some embodiments, a user may define data which is to be included in a column (e.g., by providing a formula corresponding to two fields or data from two columns, for example).

In some embodiments, the report 700 may include filters or sort options for each column. For example, a user may select an option to filter monitored items by which items are currently pending or in the negotiation stage, have a value exceeding a certain dollar amount, have an NPS score exceeding a certain value, etc. As such, a user viewing the report 700 may quickly navigate to a specific subset of items and inner-items using the filters.

In some embodiments, the report 700 may include metrics 708. The metrics 708 may include custom or key data which relates to the report 700. The metrics 708 may provide an overview or summary of various data included in the report 700. The interface manager 110 may be configured to provide an interface for defining the metrics 708 included in the report 700. In some embodiments, the metrics 708 may be computed according to a user-defined formula (e.g., average NPS score, active users, total amount in an opportunity pipeline, time difference in support ticket cases between different tiers of accounts, etc.). The metrics 708 may be color-coded according to user selection and preferences. Once the inputs for configuring metrics 708 are received via the interface manager 110, the report manager 130 may be configured to generate the metrics 708 for including in the reports 700.

In some embodiments, some actions or executables may be performed responsive to data from various reports 700. As such, an executable may use data from reports 700 as a monitored item. As one example, a trigger 208 may be defined to be satisfied according to data generated for a report 700 (such as a trigger 208 being satisfied where a metric 708 corresponding to total amount in an opportunity pipeline from SALESFORCE being less than a predetermined threshold). The corresponding actions 210 may include generating alerts for particular sales team members or sales managers.

Section 8. Methods for Generating an Executable and Maintaining a Stateful Data Object The present disclosure relates to a graphical user interface based programming language for automating workflows. In particular, the present disclosure describes systems and methods for providing a graphical user interface that can be used to identify objects and design a workflow corresponding to a process. The systems and methods described herein can then compile the workflow presented via the graphical user interface into an executable, which can then be executed on one or more devices. The executable can be configured to automate the workflow corresponding to the process by accessing data from one or more data sources, communicating instructions to one or more systems, and analyzing data received via the one or more systems to update one or more stateful data objects corresponding to respective instances of the executable. The stateful data objects can be used to maintain a state of the instance and enable the device to track the progress along the process.

Figure 8:
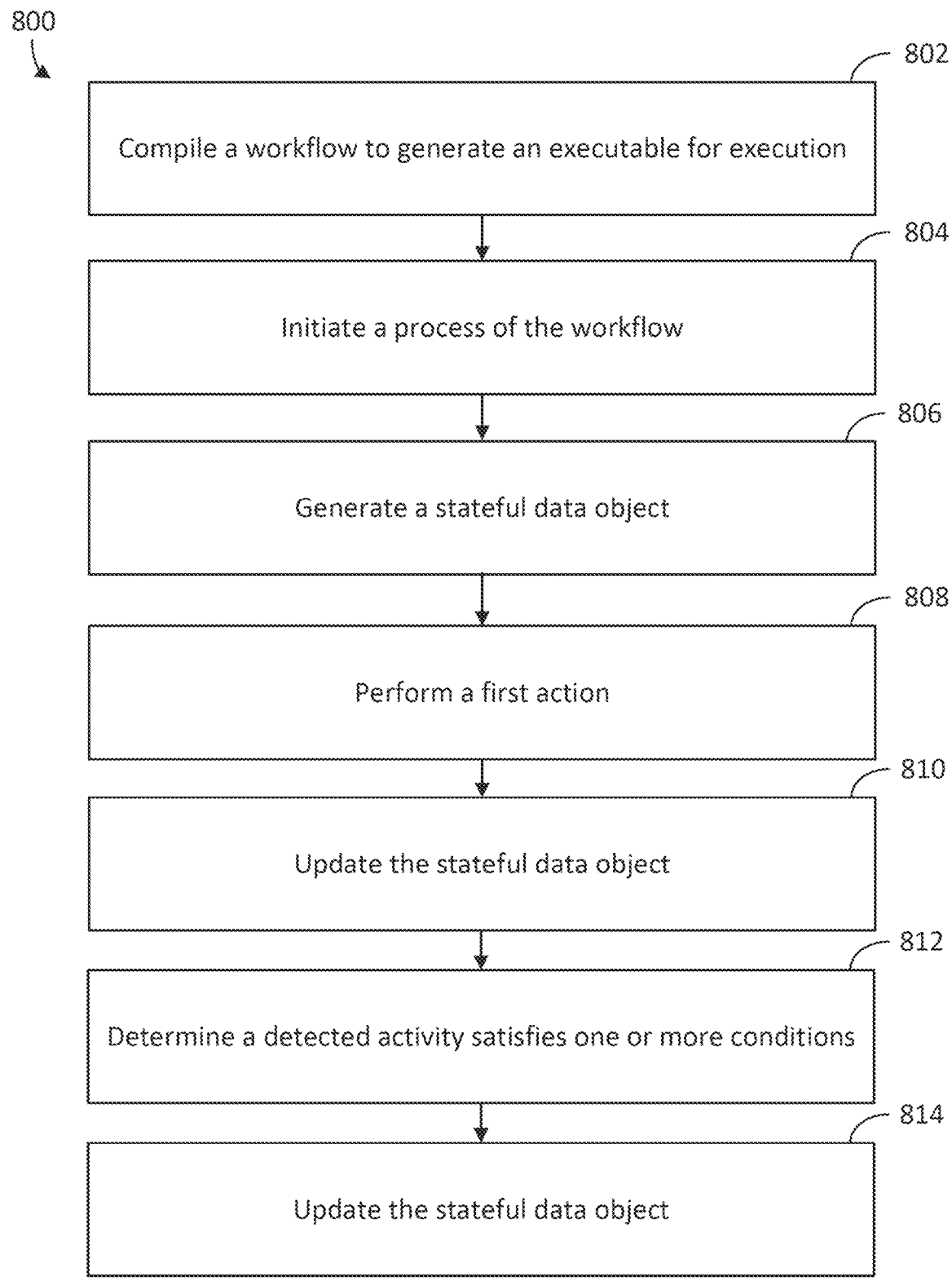
FIG. 8 is an example flowchart for implementing a graphical user interface-based programming language for automating workflows, according to an illustrative embodiment.

Referring now to FIG. 8, depicted is a block diagram of an example method 800 for maintaining stateful data context of data objects to manage asynchronous workflows, according to embodiments of the present disclosure. The method 800 can be implemented or performed using any of the components described above in conjunction with FIGS. 1-7 (e.g., the workflow management system 102). In brief overview, a device (e.g., the workflow management system 102) can compile a workflow to generate an executable for execution (802); initiate a process of the workflow (804); generate a stateful data object (806); perform a first action (808); update the stateful data object (810); determine a detected activity satisfies one or more conditions (812); and update the stateful data object (814).

The device can compile a workflow to generate an executable for execution (802). The workflow can include a trigger condition and a plurality of sequential actions that may be performed responsive to the trigger condition being satisfied. The device can initiate a process of the workflow (804). The device may initiate the process of the workflow in response to determining that an event for a monitored item of a data source satisfies the trigger condition of the workflow. The device can generate a stateful data object (806). The device can generate the stateful data object for the process initiated by the event. In some implementations, the stateful data object may track a progression of the process of the workflow. The device can perform a first action (808). The device can perform the first action in response initiating the process. The first action may be an action of a plurality of sequential actions of the workflow. In some implementations, the first action may be to transmit a notification to a client device to perform a requested activity. The device can update the stateful data object (810). The device can update the stateful data object to identify that the first action was performed.

After updating the stateful data object, the device can determine that a detected activity satisfies one or more conditions of the requested activity (812). The device can perform a second action of the plurality of sequential actions (814). The device can perform the second action in response to determining the detected activity satisfies the one or more conditions. The second action may be an action of the plurality of sequential actions that the device may select and/or perform based on the detected activity. The device can update the stateful data object to identify that the second action was performed (816).

A process can include multiple steps to be performed by multiple entities during various stages of a lifecycle of the process. In attempting to automate a process that invokes multiple electronic systems that do not share full data context with one another, various challenges arise. In particular, these systems may not have all of the information required to execute a decision or even if they have access to such information, these systems are unable to understand the context of the information to correctly execute the decision. In addition to the lack of context, existing systems that are configured to automate processes are unable to maintain a state of a process, i.e., in an asynchronous process in which different stages are performed at different times subject to the satisfaction of different conditions, the system may be unable to track which stage of the process the process is in. This is in part because such systems that attempt to automate processes do not maintain a stateful data object that is persistent and maintains information throughout the lifecycle of the process.

Figure 9:
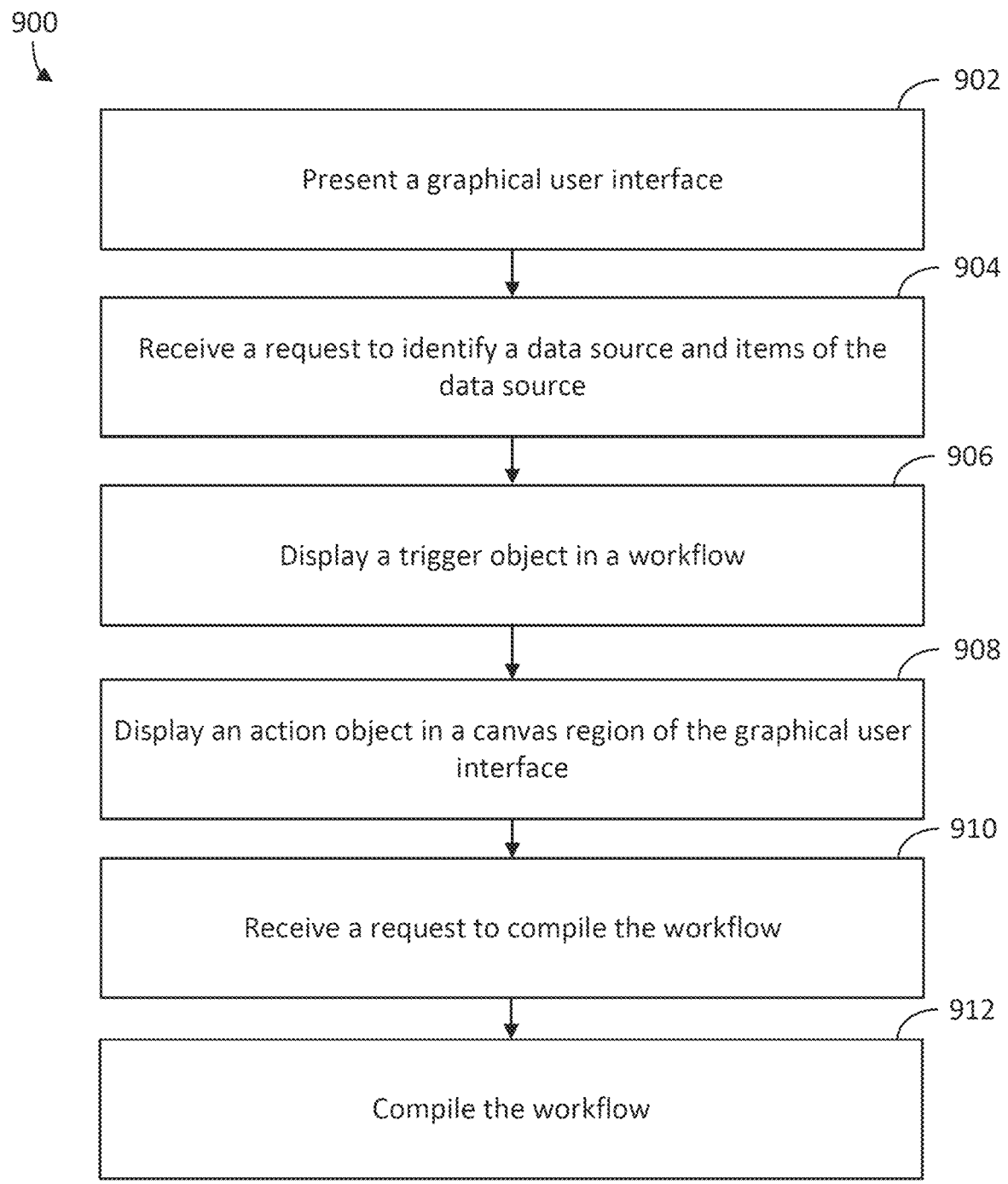
FIG. 9 is an example flowchart for maintaining stateful data context of data objects to manage asynchronous workflows, according to an illustrative embodiment.

Referring now to FIG. 9, depicted is a block diagram of an example method 900 for maintaining stateful data context of data objects to manage asynchronous workflows, according to an illustrative embodiment. The method 900 can be implemented or performed using any of the components described above in conjunction with FIGS. 1-7 (e.g., the workflow management system 102). In brief overview, a device (e.g., the workflow management system 102) can present a graphical user interface (902); receive a request to identify a data source and items of the data source (904); display a trigger object in a workflow (906); display an action object in a canvas region of the graphical user interface (910); and compile the workflow (912).

The device can present a graphical user interface (902). The device can present the graphical user interface to a client device. The graphical user interface can include a canvas region for displaying relationships between graphical objects and a configuration region for configuring each of the graphical objects. The device can receive a request to identify a data source and items of the data source (904). The device can receive the request based on one or more user actions at the client device on the graphical user interface. The request may include a request to identify a data source and one or more items accessible via the data source. The device can display a trigger object in a workflow (906). The device can display the trigger object in response to a request to insert a trigger object into a workflow corresponding to a process displayed in the canvas region. The device can display one or more trigger configuration settings in the configuration region that are configured to receive one or more values for defining one or more conditions. Upon being satisfied, the one or more conditions may cause a trigger corresponding to the trigger object to be satisfied.

The device may display an action object in the canvas region of the graphical user interface (910). The device may display the action object in response to receiving a request to insert an action object in the workflow downstream from the trigger object. The device may also display the one or more action configuration settings in the configuration region. The one or more action configuration settings may be configured to receive one or more values for defining an action that corresponds to the action object. The action may be performed in response to the determining that the trigger is satisfied. The device may display a request to compile the workflow (912). In some implementations, compiling the workflow may mean to generate an executable.

The device may compile the workflow (914). The device may do so using the one or more values for the trigger configuration settings of the trigger and the received one or more values for the configuration settings of the action to generate the executable. The executable may be compiled such that it may be instantiated by one or more devices (e.g., a server).

In some implementations, when a device instantiates the executable, the executable may cause the device to monitor one or more items of the data source identified in the executable for an event that satisfies the one or more matched item conditions corresponding to the workflow. The device may initiate a process of the workflow corresponding to the event in response to determining the event satisfies the trigger. In some implementations, initiating the process may include performing an action in response to the trigger being satisfied. The device maintain a stateful data object corresponding to the process of the workflow. Such a stateful data object may be updated to track a progression of the process of the workflow.

Section 9. Systems and Methods for Automated Check-In Messages Based on Historical Activity Data The present disclosure relates to systems and methods for determining optimal times to transmit automated check-in messages based on historical activity data. According to embodiments described herein, the systems and methods described herein can provide objective insights into optimal times to send a check-in message to one or more user entity accounts. The systems and methods described herein may make such a determination by monitoring selected fields of root monitored items that correspond to various types of data in data sources. The systems and methods described herein may use values from the monitored fields of the root monitored items as an input into a machine learning model to determine to cause messages to be transmitted to user entity accounts that are linked or otherwise associated with the root monitored item. The machine learning model may be trained for a user entity account based on whether the user entity account responded to the message and characteristics of the user's response. The machine learning model may be trained using data for the user entity account across root monitored items to allow for large diverse sets of training data. Consequently, over time, the machine learning model may more accurately output a time to send the user entity account a message to elicit a timely response for multiple root monitored items.

Systems that implement the systems and methods described herein may do so to minimize network traffic. For example, when a manager wishes to learn an update related to a root monitored item, the manager may transmit message after message to each user entity account that is associated with the root monitored item until each user entity account responds to the message. In today's busy world, it may take varying amounts of time until the manager receives a response to any of these messages, which can often cause the manager to send follow-up messages. Such may be the case, for example, when the root monitored item is a record object of a particular data source that corresponds to an opportunity for which the manager is tracking its progress. Because the manager may send messages to various user entity accounts and may often send follow-up messages after not receiving a response, the manager may clog the network as well as the electronic account of both the sender and recipient with follow-up emails. By implementing the systems and methods described herein, the system can avoid such network clogging because the machine learning model can use data of a root monitored item, such as a record object, to determine to transmit messages at optimized times to receive a response from individual user entity accounts. Consequently, the manager or an electronic account of the manager may not need to send as many messages and clog the network with follow-up after follow-up for a large number of users.

In a similar vein, by implementing the systems and methods described herein, a system may assist with data management at a data source. Each time a manager sends a follow-up email, the email may be stored in both an email storage server of the user entity account of the manager and an email storage server of the receiving user entity account. Each email may take up memory of the respective storage server, which can eventually cause the memory of the storage server to run out of space and for a user to either obtain another server for storing emails or prune the email accounts of emails. By determining to send emails at times in which a user entity account is most likely to respond, the system implementing the systems and methods described herein may enable the manager to send fewer follow-up emails and cause fewer emails to be stored in memory of the respective storage servers. Various other benefits are described in greater detail below.

Furthermore, the systems and methods described herein provide for a non-conventional non-routine method of determining times to send (and, in some cases, sending) check-in messages. For example, conventional systems may statically evaluate data and determine when to send check-in messages. The system described herein, however, is dynamic and non-conventional because it relies on changes to record objects or items on external systems and/or within a local data source that mirrors such external systems to determine when to send check-in messages. The logical arrangement of the system may receive additional inputs from external systems and use updates at the external systems as triggers of workflows to modify when to send a check-in message to a user. The updates may further be used as a training mechanism to train a machine learning model to make more accurate predictions (in some cases for an individual user) in the future. Thus, the system described herein may determine when to send a check-in message to a user based on dynamically updated information that is retrieved from multiple sources and a real-time evaluation (e.g., an evaluation by the populator 602), which is unconventional and something existing conventional systems are not able to do or do not do.

Figure 10:
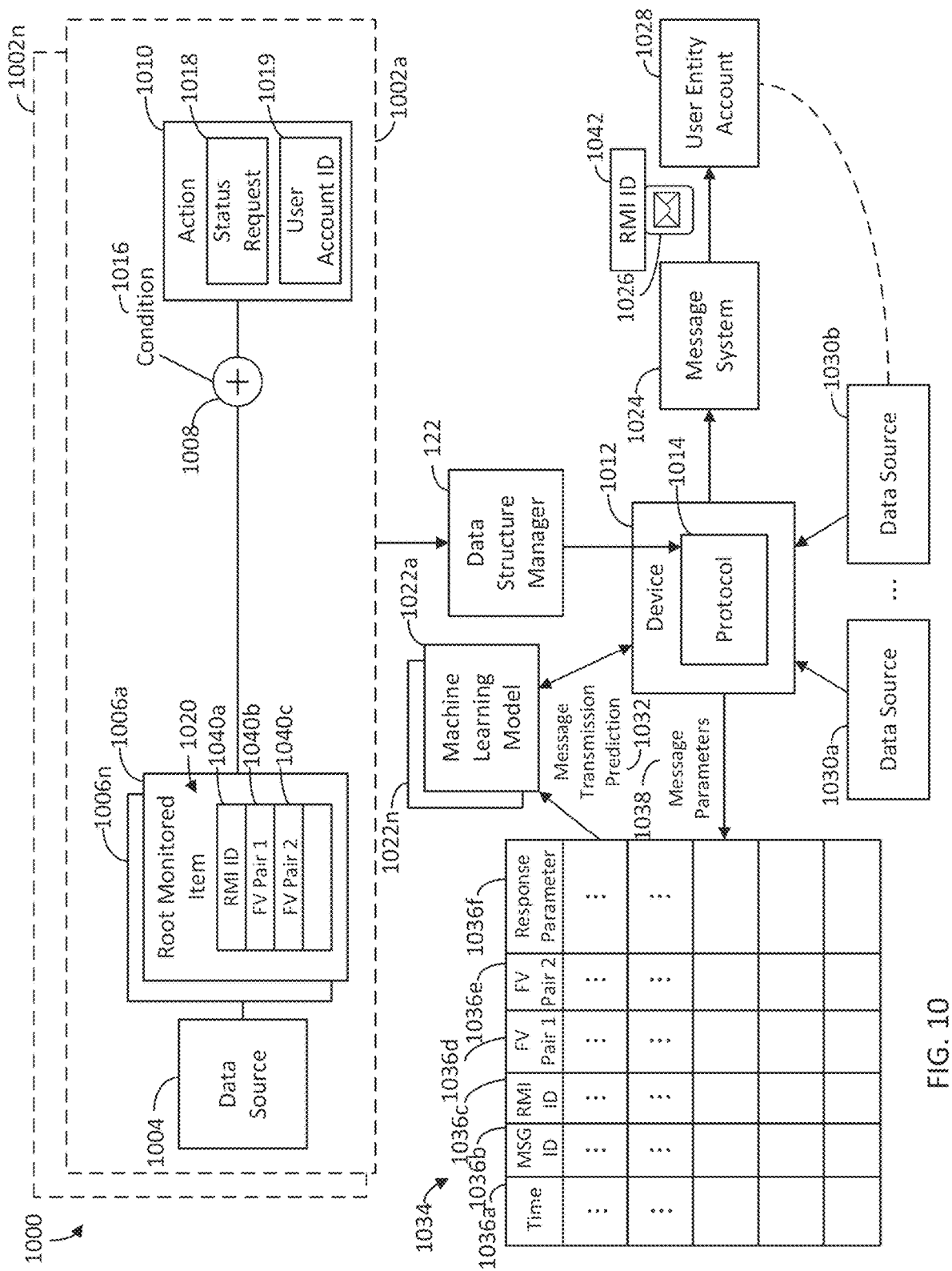
FIG. 10 is an example system for automated check-in messages based on historical activity data, according to an illustrative embodiment.

Referring now to FIG. 10, depicted is a use case diagram of a system 1000 for automated check-in messages based on historical activity data. The system 1000 may include a plurality of workflows 1002a-1002n (generally referred to as workflows 1002 or workflow 1002). The workflow 1002 may include a representation of a data source 1004, root monitored items 1006a-n (generally referred to as root monitored items 1006 or root monitored item 1006), a trigger 1008, and an action 1010. The system 1000 is also shown to include a device 1012 and the data structure manager 122. The data structure manager 122 may generate and/or update one or more data structures (e.g., the custom trigger data structure 134, the trigger hierarchy 136, the field-to-trigger mapping 138, and the field-to-field mapping 140) based on the data and/or objects identified in the workflow 1002. Such data structures may be used upon a detection of an event to determine if triggers of the workflow 1002 are satisfied and/or whether to perform an action identified in the workflow 1002, as described herein. In brief overview the device 1012 may monitor the root monitored item 1006 and determine when a trigger condition 1016 of the trigger 1008 is satisfied. Upon determining the trigger condition 1016 is satisfied, the device 1012 may execute the action 1010. Execution of the action 1010 may cause a change in state of the action 1010 to a status request state 1018. Responsive to executing the action 1010 in the status request state 1018, via the protocol 1014, the device 1012 may input values of a set of field-value pairs 1020 into one of machine learning models 1022a-1022n (generally referred to as machine learning model 1022 or machine learning models 1022). The machine learning model 1022 may output a time for the device 1012 to cause a message to be transmitted to a user entity account 1028. Responsive to receiving such an output and at the output time, the device 1012 may transmit a signal to a message system 1024. Receipt of the signal may cause the message system 1024 to transmit a message 1026 to the user entity account 1028. In some instances, the message 1026 may be a check-in to determine a status update for the root monitored item 1006.

The systems and methods described herein may use, be implemented within, or be a component of the systems described above. For example, the workflow management system 102 may execute the data structure manager 122 of the workflow management system 102 to generate the data structures (e.g., the data structures 124) that correspond to the protocol 1014 of the device 1012 based on the workflow 1002. In this regard, the workflow management system 102 may execute the interface manager 110, the trigger manager 118, the action manager 120, and the data structure manager 122 to generate and use data structures for the workflow 1002 to determine when and/or if to perform actions identified in the workflow 1002.

The device 1012 may be any device that includes a processor and memory. The protocol 1014 may be stored within memory of the device 1012 and maybe or include a specific version of the workflow 142. In some embodiments, the device 1012 may be the workflow management system 102. In other embodiments, the device 1012 may be a third device that receives the protocol 1014 from the workflow management system 102 and stores the protocol 1014 in memory. In such embodiments, the processor of the device 1012 may retrieve the protocol 1014 from memory and generate data structures to facilitate the sequence of the protocol for determining whether to perform an action. In some embodiments, the device 1012 may include a display with which the protocol 1014 may display a user interface. The device 1012 may be any type of computer.

The protocol 1014 may comprise instructions that correspond to the objects or modules of the workflow 1002. For example, the data source 1004, the root monitored item 1006, the trigger 1008, and the action 1010 may each be objects or modules that correspond to instructions of the workflow 1002. The device may execute the instructions that correspond to objects or modules 1004-1010.

The data source 1004 may be an object or module of the workflow 1002 that indicates a data source (e.g., data sources 1030*a*-1030*b*, generally referred to as data source 1030 or data sources 1030) for which the device 1012 monitors for data or changes in data. For example, the data source 1004 may be storage components or facilities of ASANA, SALESFORCE, SLACK, OKATA, TABLEAU, GREENHOUSE, GOOGLE SHEETS, GOOGLE DRIVE, GITHUB, BITBUCKET, TEAMWORK, GITLAB, WUNDERLIST, WRIKE, BASECAMP, MONDAY, KANBANIZE, HARVEST, ZUORA, NAMELY, SQL, GOOGLE ANALYTICS, and so forth. The device 1012 may monitor any of these data sources such as by polling the data source 1004 at set or random intervals. In some instances, the data sources 1004 may transmit data to the device 1012 at set or random intervals or upon detecting a change to a field-value pair of an item of the data source. The device 1012 may interface with the data source 1004 via an API (e.g., API 114) or a webbook (e.g., webhook 116). An identifier (e.g., an address) of the data source 1004 of the workflow 1002 may be input by a user as a data source for the device 1012 to monitor for data and/or changes in data.

The root monitored item 1006 may be an object or module of the workflow 1002 that represents an item of the data source 1004 for the device 1012 to automatically monitor for data or changes in data. For example, the root monitored item 1006 may be a Salesforce database, a record object such as an opportunity record object of a Salesforce database, a cell of an Excel spreadsheet, a cell of a Google Sheet, an email of an email exchange server, an email account, etc. The root monitored item 1006 may include a set of field-value pairs 1020 that includes monitored field-value pairs 1040*a*-*c* that correspond to different types of data of the root monitored item 1006, which a user has selected to be monitored. For example, if the root monitored item 1006 is an opportunity record object, the root monitored item 1006 may have field-value pairs associated with the opportunity record object such as, but not limited to, due date, amount, estimated time of completion, severity of the current status, type of the current status (e.g., done, active, risk, on-hold, etc.), etc. In some embodiments, another field-value pair of the root monitored item 1006 may be a root monitored item identification of the root monitored item 1006. For example, a root monitored item identification may be a title, label, or number of the root monitored item 1006.

In some embodiments, the device 1012 may monitor selected field-value pairs of the root monitored item 1006 (e.g., monitor the field-value pairs for updates). For example, the device 1012 may monitor a field-value pair that corresponds to the current status of the root monitored item 1006. By monitoring the current status field-value pair, the device 1012 may detect changes in status of the field-value pair. The device 1012 may not monitor field-value pairs of the root monitored item 1006 that were not selected to be monitored. The device 1012 may select the field-value pairs to monitor based on a user input when the workflow 1002 was generated.

In some embodiments, the root monitored item 1006 may include custom fields. Custom fields may be fields of the root monitored item 1006 that were created by the user who created the workflow 1002 via user inputs. The custom fields may be specific to the root monitored item 1006 and may not be common across all root monitored items 1006. Examples of custom fields may include dates, values, total billable hours, number of emails sent, number of emails received, average time between receiving emails, etc. Each custom field may be associated with a data type as selected by a user that identifies the type of data of the custom field. For example, a custom field may be a dates field. The dates field may have a date data type and may correspond to the last email that a user entity account sent or received or any other date. Custom fields may have any data type.

The trigger 1008 may be a trigger as generated by the trigger manager 118. The trigger 1008 may be any of a matched conditions trigger, a field changed trigger, an item added trigger, a form filled trigger, or an on-schedule trigger. Each of these triggers may correspond to a condition 1016 that, upon being satisfied, causes the device to perform the instructions of the action 1010. For example, the trigger 1008 may be an on-schedule trigger. The on-schedule trigger may comprise a condition that is automatically satisfied at a predetermined interval (e.g., five minutes, 10 minutes, 15 minutes, 30 minutes, an hour, a day, etc.). The device 1012 may execute an internal clock and determine each time an interval passes, that the condition 1016 of the trigger 1008 is satisfied and execute the instructions that correspond to the action 1010. In another example, the trigger 1008 may be a field changed trigger. The device 1012 may monitor a field of the root monitored item 1006 and, upon detecting a change to the field, determine the condition 1016 of the trigger 1008 is satisfied and execute the instructions that correspond to the action 1010. An example of a field that the device 1012 may monitor is a status field of a record object. The device 1012 may detect a change in the status field from "Active" to "Risk" and determine the condition 1016 is satisfied. In some embodiments, the device 1012 may determine the condition 1016 is satisfied responsive to detecting a change from a specific value to another specific value or responsive to any changes in values of a monitored field.

Upon detecting the condition 1016 is satisfied, the device 1012 may execute the instructions that correspond to the action 1010. The action 1010 may be an object or module that corresponds to a task, step or series of steps, or other form of an output which may occur based on the trigger 1008 being satisfied. The action 1010 may comprise the status request state 1018 and a user entity account ID 1019. The user entity account ID 1019 may be a user entity account address (e.g., an email address, a SLACK account identifier, etc.). The device 1012 may execute the instructions that correspond to the status request state 1018 to determine a time to transmit a signal to the message system 1024 to cause the message system 1024 to transmit a message to the user entity account 1028 and/or whether to transmit such a signal at the current time. To do so, by executing the instructions that correspond to the status request state 1018, the device 1012 may input values of field-value pairs of the root monitored items 1006 into the machine learning model 1022 along with a value of the current time. As will be described below, the machine learning model 1022 may output a time to send a message or a determination of whether to transmit a message to the user entity account 1028 at the current time based on the inputs.

The machine learning model 1022 may be or include a machine learning model such as random forest, neural network, support vector machine, etc. The machine learning model 1022 may be configured either as a binary classification system with possible binary outputs indicating whether to transmit a message at the current time or a multiclass classification model that can output specific times to transmit a message. Times may include times, days, and/or specific dates. If the machine learning model 1022 is a binary classification model, the machine learning model 1022 may be trained to output an indication of whether to transmit a signal to cause a message to be sent to the user entity account 1028 at the current time. If the machine learning model 1022 is a multiclass machine learning model, the machine learning model 1022 may either be configured to output transmission predictions for specific times and/or dates or for times and/or days into the future, in some instances including the current time. The machine learning model 1022 may be trained to have any configuration.

In some embodiments, the machine learning model 1022 may output prediction scores (e.g., probabilities that a potential time is the correct prediction) for potential times to transmit messages and select the time to transmit a message to output based on the prediction scores. The machine learning model 1022 may be configured to output prediction scores for different times and/or days based on values of an input feature vector. The machine learning model 1022 may output prediction scores for different times. The different times may correspond to times into the future from the current time, days of the week, times from the due date of the respective root monitored item, and/or any other time. The machine learning model 1022 may determine the prediction scores using its internal weights and/or parameters on the inputs of the feature vector. The machine learning model 1022 may identify the prediction score for each potential time and, in some embodiments, select the potential time with the highest prediction score as the time of an output message transmission prediction 1032. In some embodiments, the machine learning model 1022 may only select the potential time with the highest prediction score responsive to determining the prediction score exceeds or satisfies a threshold. Responsive to determining the potential time with a prediction score that does not exceed or satisfy the threshold, the machine learning model 1022 may output an error indicating a time could not be determined.

The machine learning model 1022 may be trained using training datasets such as training dataset 1034. The training dataset 1034 may include columns 1036a-f that contain values for rows that each correspond to an entry of message parameters (e.g., message parameters 1038) of a message that was sent to the user entity account 1028 and parameters (e.g., characteristics) of responses to such messages from the user entity account 1028. The messages of the entries of the training dataset 1034 may be or include previous messages that were automatically sent to the user entity account 1028 responsive to an output by the machine learning model 1022 indicating to transmit the user entity account 1028 a message. The machine learning model 1022 may output an indication to transmit such messages using feature vectors that include values of field-value pairs of the root monitored items 1006 of the workflow 1002.

In some embodiments, the machine learning model 1022 may be trained based only on data from messages and responses that were exchanged with the user entity account 1028. In such embodiments, the machine learning model 1022 may not be trained with data from other user entity accounts that may be associated with users with varying levels of responsiveness. The machine learning model 1022 may be trained using data generated using only data generated from messages transmitted to or received from the user entity account 1028. Consequently, the machine learning model 1022 may be uniquely trained based on the responsiveness of the user entity account 1028 to output times to transmit messages to the user entity account 1028 that will elicit a response regarding a root monitored item 1006.

The training dataset 1034 may be stored in one or more structures of the workflow management system 102 such as in the data structures 124 and/or the encrypted database 108. The device 1012 may update the training dataset 1034 after transmitting a signal to a message system (e.g., the message system 1024) to send the user entity account 1028 a message asking for a response. The device 1012 may identify values for the entries of the training dataset 1034 from the sent messages after identifying characteristics (e.g., time of the response, time between reception of the message and the response, length of the response, the language of the response, etc.) of the responses from the user entity account 1028 to such messages. The devices may do so using values for field-value pairs of any number of root monitored items.

The entries of the training dataset 1034 may include values for time (in column 1036a), message identification (in column 1036b), root monitored item identification (in column 1036c), a first field-value pair (in column 1036d), a second field-value pair (in column 1036e), and/or response parameters (in column 1036f). The time may be the time that a message was sent or output by the machine learning model 1022 to be sent to the user entity account 1028. The message identification may be an identification (e.g., a number) of the message. The root monitored item identification may be an address or other identifier of the root monitored item 1006 that a message was sent based on. For example, if a message was sent for a status update related to a monitored opportunity record object, the root monitored item identification may be an identification of the monitored opportunity record object. The root monitored item identifier may be the same as or otherwise correspond to the field-value pair 1040a of the root monitored item 1006. The first field-value pair may be a monitored field-value pair of a root monitored item. For example, the first field-value pair may be a monitored due date or a status type of the root monitored item. The first field-value pair of the column 1036d may be the same as or otherwise correspond to the monitored field-value pair 1040b of the root monitored item 1006. Similarly, the second field-value pair of the column 1036e may be a field-value pair that corresponds to the monitored field-value pair 1040c of the root monitored item 1006.

The response parameters of column 1036f may be characteristics of messages, if any, that the user entity account 1028 sent in response to the messages of the entries of the training dataset 1034. Examples of response parameters may include, but are not limited, a binary value indicating whether the user entity account 1028 responded, a length of time it took for the user entity account 1028 to respond, a time that the user entity account 1028 responded, a length of the message with which the user entity account 1028 responded, the content of the message with which the user entity account 1028 responded, etc. Each response parameter may correspond to a different column of the training dataset 1034. Values for any number of response parameters may be included in the training dataset 1034. In instances in which the user entity account 1028 does not respond to a message, the values for the response parameters may be zero or null.

Another example of a training dataset that can be input into the machine learning model 1022 is shown in Table 2 below.

TABLE 2

Training Dataset

| Time | MSG ID | RMI ID | Due Date | Current Status | Output Time | Response? | Response Time |
|---|---|---|---|---|---|---|---|
| March 1, 12:30 | 1704 | Acct. 15453 | June 2 | On-Hold | March 5, 8:30 | 1 | 20 Days |
| May 25, 12:30 | 1503 | Acct. 14865 | July 1 | Active | June 2, 11:30 | 0 | N/A |
| October 2, 14:00 | 0027 | Acct. 87652 | October 4 | At Risk | October 3, 10:00 | 1 | 30 minutes |
| December 1, 9:00 | 0105 | Acct. 87652 | December 19 | At Risk | December 9, 9:00 | 1 | One Day |

In the training dataset shown in Table 2, as described with respect to the training dataset 1034, each row under the category row may correspond to a different entry of the training dataset. The columns of the training dataset of Table 2 may include the Time Column, the MSG ID column, the root monitored item (RMI) ID column, the Due Date Column, and the Current Status column. The Time, MSG ID, and RMI ID columns may each correspond to the respective columns of the training dataset 1034. The Time column may be a current time column indicating when the machine learning model 1022 was received the values to output a time to send a message. The Due Date column and the Current Status column may each correspond to the field-value pairs of the root monitored item identified by the RMI ID of the respective row.

The Output Time, "Response?", and/or "Response Time" columns may be response parameters of the training dataset of the Table 2 that may be fed into the machine learning model 1022 for training. The Output Time column may represent the output time of the machine learning model 1022 based on the inputs or otherwise when a message of the entry was transmitted to the user entity account 1028. The "Response?" column may be a binary indicator of whether the user entity account 1028 responded. A value of one may indicate a response to the message and a value of zero may indicate the user entity account 1028 did not respond within a predetermined time period of the time the message was transmitted. The Response Time column may indicate a time it took user entity account 1028 to respond. Training datasets may include values for any field-value pair of root monitored items and any response parameters.

In some embodiments, to obtain values for response parameters of the training dataset 1034, devices such as the device 1012 may monitor the messages that the device sent in response to outputs of times transmit messages from the machine learning model 1022. The device 1012 may monitor the messages for actions that are taken based on the messages. For example, the device 1012 may monitor the messages to determine if the user sent a response message, whether the user updated a field-value pair of the message, or whether the user performed any other action. If the device 1012 detects that the user sent a response message, the device may identify the time and content of the response message and extract values from the response message to input as response parameter values into the columns of the entry that corresponds to the message that elicited the response from the user entity account 1028.

In some embodiments, the response parameters may include values determined using natural language processing techniques on the words of the response message. For example, a response message may include a string such as "no information to report." The device 1012 may use natural language processing techniques to determine a low value to input as a response parameter based on the user entity account indicating that there is not an update. In another example, a response message may include a large number of characters or words. A device may identify the large number of characters or words using natural language processing techniques and determine a high value to input as a response parameter. The values determined using natural language processing techniques may correlate with whether the prediction to send a message was correct or not during training of the machine learning model 1022.

To train the machine learning model 1022, the workflow management system 102 may input the entries of the training dataset 1034 into the machine learning model 1022. The values of the entries corresponding to the time, message identification, the root monitored item identification, the first field-value pair, and the second field-value pair may be input as a feature vector into the machine learning model 1022. In some embodiments, only the values of the time and field-value pairs may be input as a feature vector into the machine learning model 1022. The machine learning model 1022 may output a time of a message transmission prediction based on the values of each entry. A message transmission prediction may be an output time for the device 1012 to cause a message to be transmitted to the user entity account 1028. The response parameters of each entry may correspond to labels that indicate whether a prediction to transmit a message was accurate or correct. The machine learning model 1022 may output the prediction and adjust its internal weights and/or parameters based on the values of the response parameters.

For example, a response parameter of an entry may indicate that the user entity account 1028 never responded to a message that was transmitted based on field-value pair values of the entry. The response parameter may be fed into the machine learning model 1022 as a value that indicates that the output time of the machine learning model 1022 was the incorrect output. The machine learning model 1022 may adjust its weights or parameters according to the response parameters associated with a lack of a response to a message. In another example, a response parameter of an entry of the training dataset 1034 may indicate that the user responded with a low value determined via natural language processing. The low value may have been determined based on the user responding with a short answer or with language indicating that the user had nothing to report. The low value may indicate the output time of the machine learning model was incorrect. The low value may be fed back into the machine learning model 1022 as a label to the dataset that caused the machine learning model 1022 to output a time prediction that caused a message to be sent that corresponds to the low value. In another example, a response parameter of an entry of the training dataset 1034 may indicate that it took the user entity account 1028 a short amount of time (e.g., a few minutes) to respond. The response parameter may be fed back into the machine learning model 1022 and the machine learning model may adjust its weights and/or parameters based on the response parameter.

The device 1012 may detect responses to messages that were sent to the user entity account 1028 responsive to an output time by the machine learning model 1022 by monitoring items and/or data sources associated with the message. In some embodiments, the device 1012 may monitor (e.g., via webhooks) the message within the user entity account 1028 for any interactions with the message such as selections of buttons related to the message or indications that the user entity account 1028 responded to or otherwise opened the message. In cases in which the device 1012 monitors the user entity account 1028, the device may identify a response to the message from a sent folder of the user entity account and extract parameters from the response in the sent folder. In some embodiments, the user entity account 1028 may monitor a data source of a third user entity account to which the user entity account 1028 may transmit a response. In such embodiments, the user entity account 1028 may identify a response to the message in the data source of the third user entity account based on field-value pairs of the response such as field-value pairs that match the original message (e.g., the value of the subject line or the text in the body of the response). In some embodiments, the device 1012 may detect the response when the user entity account 1028 sends a response to the device 1012. The user entity account 1028 may do so in cases in which the device 1012 itself sends the message that elicits the response.

In some embodiments, the machine learning model 1022 may be trained using entries for messages that were generated based on field-value pairs of multiple root monitored items 1006 of the workflow 1002. By doing so, the machine learning model 1022 may avoid overfitting to data of a single root monitored item. For example, if the machine learning model 1022 is trained using response data associated with one monitored opportunity record object for which the user of the user entity account 1028 is excited, because of the user's excitement, the user may more proactively respond to messages that are sent to him. The users response times may not be applicable to other root monitored items 1006 for which the machine learning model 1022 may output messages transmission predictions. By using data that corresponds to multiple root monitored items 1006, the machine learning model 1022 may have diverse sets of data that helps avoid overfitting the machine learning model to one root monitored item 1006.

In some embodiments, the machine learning model 1022 may be trained to output times to transmit a message to elicit a response based on identified instances in which the user entity account 1028 is associated with an out-of-office status. For example the device 1012 may monitor the electronic calendar of the user entity account 1028. When the machine learning model 1022 determines the condition 1016 of the trigger 1008 is satisfied, the device 1012 may analyze the electronic calendar of the user entity account 1028 and identify any instances in which the person is listed as out of office. In some instances, the device 1012 may determine times the user entity account 1028 is out of office based on emails that the user entity account 1028 has sent. For example, the device 1012 may use natural language processing techniques on an email that the user entity account 1028 sent, which the device 1012 may access from a data source that received the email, that contains text stating "I will be out of office until September 29." Using the natural language processing techniques, the device 1012 may determine the user entity account 1028 has an out-of-office status from the current time until September 29. The device 1012 may input identifications of instances in which the user entity account 1028 is listed as out-of-office into the machine learning model 1022 in addition to the field-value pairs 1020 and the current time to obtain a message transmission prediction output from the machine learning model 1022. In some instances, the machine learning model 1022 may be trained to be less likely to output times to transmit a message for times in which the user entity account 1028 is listed as out of office because the user entity account 1028 may only respond to such messages when the user entity account 1028 is not associated with the out-of-office status.

In another example, the machine learning model 1022 may be trained to output times to transmit a message to elicit a response based on the number of calendar entries (e.g., scheduled meetings and/or appointments) in the electronic calendar of the user entity account 1028. The device 1012 may identify instances of meetings in the user entity account 1028 and use such instances as inputs into the machine learning model 1022. In some instances, for example, the machine learning model 1022 may be trained to be less likely to output times to transmit messages around times (e.g., within a threshold) in which there are a large number of calendar entries and/or more likely to output times to transmit messages around times in which there are fewer calendar entries.

In some embodiments, the machine learning model 1022 may be trained to weight calendar entries based on whether the calendar entries fall between the current time and a value of a due date field-value pair 1040$b$-$c$ of the root monitored item 1006. The machine learning model 1022 may determine or be weighted or trained so calendar entries that fall between the current time and the value of the due date field-value pair are more likely to impact whether the user entity account 1028 responds than calendar entries that fall outside of the time frame because the user entity may need to address both the message that is sent and the subject of the calendar entry for calendar entries between the two times. For example, the machine learning model 1022 may be trained to be more likely to output times to transmit messages to the user entity account 1028 at times before time periods in which there are a large number of calendar entries between the current time and the due date to give the user entity account 1028 adequate time to respond.

In some embodiments, the machine learning model 1022 may be trained to output times to transmit messages based on values of a monitored due date field-value pair 1040$b$-$c$ of the root monitored item 1006. To do so, the machine learning model 1022 may be trained to output such times based on differences between the current time and/or date and the value of a due date field-value pair 1040$b$-$c$ of the root monitored item 1006. For example, the machine learning model 1022 may be trained to be more likely to output times to transmit message for times in which there is a small amount of time between the current time and/or date and the time and/or date of the due date. For instance, the machine learning model 1022 may determine that the user entity account 1028 is more likely to respond to messages that are transmitted when the due date of the root monitored item 1006 is in two days rather than in two weeks. Consequently, the machine learning model 1022 may be more likely to output times to transmit message at times in which the due date is in two days rather than at times that are two weeks away from the due date. The machine learning model 1022 may be trained so that as the due date gets closer in time, the machine learning model 1022 is more likely to predict to transmit a message to the user entity account 1028. The machine learning model 1022 may be trained to output times to transmit messages to the user entity account 1028 based on calendar entries in any manner.

In some embodiments, the machine learning model 1022 may be trained to output times to transmit messages based on values of a monitored estimated time of completion field-value pair 1040*b-c* of the root monitored item 1006. To do so, the machine learning model 1022 may be trained to output such times based on differences between the current time and/or date and the value of an estimated time of completion field-value pair 1040*b-c* of the root monitored item 1006. For example, the machine learning model 1022 may be trained to be more likely to output times to transmit messages that are further from the estimated time of completion because the user entity account 1028 does not respond to messages at times and/or dates that are close to the estimated time of completion.

In some embodiments, the machine learning model 1022 may be trained to output times to transmit messages based on values of a monitored current status field-value pair 1040*b-c* of the root monitored item 1006. Examples of values of the current status field-value pair 1040*b-c* include, but are not limited to, a "Done" status, an "Active" status, a "Risk" status, and an "On-Hold" status. The machine learning model 1022 may identify the value of the current status field-value pair 1040*b-c* and use the value as an input. Based at least on the value of the current status field-value pair 1040*b-c*, the machine learning model 1022 may output a time to transmit a message indicating a time to transmit a message to the user entity account 1028. For example, the machine learning model 1022 may be trained to be more likely to predict to transmit messages at times closer to the current when the value of the current status field-value pair 1040*b-c* is "Risk."

In some embodiments, the machine learning model 1022 may be trained to output times to transmit messages based on values of a monitored severity of the current status field-value pair 1040*b-c* of the root monitored item 1006. The machine learning model 1022 may identify the value of the current status field-value pair 1040*b-c* of the root monitored item 1006 as described above and output a time to transmit a message based on a severity of the value of the current status. The machine learning model 1022 may determine the severity of the current status according to a severity policy that includes a set of rules and/or thresholds that correlate different statuses of the current status field-value pair 1040*b-c* with different severities. The machine learning model 1022 may determine the severity of a status according to the severity policy and output, using its internal weights and/or parameters, a time to transmit a message based on the determined severity.

For example, the machine learning model 1022 may identify the value of the current status field-value pair 1040*b-c* to be on-hold. The machine learning model 1022 may compare the on-hold value to the severity policy and determine the on-hold value corresponds to a medium severity. The machine learning model 1022 may use the determined medium severity along with other values of field-value pairs and the current time as input to output a time to transmit a message in a message transmission prediction.

In some embodiments, the machine learning model 1022 may be trained to output times to transmit messages to the user entity account 1028 based on an update to the root monitored item 1006 that caused the machine learning model 1022 to output the time (e.g., the update to the root monitored item that caused the condition 1016 to be satisfied and for the device 1012 to execute the instructions that correspond to the action 1010). For example, the machine learning model 1022 may output a time to transmit a message based on a change to the current status field-value pair 1040*b-c* of the root monitored item 1006. The machine learning model 1022 may identify the previous value of the current status field-value pair 1040*b-c* and the current value of the current status field-value pair 1040*b-c*. The machine learning model 1022 may output a time to transmit a message to the user entity account 1028 based on both of the identified values. In another example, the machine learning model 1022 may output a time to transmit a message based on a change to the due date field-value pair 1040*b-c*. The machine learning model may identify that the due date field-value pair changed to an earlier date. Based on the change to the earlier date, the machine learning model 1022 may output an earlier time to transmit a message to the user entity account 1028. The machine learning model 1022 may output a time to transmit a message based on changes to values of any field-value pairs 1040*b-c* of the root monitored item 1006.

In some embodiments, the machine learning model 1022 may be trained to output times to transmit messages to the user entity account 1028 based on the current time of day. For example, over time, the machine learning model 1022 may receive training data that indicates that the user entity account 1028 is more likely to respond to messages in the afternoon. Consequently, the machine learning model 1022 may be trained to be more likely to output times to transmit messages to the user entity account 1028 at times in the afternoon and less likely to predict to transmit messages in the morning. The machine learning model 1022 may be trained to make output times for any time of day.

Similarly, the machine learning model 1022 may be trained to output times to transmit messages to the user entity account 1028 based on the day of the week. For example, the machine learning model may be trained based on data that indicates that the user entity account 1028 does not respond to messages that were transmitted on weekends as often as messages that were sent early in the week (e.g., Monday or Tuesday). Consequently, the machine learning model 1022 may be trained to output times or dates for times that are earlier in the week. The machine learning model 1022 may be trained to make output times for any day of the week.

In some embodiments, the machine learning model 1022 may be trained to output times to transmit messages based on the time the device 1012 previously caused a message to be transmitted to the user entity account 1028. The machine learning model 1022 may identify the time from the training dataset 1034 or from a database of the device 1012. The machine learning model 1022 may determine a difference in time between the time of the previous message and the current time and output a time to send a message based on the determined difference. In some instances, the machine learning model 1022 may be more likely to output a later time responsive to a determined difference between the current time and time of the previous message being low. Consequently, the machine learning model 1022 may avoid causing the device 1012 to overflow the user entity account 1028 with messages by sending Determining the time to transmit messages to the user entity account 1028 based on a difference in time between a previous message and the current time may be beneficial in instances in which the user entity account 1028 did not respond to a check-in message that the device 1012 previously sent. After a predetermined amount of time passes after the device 1012 caused a message to be sent to the user entity account 1028, the device 1012 may determine a condition (e.g., the condition 1016 or another condition) of the trigger 1008 is satisfied and input a feature vector for the relevant root monitored item 1006 into the machine learning model 1022. The machine learning model 1022 may receive the input feature vector and output a new time to transmit a message to the user entity account 1028 based at least on the time that the previous check-in message was sent.

In some embodiments, the machine learning model 1022 may be trained to output times to transmit messages based on values of custom fields. The machine learning model 1022 may do so by identifying the data type of the custom field and evaluating values of the custom fields based on the data type to output a time to transmit a message. For example, if a custom field has a date data type, the machine learning model 1022 may use the values of the dates as inputs to determine or output the time to transmit a message to the user entity account 1028. The machine learning model 1022 may use similar techniques for custom fields of any data type.

In some embodiments, the machine learning model 1022 may be trained to output times to transmit messages based on values of field-value pairs of other root monitored items 1006 with which the user entity account 1028 is associated (e.g., other root monitored items 1006 of the workflow 1002). Upon receiving an indication to output a time to transmit a message to the user entity account 1028, the machine learning model 1022 may identify each root monitored item 1006 with which the user entity account 1028 is associated (e.g., the other root monitored items 1006 of the workflow 1002). The machine learning model 1022 may retrieve values from monitored field-value pairs of each of the root monitored items 1006 and determine the message transmission prediction 1032 based on the retrieved values.

Advantageously, by using values from the root monitored items 1006 with which the user entity account 1028 is associated instead of just the root monitored item 1006 for which the device 1012 is causing a message to transmitted, the machine learning model 1022 may have more information about the user entity account 1028 to output a time to transmit such a message. Such may be advantageous, for example, when the machine learning model 1022 has recently caused a message to be sent to the user entity account 1028 for another root monitored item 1006. For example, the machine learning model 1022 may be trained that the user entity account 1028 does not respond to messages for one root monitored item soon after receiving check-in messages for another root monitored item. Without using the data from each root monitored item 1006 of the workflow 1002, the machine learning model 1022 may cause the device 1012 to flood the user entity account 1028 with messages. However, by using the data from each root monitored item 1006 of the workflow 1002, the machine learning model 1022 may not output times to send messages for one root monitored item 1006 that are too close to times that messages are sent for another root monitored item 1006.

In another example, using values of field-value pairs of multiple root monitored items 1006 may enable the machine learning model 1022 to avoid outputting times to send messages that are too close to imminent due dates of other root monitored items 1006 or times in which the other root monitored items 1006 have an at risk current status. The machine learning model 1022 may be trained to do so, for example, based on training data that indicates that the user entity account 1028 is less or more likely to respond to messages for one root monitored item 1006 while another root monitored item 1006 has various certain statuses. The machine learning model 1022 may identify the values of the due date and/or current status field-value pairs of each of the root monitored items 1006 and output a time to transmit a message based on the identified values. In some instances, the machine learning model 1022 may be less likely to output a time to transmit a message to the user entity account 1028 for a first root monitored item 1006 that is close or within a threshold of a due date of a second root monitored item 1006 and/or while a third root monitored item 1006 has a field-value pair 1040*b-c* with an at risk status. The machine learning model 1022 may be trained to output times based on any values of any field-value pair 1040*b-c* of the root monitored items 1006 of workflow 1002.

In some embodiments, the machine learning model 1022 may be trained to output times to transmit messages based on the times that the user entity account 1028 responded to a message sent in response to previous messages that the device 1012 caused to be transmitted to the user entity account 1028. For example, the machine learning model 1022 may output a time to transmit a message to user entity account 1028 and, at the time, the device 1012 may transmit a signal to the message system 1024 to cause the message system 1024 to transmit a message. The device 1012 may determine the time the user entity account 1028 responded to the message as described above and input the time as training data to the machine learning model 1022. Based on the identified time of the response, the machine learning model 1022 may be trained to be more likely to output times to send messages at the time the user entity account 1028 responded.

In some embodiments, the machine learning model 1022 may be trained to output characteristics of the messages for the message system 1024 to transmit to the user entity account 1028. For example, the machine learning model 1022 may be trained to output a length of the message to transmit to the user entity account 1028 and/or whether to transmit such messages to the user entity account 1028 individually or in bulk with messages to other user entity accounts. In such instances, the machine learning model 1022 may be a binary or multi-classification machine learning model as described above. In some instances, for example, the machine learning model 1022 may be trained to learn that the user entity account 1028 is more likely to respond to messages that were sent to the user entity account 1028 individually and/or when the messages are shorter in length. Consequently, the machine learning model 1022 may be more likely to output indications to send short individual messages to the user entity account 1028. The machine learning model 1022 may be trained to output characteristics for any aspect of such messages.

In some embodiments, upon receiving an output time as the message transmission prediction 1032 from the machine learning model 1022, the device 1012 may store the output time in memory or in a database with an association with the user entity account 1028. The device 1012 may store a table or another data structure with times to cause messages to be transmitted to various user entity accounts of the workflows 1002. The device 1012 may monitor an internal clock and identify times in which the internal clock has a time that matches a time of the table. Upon identifying the times match, the device 1012 may cause a message to be transmitted to the respective user entity account 1028.

In some embodiments, the device 1012 may cause the machine learning model 1022 to output a new time to transmit a message to the user entity account 1028 for the root monitored item 1006 upon a change in values of a field-value pair of another root monitored item 1006 of the workflow 1002. For example, the device 1012 may store an indication to send a message to the user entity account 1028 for a first root monitored item 1006 at 10:00 PM of the current day. The device 1012 may identify a change in current status of a second root monitored item 1006 of the workflow 1002 from Active to At risk. Such a change may impact the time the device 1012 should transmit a message to the user entity account 1028 because the user entity of the user entity account may switch their attention to the second root monitored item 1006 with the changed status. The device 1012 may input values for the first root monitored item 1006 into the machine learning model 1022 and the machine learning model 1022 may output a later time than previously predicted. The device 1012 may cause the machine learning model 1022 to output times to transmit messages based on changes to any field-value pairs of any root monitored items 1006.

In some embodiments, the status request state 1018 of the action 1010 may also comprise instructions to generate and/or transmit instructions to the message system 1024 and the user entity account identifier 1019 at the time that is output by the machine learning model 1022. The user entity account identifier 1019 may be an identifier (e.g., an address) of the user entity account 1028. An identifier (e.g., an address) (not shown) of the message system 1024 may be input by a user into the object or module of the action 1010 to specify for the device 1012 to generate and transmit a signal to the message system 1024 upon execution of the instructions that correspond to the action 1010 in the status request state 1018. The signal may comprise the user entity account ID 1019, which indicates the user entity account for the message system 1024 to transmit a message.

In some embodiments, upon determining the internal clock of the device 1012 matches a stored output time in a database of the device 1012, device 1012 may transmit instructions to the message system 1024. The message system 1024 may be a server or other device of any message system that facilitates communication between entities such as an email exchange server, SLACK, Skype, Microsoft Teams, etc. The instructions may include a flag or setting indicating for the message system 1024 to transmit a message to the user entity account 1028 using the user entity account ID 1019. Such may be advantageous when a manager is trying to get a status update related to a root monitored item 1006 such as a status update for an opportunity record object from a user. The device 1012 may automatically cause the message system 1024 to transmit a message to the user entity account 1028 using the user entity account ID 1019. The device 1012 may cause the message system 1024 to generate a message and/or transmit the message 1026 to the user entity account 1028 with a question for such a status update.

In some embodiments, upon causing the message 1026 to be transmitted to the user entity account 1028, the device 1012 may monitor the message 1026 to determine whether and/or when the user entity account 1028 responded to the message 1026. Upon detecting a response or upon determining the user entity account 1028 did not respond to the message 1026 within a predetermined time period, the device 1012 may identify values of response parameters of the message (e.g., length of the message, time it took the user entity account 1028 to respond, the time that the user entity account 1028 responded, the content of the response, etc.).

The device 1012 may store an entry in the training dataset 1034 with message parameters 1038 that correspond to the message 1026. The message parameters 1038 may include the values that the device 1012 input into the machine learning model 1022 to obtain the output message transmission prediction 1032 to transmit the message 1026 and the values for the corresponding response parameters in the entry. The device 1012 may feed the entry into the machine learning model 1022 for training based on the message parameters 1038 using the input values as a feature vector and the response parameters as feedback. Consequently, the device 1012 may train the machine learning model 1022 in real-time as the machine learning model 1022 outputs times to transmit messages to the user entity account 1028 and device 1012 generates instructions that cause messages to be transmitted to the user entity account 1028.

In some embodiments, the device 1012 may store a message identifier in the message entry for the message 1026. The message identifier may be a number, word, phrase, value in a subject line, or any other value of the message 1026. In some embodiments, the message identifier may include an address including a pointer to the location the message 1026 is stored in one of the data sources 1030. The message identifier may enable the device 1012 or the machine learning model 1022 to identify the message from the data source 1030 and retrieve field-value pairs from the message 1026. Such may be advantageous when the machine learning model 1022 learns that a new field-value pair is important or relevant to outputting an accurate time to transmit a message to the user entity account 1028. For example, after being trained using message parameters of the message 1026, the machine learning model 1022 may learn that other fields, such as the subject line field of messages is important or relevant to outputting accurate times to transmit messages. The machine learning model 1022 may consequently identify the message identification of the message 1026 from the training dataset 1034 and retrieve the value of the subject line field of the message 1026. The machine learning model 1022 may update the entry for the message 1026 for the training dataset 1034 to include the retrieved value and input the new entry for training. The machine learning model 1022 may do so for any number of entries and/or messages.

In some embodiments, the message 1026 that the message system 1024 transmits to the user entity account 1028 may include or be tagged with a root monitored item identifier 1042 that identifies or corresponds to the root monitored item 1006 from which data was retrieved or collected for the machine learning model 1022 to output a time to transmit the message 1026. The root monitored item identifier 1042 may be any value, phrase, field-value pair, word, or string that identifies the root monitored item 1006. The root monitored item identifier 1042 may include or be the same as the value of the field-value pair 1040a of the root monitored item 1006. The root monitored item identifier 1042 may be a pointer or an address that the machine learning model 1022 may use to retrieve data from the root monitored item 1006. The message 1026 may include the root monitored item identifier 1042 to indicate to the user entity associated with the user entity account 1028 the root monitored item to which the message 1026 is referring.

In some embodiments, the message 1026 may include or be tagged with the root monitored item identifier 1042 for inclusion as an entry in the training dataset 1034. In some embodiments, similar to the message identifier, the machine learning model 1022 can identify the root monitored item 1006 from the root monitored item identifier 1042 from which the machine learning model 1022 may access and/or retrieve data. For example, the device 1012 may include the root monitored item identifier 1042 in the message parameters 1038 that the device 1012 stores in the training dataset 1034. The machine learning model 1022 may identify the root monitored item identifier 1042 from the entry of the training dataset 1034 that corresponds to the message 1026 to access the root monitored item 1006 and retrieve values of the field-value pairs 1020 of the root monitored item 1006. The machine learning model 1022 may use the retrieved values as inputs into the machine learning model 1022 for training. In some instances, the machine learning model 1022 may use the root monitored item identifier 1042 itself as an input.

In one example, the systems and methods described herein may enable a system to make sure to reach out to a user entity account associated with an opportunity at a time in which the system is most likely to get an answer, and ask for the most recent update on the opportunity. For instance, a manager managing an opportunity may seek to stay informed on the progress of the opportunity. The system may cause messages to be sent to user entity accounts based on outputs from the machine learning models associated with each user entity that indicate times to cause the messages to be transmitted. The device may identify responses to the transmitted messages. The system may extract data and/or text from the messages and post the data and/or text onto a live report for the manager to view to see the status of the opportunity according to the responses. The live report may display the responses and metrics about the responses from multiple user entity accounts that are associated with the opportunity so the manager can ascertain the status of the opportunity.

Other examples in which the systems and methods described herein may be implemented include instances in which managers or people seek to gather updates on a process that is being handled by other people. Examples of such processes include, but are not limited to, tracking development team tasks, tracking customer issues, tracking quality work, etc. In each instance, a machine learning model may be trained to predict times in which a person associated with the process is most likely to have an update on progress and/or timely respond.

Figure 11:
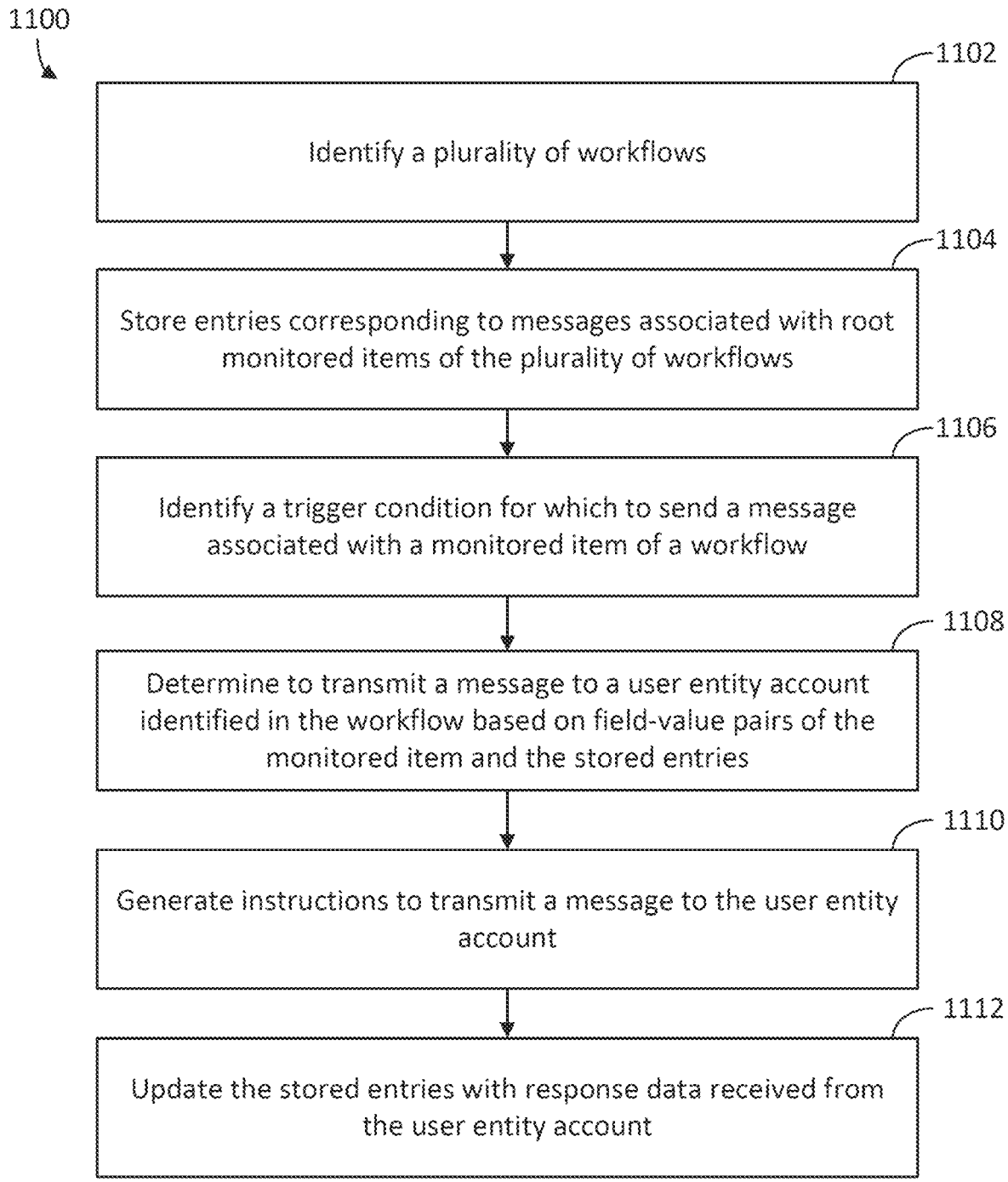
FIG. 11 is an example flowchart for automated check-in messages based on historical activity data, according to an illustrative embodiment.

Referring now to FIG. 11, depicted is a block diagram of an example method 1100 for automated check-in messages based on historical activity data, according to embodiments of the present disclosure. The method 1100 can be implemented or performed using any of the components described above in conjunction with FIGS. 1-10 (e.g., the workflow management system 102 or the device 1012). In brief overview, a data processing system can identify a plurality of workflows (1102); store entries corresponding to messages associated with monitored items of the plurality of workflows (1104); identify a trigger condition for which to send a message associated with a monitored item of a workflow (1106); determine to transmit a message to a user entity account identified in the workflow based on field-value pairs of the monitored item and the stored entries (1108); generate instructions to transmit a message to the user entity account (1110); and update the stored entries with response data received from the user entity account (1112).

In further detail, a data processing system (e.g., the workflow management system 102 or the device 1012) can identify a plurality of workflows (1102). Each workflow can comprise a plurality of objects or modules such as data sources, monitored items (e.g., root monitored items), triggers, and/or actions. The plurality of objects or modules (and relationships between may be added to data structures that corresponds to their respective workflow. The workflow my further comprise identifications of field-value pairs of one or more monitored items that the data processing system may monitor, in some cases in response to the field-value pairs being identified in the workflow. Each field-value pair may include a field and a corresponding value. The data processing system may monitor the field-value pairs for updates to the values of the field-value pairs.

A trigger of a workflow may have a condition. The condition may be satisfied upon the data processing system detecting a change to a monitored field-value pair of a monitored item of the workflow. The data processing system may input values of monitored field-value pairs of the monitored item and the current time into a machine learning model upon determining the condition is satisfied. The data processing system may receive an output message transmission prediction comprising an indication of a time to transmit a message to a user entity account identified in the workflow. The data processing system may cause a message to be sent at the indicated time and identify a response to the message.

The data processing system can store entries corresponding to messages associated with monitored items of the plurality of workflows (1104). The entries can include parameters collected from the messages that the data processing system caused the message system to send the user entity account. For each entry, the parameters may include a time, a message identifier, a monitored item identifier, values of field-value pairs of the respective monitored item, and response parameters. The time, message identifier, root monitored item, and field-value pairs may correspond to the inputs that the machine learning model used to output a message transmission prediction. The machine learning model may use the message identifier and/or the root monitored item identifier to identify values of the respective message or root monitored item as inputs. The response parameters may be characteristics of the user entity account's response to the message. The entries may be input to the machine learning model for training. The entries may each correspond to the same user entity account, enabling the machine learning model to be trained based on a responsiveness specific to the user entity account.

The entries may be used to train the machine learning model. For example, characteristics associated with the time, the message identifier, the monitored item identifier, and/or the values of the field-value pairs of a monitored item may be used as an input into the machine learning model in feature vectors corresponding to each entry. The machine learning model may output times to transmit messages to the user entity account identified in the workflow based on the entries. The values of the response parameters of the entries may be labels corresponding to response times, whether the user entity account responded, and/or the content of the responses that can be fed into the machine learning model for training based on whether the machine learning model provided the correct or a good time based on the input values that correspond to the response parameters. The machine learning model may be trained until it is accurate to a threshold.

The data processing system can identify a trigger condition for which to send a message associated with a monitored item of a workflow (1106). The trigger condition may be a condition that may be satisfied upon a determination by the data processing system that the event occurred. The trigger condition may be identified in the workflow as a value of a field of the trigger. The trigger condition may be a detection of a change in field-value pairs of a monitored item or the expiration of a pre-determined time period after a previous check-in message was transmitted to the user entity account and the data processing system did not detect a response.

The data processing system can determine to transmit a message to a user entity account identified in the workflow based on field-value pairs of the monitored item and the stored entries (1108). The data processing system can make such a determination responsive to determining the trigger condition of the trigger was satisfied. Upon determining the trigger condition is satisfied, the data processing system may execute an action of the workflow. The action may include instructions to determine a time to transmit a message to the user entity account of the workflow.

The data processing system may input a feature vector including values of field-value pairs of a monitored item (e.g., the monitored item in which a change to a field-value pair was detected or for which the data processing system did not detect a response to a previous message) and/or the current time. The machine learning model may process the feature vector and output an indication of a time to transmit a message to the user entity account. The data processing system may store the output time in memory or a database of the data processing system. The data processing system may determine to transmit a message to the user entity account upon determining the stored time for the root monitored time matches a time of an internal clock that the data processing system maintains and/or monitors.

The data processing system can generate instructions to transmit a message to the user entity account (1110). Upon determining to transmit a message, the data processing system can generate instructions to transmit a message to the user entity account. The data processing system can do so by executing further instructions that correspond to the action. The data processing system can identify the identification of the user entity account of the workflow and generate instructions to transmit the message to the user entity account based on the identification. The data processing system may transmit the message based on the generated instructions or the data processing system can transmit the generated instructions to a message system, thereby causing the message system to transmit the message. The message may include or be tagged with an identification of the monitored item for which the message is being sent (e.g., the monitored item from which values were used as input to the machine learning model to generate the output message transmission prediction) and/or values of monitored field-value pairs of the monitored item.

The data processing system can update the stored entries with response data received from the user entity account (1112). The data processing system can update the stored entries with an entry corresponding to the message that the data processing system caused to be sent to the user entity account. The entry may include message parameters such as the field-value pairs of the root monitored for which the message was transmitted and/or identifications of the message or monitored item. The entry may also include response parameters associated with characteristics of the user entity account's response. The new entry may be fed into the machine learning model for training.

In one example implementation, the data processing system can determine whether to send a "check-in" message using a data object that includes values for the monitored fields of a workflow. For example, a workflow may include one or more lists of fields (e.g., monitored fields) of monitored items that may be used to determine whether to send a check-in message. Such a list may be input by a user when the user creates the workflow. The data processing system may monitor the fields to detect changes in values at the fields. Upon detecting a change in a value (e.g., an event), the data processing system may aggregate the values for each of the fields into a data object such that the data object contains each of the values. The data processing system may then evaluate the values within the data object against the triggers of the workflow (e.g., evaluate the values against the triggers according to the trigger hierarchy of the workflow and/or the other data structures of the workflow). If the data processing system determines a trigger or set of triggers is satisfied, the data processing system may execute an action and input the values of the data object into a machine learning model trained to predict times to send check-in messages to different user accounts. The data processing system may retrieve a predicted time from the machine learning model. The data processing system may then transmit a message to the user account for which the message was generated at the predicted time.

Section 10. Systems and Methods for Improved Matching Between External Entity Items and Monitored Items Based on Updates The present disclosure relates to systems and methods for improved matching between external entity items and monitored items based on updates. In particular, the systems and methods described herein may identify an update to an external item, such as an update to a field-value pair of the external item, and based on the update to the external item, match the external item to a root monitored item corresponding to an instance of a workflow. Based on matching the external item with the root monitored item, the device running the instance of the workflow may be able to execute one or more additional actions defined in the instance based on the additional context made available to the device based on matching the external item with the root monitored item. In particular, the systems and methods described herein may monitor one or more first entity items for an update. The systems and methods described herein may determine an update to a first field-value pair of a first entity item. The systems and methods described herein may perform a lookup in a first root monitored item. The systems and methods described herein may match the first entity item with the first root monitored item based on the lookup. The systems and methods described herein may perform a first action specified in the workflow on the first root monitored item using the data corresponding to the update.

According to embodiments described herein, the systems and methods described herein can automatically connect root monitored items to monitored external items stored in external data sources based on updates to field-value pairs of the monitored external items. The systems and methods described herein may make such a determination by monitoring external items of specified types, ensuring any matched entities may have relevant data to the root monitored items and the system is spending computational resources monitoring items that may not provide relevant data to the root monitored items. The systems and methods described herein may detect an update (e.g., a change in values or otherwise a new value) to a monitored field of an external monitored item and determine the updated field matches a root monitored item. Based on the match, the systems and methods described herein may identify values of other field-value pairs of the external monitored item and enrich the root monitored item with the identified values. As the matched external monitored item is updated, the systems and methods described herein may promulgate the updates to the root monitored item. Consequently, over time, the systems and methods described herein may enable the system to ensure root monitored items contain up-to-date information as matched external monitored items or matched entities are updated.

By implementing the systems and methods described herein, systems may minimize the computational resources that may be required when the systems determine which entities to match with root monitored items upon detecting new external items or changes to monitored external items. Conventional systems may continuously search for updates to monitored external items for the root monitored items of different workflows. Such a process could take up a large amount of resources and would likely not be practical at scale given the sheer number of monitored external items that would need to continuously be checked for updates. By implementing the systems and methods described herein, however, the system may reverse the set of defined rules to be on the root monitored items instead of the external system. Consequently, the system described herein provides an unconventional technical solution over conventional systems by identifying the specific root monitored item to match to the updated or new external entities instead of going through each item of the external system seeking updates and/or matches.

Figure 12:
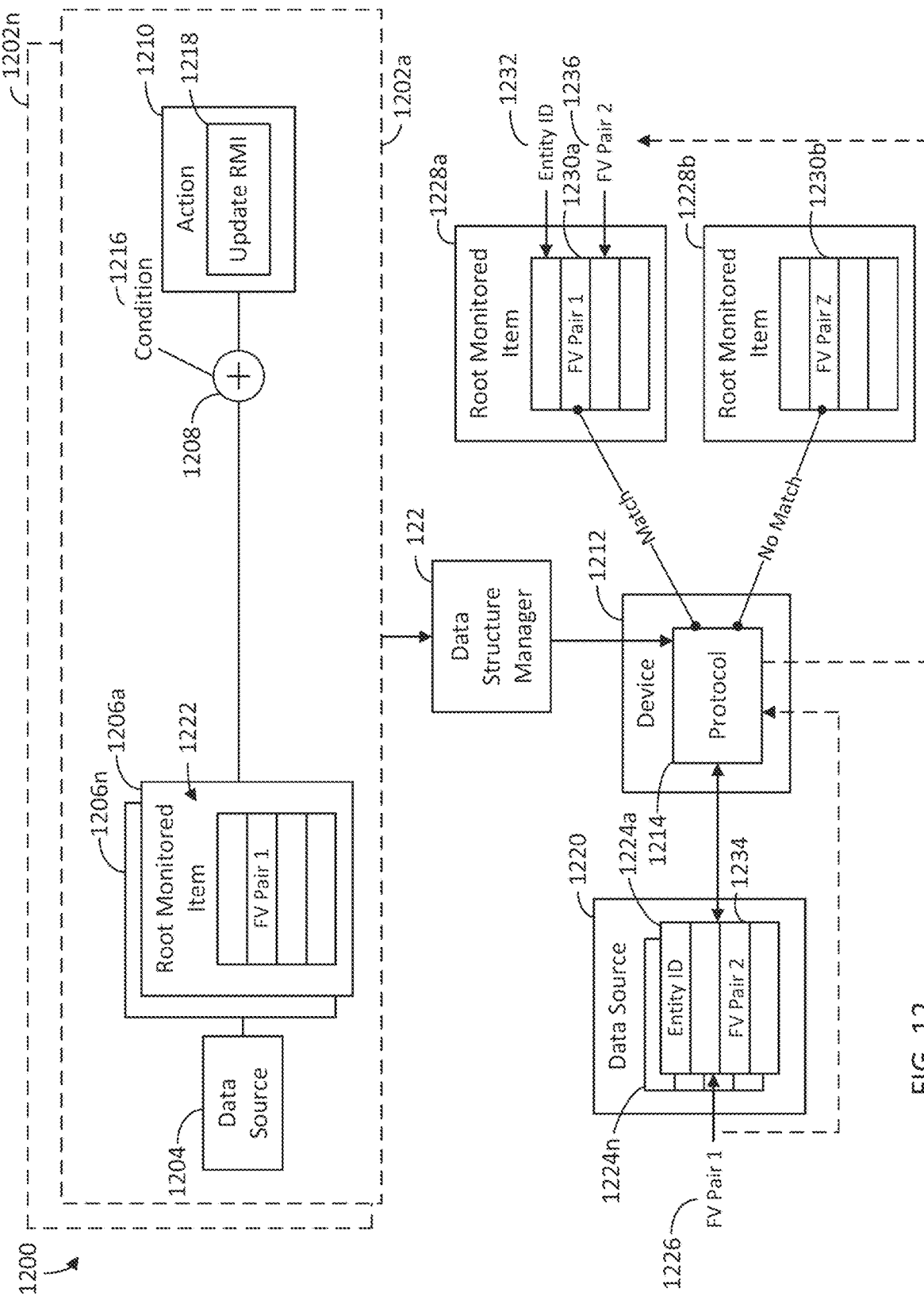
FIG. 12 is an example system for matching external entity updates to root monitored items, according to an illustrative embodiment.

Referring now to FIG. 12, depicted is a use case diagram of a system 1200 for matching external entity items to root monitored items. The system 1200 may include a plurality of workflows 1202a-n (generally referred to as workflows 1202 or workflow 1202). The workflows 1202 may each include a representation of a data source 1204, root monitored items 1206a-n (generally referred to as root monitored items 1206 or root monitored item 1206), a trigger 1208, and an action 1210. However, each workflow 1202 may include different combinations of data sources 1204, root monitored items 1206, triggers 1208, and/or actions 1210. The system is also shown to include a device 1212 and the data structure manager 122. The data structure manager 122 may generate and/or update one or more data structures (e.g., the custom trigger data structure 134, the trigger hierarchy 136, the field-to-trigger mapping 138, and the field-to-field mapping 140) based on the data and/or objects identified in the workflow 1202. Such data structures may be used upon a detection of an event to determine if triggers of the workflow 1202 are satisfied and/or whether to perform an action identified in the workflow 1202, as described herein. In brief overview the device 1212 may identify and monitor the root monitored items 1206 and determine when a trigger condition 1216 of the trigger 1208 is satisfied. Upon determining that the trigger condition 1216 is satisfied, the device 1212 may update the state of the workflow 1202 to execute the action 1210. Execution of the action 1210 may cause a change in state of the action 1210 to an update root monitored item (RMI) state 1218. Responsive to executing the action 1210 in the update RMI state 1218 the device 1212 may perform lookups in the root monitored items 1206 and identify any root monitored items 1206 that match an updated monitored external item of an external data source that caused the trigger condition 1216 to be satisfied.

In some embodiments, the trigger 1208 and/or action 1210 may not be defined as objects or modules of a workflow 1202. For example, the trigger 1208 and its corresponding condition 1216 may be configured to operate in the background of the device 1212 upon a user selecting an option in the workflow 1202 that instantiates a flag or setting that causes the device 1212 to monitor external items in external data sources for updates to initiate the process described herein. In some embodiments, the device may automatically monitor external items in external data sources (e.g., items and/or external data sources identified in protocol 1214) for updates to perform the process described herein without a user selecting the option in the workflow 1202 to do so. In such embodiments, the trigger 1208 and/or the action 1210 may represent modules of instructions of the protocol 1214 that facilitate the process of automatically identifying an external entity item that has been updated and matching the external entity to a root monitored item based on the update to the external entity.

The systems and methods described herein may use, be implemented within, or be a component of the systems described above. For example, the workflow management system 102 may execute the data structure manager 122 of the workflow management system 122 to generate one or more data structures (e.g., the custom trigger data structure 134, the trigger hierarchy 136, the field-to-trigger mapping 138, and the field-to-field mapping 140) for the workflow 1202. In this regard, the workflow management system 122 may execute the interface manager 110, the trigger manager 118, the action manager 120, and the data structure manager 122 to generate and use data structures for the workflow 1202 to determine when and/or if to perform actions identified in the workflow 1202.

The device 1212 may be any device that includes a processor and memory. In some cases, the device 1212 may be the workflow management system 102 or the device 1214. The protocol 1214 may be stored within memory of the device 1212 and may be a version of the workflow 1202. In other embodiments, the device 1212 may be a third device that receives the protocol 1214 from the workflow management system 102 and stores the protocol 1214 in memory. In such embodiments, the processor of the device 1212 may retrieve the protocol 1214 from memory and generate data structures that correspond to the protocol 1214, as described herein.

The data source 1204 may be an object or module of the workflow 1202 that indicates a data source for which the device 1212 monitors data. The data source 1204 may be any data source. The device 1212 may monitor the data source 1204 such as by polling the data source 1204 at set or random intervals. In some instances, the data source 1204 may transmit data to the device 1212 at set or random intervals or upon detecting a change to a field-value pair of an item of the data source 1204. The device 1212 may interface with the data source 1204 via an API (e.g., API 114) or one or more webbooks (e.g., webhook 116). An identifier (e.g., an address) of the data source 1204 may be input by a user as a data source for the device 1214 to monitor for data and/or changes in data.

The root monitored item 1206 may be an object or module of the workflow 1202 that represents an item of the data source 1204 for the device 1212 to monitor for data or changes in data. For example, the root monitored item 1206 may be a record object such as an opportunity record object of a Salesforce database, a cell of an Excel spreadsheet, a cell of a Google Sheet, an email of an email exchange server, etc. The root monitored item 1206 may include a set of field-value pairs 1222 that each include values for fields of the root monitored item 1206. For example, if the root monitored item 1206 is an opportunity record object, the root monitored item 1206 may have field-value pairs associated with the opportunity record object such as, but not limited to, due date, estimated time of completion, amount, probability, severity of the current status, type of the current status (e.g., done, active, risk, on-hold, etc.), etc.

In some embodiments, the device 1212 may monitor items of external data sources such as the data source 1220. As described herein, an external data source may be a data source that is different from the data source 1204, or the data source that is different from the data source that stores the root monitored item 1206. An external data source may be similar (e.g., be of the same type) to the data source 1204. The data source 1220 may be an external data source that stores items 1224*a-n* (generally referred to herein as item 1224 or items 1224). The items 1224 may be external items. The items 1224 may also be referred to herein as entity items. The items 1224 may be monitored external items in cases in which the device 1212 monitors the respective item. The device 1212 may monitor the data source 1220 by polling the data source 1220 for values or updates to any of the items 1224.

The trigger 1208 may be a trigger as generated by the trigger manager 118. The trigger 1208 may be any of a matched conditions trigger, a field changed trigger, an item added trigger, a form filled trigger, or an on-schedule trigger. Each of these triggers are described in detail above.

Upon detecting the condition 1216 is satisfied, the device 1212 may execute the instructions that correspond to the action 1210. The action 1210 may be an object or module that corresponds to a task, step or series of steps, or other form of an output which may occur based on the trigger 1208 being satisfied. The action 1210 may comprise the update RMI state 1218. The device 1212 may execute the instructions that correspond to the update RMI state 1218 to determine if there are any root monitored items 1206 identified in the workflow 1202 that match the monitored external item 1224 for which an update was detected. To do so, and as will be described in detail below, by executing the instructions that correspond to the update RMI state 1218, the device 1212 may identify the updated value of the monitored external item 1224 and the field of the field-value pair of the value. The device 1212 may perform lookups in each root monitored item 1206 of the workflow 1202 for a corresponding field-value pair with a value that matches the updated value of the monitored external item 1224.

As described above, the device 1212 may monitor the items 1224 of data sources such as the data source 1220 for updates to field-value pairs of the items 1224. Upon detecting an update to a field-value pair of a monitored external item 1224, the device 1212 may determine if the update to the field-value pair of the monitored external item 1224 causes the updated monitored external item 1224 to match any of the root monitored items 1206 of the respective workflow 1202. The device 1212 may determine a trigger condition 1216 of each workflow 1202 is satisfied upon detecting a change to a field of an item of an external data source and execute the instructions that correspond to the update RMI state 1218 of the action 1210 of each workflow 1202 to determine if the change to the field caused the item of the external data source to match with any root monitored items 1206 of the workflows 1202.

By executing the instructions that correspond to the update RMI state 1218 of the action 1210, for a workflow 1202, the device 1212 may perform a lookup of each root monitored item 1206 of the workflow 1202. The device 1212 may perform the lookup by comparing the updated value to one or more corresponding field-value pairs of the root monitored items 1206 of the workflow 1202. A corresponding field-value pair may be a field-value pair with a field that matches a field of the updated field-value pair of the updated value. For example, responsive to the device 1212 detecting an update to the "Created from Lead" field-value pair in an opportunity record object, the device may perform a lookup of each root monitored item 1206 to determine if the value of a "Lead Name" field-value pair of the root monitored item 1206 is the same as the updated value of the Created from Lead field-value pair. Fields may be matched based on rules of the workflow 1202. The device 1212 may determine there is a match between the updated item and a root monitored item 1206 when the value of the update matches the value of a corresponding field-value pair of the root monitored item 1206.

For example, the device 1212 may detect that the data source 1220 updated a monitored external item 1224 to include a field-value pair 1226 or another system updated the data source 1220 such that the monitored external item 1224 now includes the new field-value pair 1226. The device 1212 may detect the update occurred and/or the value of the field-value pair 1226. Responsive to detecting that the update occurred and/or the value of the field-value pair 1226, the device 1212 may execute instructions of the RMI state 1218 of the action 1210 of the workflow 1202 and perform a lookup in root monitored items 1228*a-b* (which may represent the root monitored items 1206 of the workflow 1202) to determine if either of the root monitored items 1228*a-b* have a corresponding field-value pair that matches the field-value pair 1226. Root monitored item 1228*a* may be the same as root monitored item 1206*a* of the workflow 1202. Based on performing the lookup, the device 1212 may determine that the root monitored item 1228*a* has a matching field-value pair 1230*a* to the field-value pair 1226 because both field-value pairs 1226 and 1230*a* have the same or corresponding values. The device 1212 may determine that the root monitored item 1228*b* does not have a matching field-value pair to the field-value pair 1226. The device 1212 may do so responsive to identifying a field-value pair 1230*b* of the root monitored item 1228 with a field that corresponds to the field of the field-value pair 1226. The device 1212 may compare the values of the field-value pair 1226 and the field-value pair 1230*b* and determine the root monitored item 1228*b* does not match the monitored external item 1224 responsive to determining the values of the field-value pairs 1226 and 1230*b* do not match.

In some embodiments, the device 1212 may update the data source 1220 to include the field-value pair 1026 in the monitored external item 1224 responsive to an update to the entity relationship data structure 1224. For example, the monitored external item 1224 may be an opportunity record object. The device 1212 may update the entity relationship data structure 1224 after two entities exchange emails between each other regarding the monitored external item 1224. Using natural language processing techniques, the device 1212 may determine that one of the entities is the owner of the monitored external item 1224 and the other entity is the territory owner of the monitored external item 1224. The device 1212 may update the entity relationship data structure 1224 to indicate the entities have relationships with each other and with the monitored external item 1224. Based on their relationships with the monitored external item 1224, the device may update the field-value pairs (e.g., field-value pair 1226) of the monitored external item 1224 corresponding to the owner and the territory owner, respectively.

In some embodiments, for a root monitored item 1206, the device 1212 may monitor items of a particular type to determine if there is match between the root monitored item 1206 and monitored items of the particular type. Examples of types may include emails, spreadsheets, cells in spreadsheets, record objects, databases, accounts, or any other type of item. In some instances, the device 1212 may only monitor items of the particular type for the root monitored item 1206, which may cut down on the computational resources that monitoring external items requires and/or ensures that only relevant items may be matched to root monitored items (e.g., emails may not be extraneously matched to a Google Sheet when emails do not provide any relevant data to the Google Sheet). The specified types may be types input by a user.

In some embodiments, detecting an update to a field-value pair of a monitored item may include detecting a new item in a data source. The device 1212 may monitor a data source and detect when a new item is created and/or stored in the data source. For example, the device 1212 may detect when a data source such as an exchange storage device receives an email. The device 1212 may extract values of field-value pairs from the email (e.g., by using natural language processing techniques) and/or identifying values of the "To:" or "From:" fields of the email and compare values of the field-value pairs of the email to values of field-value pairs of a root monitored item 1206 of the workflow 1202. The device 1212 may determine the email matches the root monitored item 1206 responsive to identifying a match between corresponding field-value pairs of the root monitored item 1206 and the email.

Responsive to determining a monitored external item 1224 matches a root monitored item 1206 of a workflow 1202, the device 1212 may further execute instructions that correspond to the action 1210. The instructions that correspond to the action 1210 may cause the device 1212 to use the data that corresponds to the update in the field-value pair of the matched entity item to perform an action on the matched root monitored item 1206. The action may comprise writing an identifier (e.g., an address or pointer) of the matched entity item into the root monitored item 1206 to indicate that the matched entity item is a matched entity of the root monitored item 1206. For example, upon determining the monitored external item 1224 matches the root monitored item 1228a, the device 1212 may write the entity ID 1232, which may match an entity ID of the monitored external item 1224, into the root monitored item 1228a as a field-value pair. Upon becoming a matched entity to the matched root monitored item 1206, any change or update to fields of the matched monitored external item 1224 that the device 1212 detects may cause the device 1212 to update the matched root monitored item 1206 with the change or update. Consequently, the device 1212 may automatically populate the root monitored item 1206 with updates to ensure the root monitored item 1206 has up-to-date information.

In some embodiments, the action may comprise retrieving data or values of non-matched or other field-value pairs from the matched monitored external item 1224 and promulgating the retrieved data or values into corresponding field-value pairs of the matched root monitored item 1206. The device 1212 may identify the values of the field-value pairs of the matched monitored external item 1224 that correspond to fields of the matching root monitored item 1206. Responsive to identifying any differences between the values of the corresponding fields of the matching root monitored item 1206 and the matched monitored external item 1224, the device 1212 may update or overwrite the values of the matched monitored external item 1224. In some embodiments, responsive to identifying a corresponding field of the root monitored item 1206 without a value, the device 1212 may write the value of the corresponding field of the matched monitored external item 1224 into the corresponding field of the matched root monitored item 1206. For example, upon determining the monitored external item 1224 matches the root monitored item 1228a, the device 1212 may identify the field-value pair 1234 of the matched monitored external item 1224 and populate the root monitored item 1228a with an instance 1236 of the field-value pair 1234.

In some embodiments, to update values of field-value pairs of root monitored items 1206, the device 1212 may transmit instructions that include a flag or setting to the data source that stores the respective root monitored items 1206, receipt of the instructions may cause the data source to update the respective field-value pair with the values from the monitored external item in the external data source. The data source may identify the flag or setting of the instructions and update the corresponding field-value pair of the respective root monitored item with the new value based on the identified flag or setting. Consequently, the device 1212 may automatically ensure the data source has up-to-date information for root monitored items identified in workflows such as the workflow 1202.

In some embodiments, the device 1212 may add new field-value pairs to the root monitored item 1206 responsive to identifying a match with an monitored external item 1224 and identifying a field-value pair of the matched monitored external item 1224 that does not correspond to a field-value pair of the matched root monitored item 1206. Examples of field-value pairs of matched entity items that can be added to root monitored items include, but are not limited to, new rows in a spreadsheet, new field-value pairs of a record object, new fields in an application such as an application that stores account information, etc. The device 1212 may add new field-value pairs to the root monitored item 1206 by transmitting instructions to the data source 1204 that stores the matched root monitored item 1206, receipt of the instructions may cause the data source 1204 to update the root monitored item 1206 to include the new field-value pairs. The device 1212 may perform any action responsive to identifying a matched monitored external item 1224 to a root monitored item 1206.

In some embodiments, responsive to identifying the match between the monitored external item 1224 and the root monitored item 1206, the device 1212 may update the entity relationship data structure 1224 to indicate the two items 1206 and 1224 have a relationship with each other. The device 1212 may do so by generating an edge between nodes representing the two items or otherwise generating nodes for the items 1206 and 1224 within the entity relationship data structure 1224. In some embodiments, upon updating the entity relationship data structure 1224 to indicate the relationship, the device 1212 may identify the other relationships of the two nodes and propagate any information that the device 1212 can match together between the connected nodes. Consequently, by using the entity relationship data structure 1224, the device 1212 may automatically populate the different nodes by identifying the different connections between the nodes instead of comparing the update to sets of rules of every node of the entity relationship data structure 1224, substantially cutting down processing time and/or resources that would otherwise be required to continuously compare the new values to rules every time a value changed or a new value was input into a data source.

In one example embodiment, the device 1212 may monitor group entity profiles in a data source and automatically identify issues or complaints that are filed in external data sources and that are related to the group entities of the group entity profiles. For instance, the device 1212 may monitor a group entity profile of a group entity as a monitored item or a root monitored item. The group entity profile may be associated with a number or another identifier. The device 1212 may also monitor external data sources in which issues or complaints about the group entity may be created or maintained. The device 1212 may identify new issues or complaints that are created within the data sources along with the group entity identifiers to which the issues or complaints pertain. The group entity identifiers may be identified from text within the issues or complaints or otherwise from tagged metadata of the respective issue or complaint. The device 1212 may identify the group entity identifiers of the issues or complaints and compare the group entity identifiers to the group entity identifier of the group entity profile that the device 1212 is monitoring. Responsive to identifying a match between the identifiers, the device 1212 may determine the matching issue or complaint is associated with the group entity profile and assign the matching issue or complaint to the group entity profile in the data source of the group entity profile.

In another example embodiment, the device 1212 may enrich emails with data based on contextual content of the emails. For instance, a root monitored item of a workflow may be an email that the device 1212 monitors from a data source such as an email exchange server. The device 1212 may also monitor fields of spreadsheets such as Google Sheets. The device 1212 may identify a match between the fields of the Google Sheets and the email such as a match between a name field of the Google Sheet and a name of the email such as a name in to the "To:" field, the "From:" field, or based on the name in the signature block introductory section of the email. The device 1212 may do so by using natural language processing techniques on the email. The device 1212 may extract metadata from the email by doing so. Consequently, the device 1212 may identify the Google Sheet as a matched entity of the email. The device 1212 may extract a value from a title field in the Google Sheet and promulgate the extracted value to a title field of the email (e.g., as metadata) to indicate a person with the extracted title is associated with the email.

Figure 13:
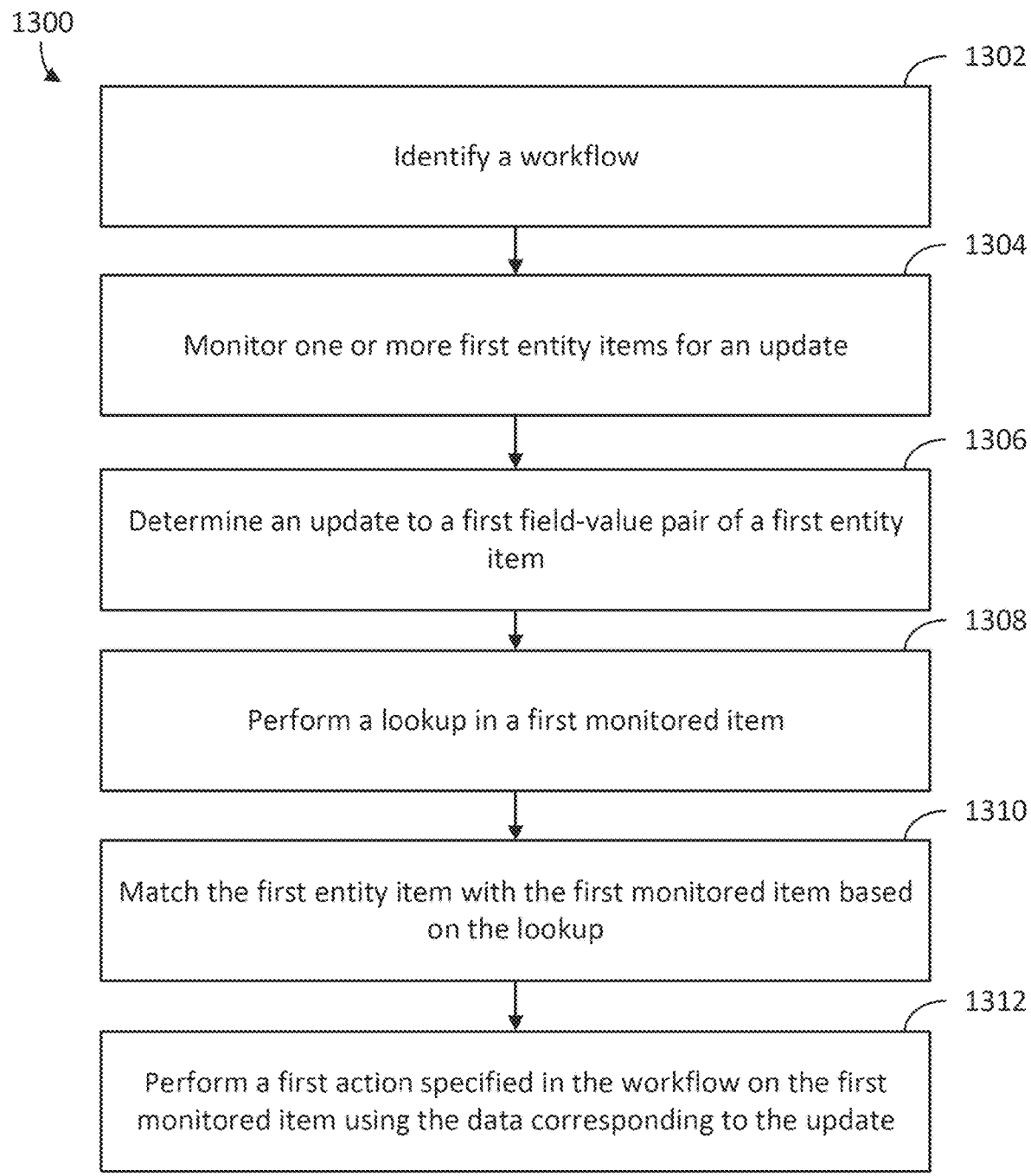
FIG. 13 is an example flowchart for matching external entity updates to root monitored items, according to an illustrative embodiment.

Referring now to FIG. 13, depicted is a block diagram of an example method 1300 for matching external entity updates to monitored items according to embodiments of the present disclosure. The method 1300 can be implemented or performed using any of the components described above in conjunction with FIGS. 1-12 (e.g., the workflow management system 102 or the device 1212). In brief overview, a data processing system can identify a workflow (1302); monitor one or more first entity items for an update (1304); determine an update to a first field-value pair of a first entity item (1306); perform a lookup in a first monitored item (1308); match the first entity item with the first monitored item based on the lookup (1310); and perform a first action specified in the workflow on the first monitored item using the data corresponding to the update (1312).

In further detail, a data processing system (e.g., the workflow management system 102 or the device 1212) can identify a workflow (1302). The workflow can comprise a plurality of objects or modules such as data sources, monitored items (e.g., root monitored items), triggers, and/or actions. The data processing system may generate one or more data structures from objects or modules. The workflow may specify a first entity item type including one or more first field-value pairs that can be matched to monitored items of the workflow. The workflow may be configured to cause the data processing system to perform one or more actions responsive to an update to one or more first field-value pairs of a first entity item of the first entity item type The data processing system can monitor one or more first entity items for an update (1304). The data processing system can monitor first entity items of a first entity type specified in the workflow. The data processing system can monitor the first entity items from one or more data sources that store the first entity items. The data processing system can monitor the first entity items by requesting data about field-value pairs of the first entity items or automatically from the data sources upon a change or update to the first entity items (e.g., via webhooks).

The data processing system can determine an update to a first field-value pair of a first entity item (1306). The data processing system can determine the update subsequent to processing the first monitored item (e.g., identifying the first monitored or establishing the first monitored item as a monitored item from a work flow). The data processing system can determine the update responsive to identifying a change in values of a field-value pair of the first entity item or otherwise in response to identifying a new value of a field of the first field-value pair. The data processing system can compare the values of the first field-value pair between sequential data packets that the data processing system receives and identify a change in values to determine the update or identify the value that the data processing system receives upon the data source detecting an update and transmitting the value or an indication of the update to the data processing system.

The data processing system can perform a lookup in a first monitored item (1308). The data processing system can perform a lookup in each monitored item of the workflow. The data processing system can perform the lookup to search for a field-value pair of the respective monitored item that matches the detected update to the first field-value pair that initiated the lookup. The data processing system may perform the lookup of the first monitored item by comparing one or more of the field-value pairs of the first monitored item to the updated value of the first field-value pair.

The data processing system can match the first entity item with the first monitored item based on the lookup (1310). The data processing system may match the first entity item with the first monitored item responsive to determining that the update in the first field-value pair included in the first entity item matches a corresponding field-value pair of the first monitored item. By matching the first entity item to the first monitored item, the first entity item may become a matched entity of the first monitored item.

The data processing system can perform a first action specified in the workflow on the first monitored item using the data corresponding to the update (1312). The data processing system may perform the first action by executing instructions of the action as specified in the workflow. An example of an action includes, but is not limited to updating the first monitored item with values for field-value pairs of the root monitored from the first entity item. Another example of an action is adding the first entity item to a list of matched entities of the first monitored item.

In some implementations, a method may include identifying, by one or more processors, a workflow including a first data source and a monitored item type, the workflow specifying i) a second data source and a condition for identifying a second item included in the second data source to match with a corresponding monitored item received from the first data source, and ii) an action to be performed subsequent to the condition being satisfied. The method may further include identifying, by the one or more processors, an event corresponding to a first data source. The method may further include generating, by the one or more processors, a data object for the workflow based on the monitored item corresponding to the event. The method may further include receiving, by the one or more processors, an update to the second data source, the update including the second item. The method may further include determining, by the one or more processors responsive to the update, that the monitored item and the second item satisfy the condition. The method may further include performing by the one or more processors, the action specified in the workflow.

Section 11. Systems and Methods for Updating an Entity Relationship Data Structure Based on Relationships Between Monitored Items and Entities The present disclosure relates to systems and methods for updating an entity relationship data structure based on relationships between monitored items and entities. In particular, the systems and methods described herein may present, to a client device, a graphical user interface that enables a user to generate a workflow by defining one or more conditions to detect monitored items and one or more actions to perform, the one or more actions identifying one or more entity types, and the workflow defining one or more conditions and one or more actions to perform. The systems and methods described herein may update, responsive to identifying a monitored item that satisfies the one or more conditions, an entity relationship data structure to store one or more associations between the monitored item and the one or more entity types identified by the one or more actions. Each association of the one or more associations may identify a respective location within a respective data source accessible to the one or more processors. The systems and methods described herein may detect a change in a value stored in the location within the data source. The systems and methods described herein may update the entity relationship data structure based on the change in the value.

According to embodiments described herein, a system can enable a data processing system to generate, maintain, and update an entity relationship data structure with edges that connect nodes of items, record objects, and entities with each other. The data processing system may maintain the entity relationship data structure across different workflows, enabling the data processing system to maintain a robust relationship network and enable any new workflows that are created to use the entity relationship data structure to determine whether conditions of the respective workflow are satisfied. Because of the sheer quantity of workflows and monitored items that the system monitors, using the entity relationship data structure to identify satisfied conditions may substantially cut down on the amount of resources that are required for the system to operate. The entity relationship data structure may also help speed up the total time it takes to identify satisfied conditions because the number of relationships between nodes may be limited compared to the total number of items that could be a match. Implementations not utilizing the systems and methods described herein may manually "guess and check" to determine if various monitored items satisfy conditions, which often takes significantly longer and can require more processing resources.

Furthermore, the data processing system may update the entity relationship data structure in real-time. For example, as the data processing system monitors items across different data sources according to different workflows, the data processing system may determine conditions of the workflows are satisfied that cause the data processing system to identify new relationships. The data processing system may update the entity relationship data structure to indicate the new relationships and subsequently identify any conditions of various workflows that may be satisfied based on the new relationships. For instance, the data processing system may use the relationships to pull data about the nodes of the new relationships and propagate the data to other data sources according to the various workflows. As such data is propagated, the data processing system may identify new conditions that are satisfied and further update the relationship data structure. Accordingly, by implementing the systems and methods described herein, the data processing system may maintain a live entity relationship data structure that can automatically update as data associated with the data structure is updated, enabling the data processing system to quickly propagate information to different nodes and accurately identify satisfied conditions without becoming stale, which is non-conventional and something that conventional systems are able to do or do not do.

Figure 14:
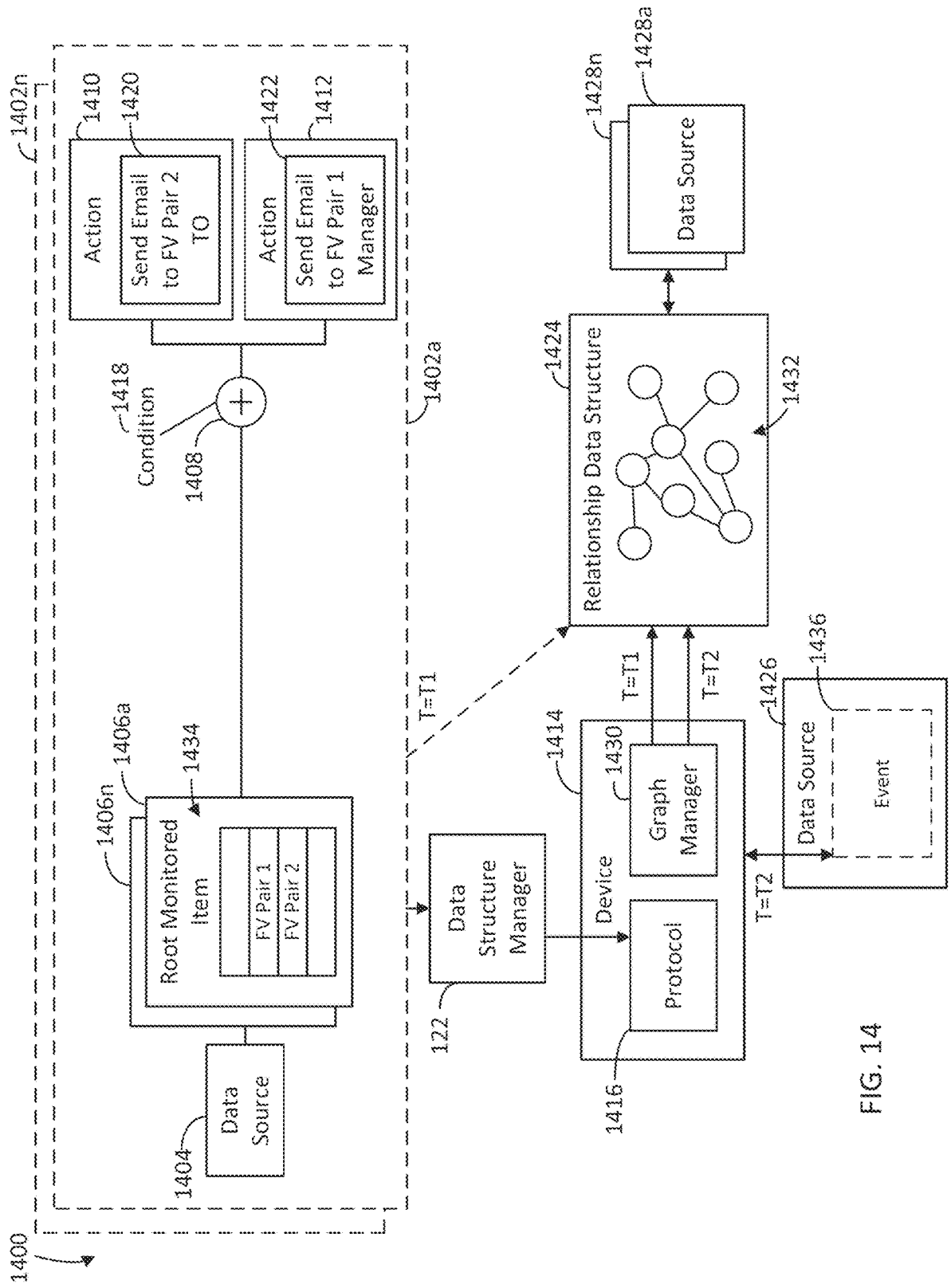
FIG. 14 is an example system for updating an entity relationship data structure based on relationships between monitored items and entities, according to an illustrative embodiment.

Referring now to FIG. 14, depicted is a use case diagram of a system 1400 for maintaining an entity relationship data structure based on relationships between monitored items. The system 1400 may include a plurality of workflows 1402a-1402n (generally referred to as workflows 1402 or workflow 1402). The workflows 1402 may each include a representation of a data source 1404, root monitored items 1406a-n (generally referred to as root monitored items 1406 or root monitored item 1406), a trigger 1408, and actions 1410 and 1412. However, each workflow 1402 may include different combinations of data sources 1404, root monitored items 1406, triggers 1408, and/or actions 1410 and/or 1412. Users may create such workflows via a user interface that is presented to the users on a client device. The system may also include a device 1414 and the data structure manager 122. The data structure manager 122 may generate and/or update one or more data structures (e.g., the custom trigger data structure 134, the trigger hierarchy 136, the field-to-trigger mapping 138, and the field-to-field mapping 140) based on the data and/or objects identified in the workflow 1402. Such data structures may be used upon a detection of an event to determine if triggers of the workflow 1402 are satisfied and/or whether to perform an action identified in the workflow 1402, as described herein.

As will be described in greater detail below, the device 1414 may identify and monitor the root monitored items 1406 and determine when a trigger condition 1418 of the trigger 1408 is satisfied. Upon determining that the trigger condition 1418 is satisfied, the device 1414 may update the state of the workflow 1402 to execute one or both of the actions 1410 and 1412. Execution of either action 1410 or 1412 may cause a change in state of the respective action 1410 or 1412 to a send email to territory owner state 1420 or a send email to manager state 1422, respectively. Responsive to executing the action 1410 in the state 1420, the device 1414 may identify the territory owner using a lookup technique in a data source specified in the workflow 1402, identify the email address of the territory owner from the data source, and send an email to the identified email address. Similarly, responsive to executing the action 1412, the device 1414 may identify the manager from a data source (e.g., the same or a different data source) using a similar lookup technique, identify the email address of the manager from the data source, and send an email to the manager.

The systems and methods described herein may use, be implemented within, or be a component of the systems described above. For example, the workflow management system 102 may execute the data structure manager 122 of the workflow management system 102 to generate the protocol 1416 of the device 1414 based on the workflow 1402. In this regard, the workflow management system 122 may execute the interface manager 110, the trigger manager 118, the action manager 120, and the data structure manager 122 to generate and use data structures for the workflow 1402 to determine when and/or if to perform actions identified in the workflow 1402.

The device 1414 may be any device that includes a processor and memory. In some cases, the device 1414 may be the workflow management system 102. The protocol 1416 may be stored within memory of the device 1414 and may be a version of the workflow 1402. In other embodiments, the device 1414 may be a third device that receives the protocol 1416 from the workflow management system 102 and stores the protocol 1416 in memory. In such embodiments, the processor of the device 1414 may retrieve the protocol 1416 from memory and generate data structures that correspond to the protocol 1416, as described herein.

The data source 1404 may be an object or module of the workflow 1402 that indicates a data source for which the device 1414 monitors data. The data source 1404 may be any data source as described above. The device 1414 may monitor the data source 1404 such as by polling the data source 1404 at set or random intervals. In some instances, the data source 1404 may transmit data to the device 1414 at set or random intervals or upon detecting a change to a field-value pair of an item of the data source 1404. The device 1414 may similarly monitor external data sources such as data source 1426 and/or data sources 1428a-n (hereinafter referred to as data source 1428 or data sources 1428).

The root monitored item 1406 may be an object or module of the workflow 1402 that represents an item of the data source 1404 for the device 1414 to monitor for new data or changes in data. The root monitored item 1406 may include a set of field-value pairs 1434 that each include values for fields of the root monitored item 1406. For example, if the root monitored item 1406 is an opportunity record object, the root monitored item 1406 may have field-value pairs associated with the opportunity record object such as, but not limited to, due date, estimated time of completion, amount, probability, severity of the current status, type of the current status (e.g., done, active, risk, on-hold, etc.), etc.

The trigger 1408 may be a trigger generated by the trigger manager 118. The trigger 1408 may be any of a matched conditions trigger, a field changed trigger, an item added trigger, a form filled trigger, or an on-schedule trigger. Details regarding each of these types of triggers are provided above.

The trigger 1408 may correspond to one or more conditions 1418 that, upon being satisfied, cause the device 1414 to perform the instructions of the actions 1410 and/or 1412. The conditions 1418 may be user-defined logic or other rule-based statements (e.g., statements that correspond to the different types of triggers that are listed above) and, in some embodiments, may be satisfied responsive to the device 1414 detecting a new value, a change in values, or a particular value in a monitored item. In some embodiments, the condition 1418 may be satisfied by a value of a new monitored item. For example, a user may set the condition 1418 so it is satisfied responsive to the protocol 1416 identifying a record object (e.g., the root monitored item 1406 or a monitored item of an external data source) with a due date field-value pair value within 10 days of the current day. The device 1414 may identify the due date field-value pairs of any record object monitored items that are specified in the condition, any record object root monitored items, and/or any other record object monitored items and determine (e.g., using an internal calendar) whether the due date field-value pair of the respective record object is within 10 days of the current date. The protocol 1416 may identify any record objects with a due date field-value pair that is within 10 days of the current date as satisfying the condition 1418. The device 1414 may be configured to set and monitor for any rules to satisfy the conditions 1418.

Responsive to identifying a monitored item that satisfies the condition 1418, the device 1414 may execute the instructions that correspond to the actions 1410 and/or 1412. Each action 1410 and 1412 may be an object or module that corresponds to a task, step or series of steps, or other form of an output which may occur based on the condition 1418 being satisfied. Examples of actions include, but are not limited to, send an email notification, send a Slack notification, perform a natural language processing technique on an item, etc. The actions 1410 and 1412 may also correspond to various entity types. The entity types may be identified as metadata of the respective action. Entity types may be, for example, territory owner, manager, owner, employee, lead, customer, boss, supervisor, associate, partner, etc. The device 1414 may execute the actions 1410 and/or 1412 according to the corresponding entity types and the instructions of the states 1420 and 1422, respectively.

For example, the state 1420 of the action 1410 may identify a territory owner entity type. The protocol 1416 may execute the action 1410 in the state 1420 and identify the opportunity name or territory field-value pair of the record object that caused the condition 1418 to be satisfied. Using the value of the field-value pair, the protocol 1416 may perform a lookup in a data source (e.g., a data source also specified in the action 1410) for an entity (e.g., person) with a territory owner title that corresponds to the opportunity name or territory field-value pair (e.g., that matches values of the respective field-value pair). Upon identifying the territory owner, the device 1414 may identify the territory owner's email address from the same data source and send an email to the territory owners email address.

Similarly, the state 1422 may identify an owner manager entity type. The protocol 1416 may execute the action 1412 in the state 1422 and identify the owner of the record object that caused the condition 1418 to be satisfied based on the owner field-value pair of the record object. The protocol 1416 may use the name of the owner to perform a lookup in a data source (e.g., the same data source as above or a different data source) specified in the action 1412 for an entity with a manager title (e.g., the owner's boss) that corresponds to the owner field-value pair of the record object. Upon identifying a manager with a value that matches the owner from the data source, the device 1414 may identify the manager's email address from the same data source and send an email to the manager's email address.

Responsive to identifying the manager and/or the territory owner, the graph manager 1430 of the device 1414 may update the entity relationship data structure 1424. The entity relationship data structure 1424 may be or include one or more lists of items, record objects, and/or entities and their connections or relationships with each other. The entity relationship data structure 1424 may include records or nodes for each item, record object, and/or entity and one or more pointers to locations within the data sources 1428 that have information stored about the respective record or node. The graph manager 1430 may update the entity relationship data structure 1424 to indicate the manager, the territory owner, the owner, and the record object (e.g., the monitored item that satisfied the condition 1418) have relationships with each other.

The device 1414 may generate the entity relationship data structure 1424 into a relationship graph 1432. The relationship graph 1432 may include nodes that represent objects (e.g., items, record objects, and/or entities) in the data sources 1428 and edges between the nodes indicating connections or relationships between the objects. Each node may include a name or label indicating the item, record object, or entity for which the node is associated and one or more pointers as described above. For example, a node for a person, Abigaile, may include an address that points to a first location in a data source 1428a that contains electronic contact information about Abigaile (e.g., email address, phone number, Slack account, etc.) and an address that points to a second location in another data source that contains physical information (e.g., home address, place of employment, etc.). The device 1414 may use the pointers to retrieve information about Abigaile from the corresponding locations and propagate the information to any items that correspond to a node has a relationship with Abigaile's node. Consequently, the device 1414 may use the entity relationship data structure 1424 to maintain relationships between nodes and propagate information between the nodes without storing such information.

In some embodiments, the relationship graph 1432 may also include information about the relationships between the nodes (e.g., a strength of the relationship determined by the number of connections or instances of relationships between the same nodes), types of the relationships (e.g., entity-to-entity relationship, employment relationship, employee-supervisor relationship, personal relationship, etc.), or any other information about the relationships. The graph manager 1430 may update the relationships as the device 1414 identifies more relationships between nodes and/or creates new nodes. For example, the graph manager 1430 may increase the strength of a relationship upon identifying a new relationship between two nodes (e.g., that a territory owner and a manager are associated with a second record object together) or update the relationship type of a relationship when the relationship between the nodes changes (e.g., when a node gets a promotion over a previous peer employee).

In some embodiments, responsive to executing the actions 1410 and 1412 to send emails to the electronic accounts of the territory owner and the manager, the graph manager 1430 may update the entity relationship data structure 1424. For example, the device 1414 may send emails to the electronic accounts of the territory owner and the manager. Responsive to sending the emails, the graph manager 1430 may identify the territory owner, the manager, the owner, and the record object as having a relationship and update the entity relationship data structure 1424 to create relationships between the nodes that correspond to each entity. In instances in which the entity relationship data structure 1424 does not have a record or a node that corresponds to one of the above, the graph manager 1430 can generate a record or node for the respective entity accordingly (e.g., create a record or node that has an identifier for the entity and pointer or address that points to a location in a data source 1428 that includes information about the entity). The graph manager 1430 may update the entity relationship data structure 1424 any time the device 1414 executes an action that causes the graph manager 1430 to identify relationships between items, record objects, or entities and continue to maintain the entity relationship data structure 1424 over time. Consequently, the graph manager 1430 may keep up-to-date information about relationships between different nodes based on user-defined workflows.

In some embodiments, the device 1414 may access and/or monitor the data sources 1428. The device 1414 may monitor the data sources 1428 according to an internal configuration as described herein. In some instances, while monitoring the data sources 1428, the device 1414 may detect a change in values of a field-value pair of the data sources 1428. Responsive to detecting the change, the graph manager 1430 may identify the change and update the entity relationship data structure 1424 accordingly.

For example, subsequent to the device 1414 updating the entity relationship data structure 1424 to include indicators of relationships between the territory owner, the manager, the record object, and/or the owner of the record object, the device 1414 may monitor the data sources 1428 at the locations that correspond to each of these entities. The device 1414 may detect that the territory owner is no longer the territory owner based on a change in job titles at the territory owner's respective location (e.g., in a profile that corresponds to the territory owner) and/or a change in names of the territory owner position location within the data source 1428. Consequently, the graph manager 1430 may update the entity relationship data structure 1424 to remove any stored relationships the territory owner has with the manager, record object, and/or owner of the record object based on the territory owner's position as territory owner (although the territory owner may have other stored relationships with the entities in the relationships data structure 1424 that may be maintained). The device 1414 may monitor the data sources 1428 and update the entity relationship data structure 1424 in any manner.

In some embodiments, responsive to updating the entity relationship data structure 1424 (e.g., based on a change in values at the data sources 1428), the device 1414 may determine that a second monitored item satisfies a condition of another workflow (not shown). For example, after the device 1414 updates the entity relationship data structure 1424 to remove the relationships between the territory owner and the manager, record object, and/or owner of the record object, the device 1414 may identify other record objects with which the territory owner has a relationship as a territory owner and remove the relationships between the territory owner and the respective record objects. The device 1414 may determine a condition specified in the respective workflow is satisfied responsive to identifying a record object without a relationship with a territory owner. Consequently, the device 1414 may execute an action that corresponds to the workflow (e.g., notify the owner of the record object that a new territory owner is needed for the record object). Thus, the device 1414 may use the entity relationship data structure 1424 to propagate changes across different workflows. The device 1414 may maintain the entity relationship data structure 1424 to store live homogeneous information about the current state of the system, reducing conflicting data points and values within the system.

In some embodiments, the graph manager 1430 may monitor fields of a data source 1428 that correspond to specific entity types for any changes to the fields. For example, the graph manager 1430 may monitor the locations of the territory owner and/or the manager fields in the data sources 1428. The graph manager 1430 may detect a change when the value is removed (e.g., the territory owner and/or manager position becomes vacant) or replaced (e.g., another entity replaced the previous territory owner and/or manager). The graph manager 1430 may accordingly update the entity relationship data structure 1424 by removing any relationships the previous territory owner and/or manager had with various entities based on their position and, if applicable, create new relationships between the new territory owner and/or manager and the same entities.

In some embodiments, subsequent to updating the entity relationship data structure 1424, the device 1414 may detect a second monitored item that satisfies a condition. The condition can be the condition 1418, another condition of the workflow 1402, or a condition of another workflow 1402 altogether. The device 1414 may detect the second monitored item satisfies a condition responsive to detecting an event 1436 (e.g., an identification of a value, a change in values of the second monitored item, the addition of the second monitored item to the data source 1426, etc.) that matches the condition. For example, the device 1414 may detect that a second monitored item includes a value that satisfies a condition (e.g., has a matching value to the condition). The device 1414 may perform an action (e.g., send an email to an entity type) based on the value satisfying the condition similar to the above. The device 1414 may then update the entity relationship data structure 1424 to include relationships between the entity or entities that were emailed and/or the second monitored item to indicate their relationships.

Figure 15:
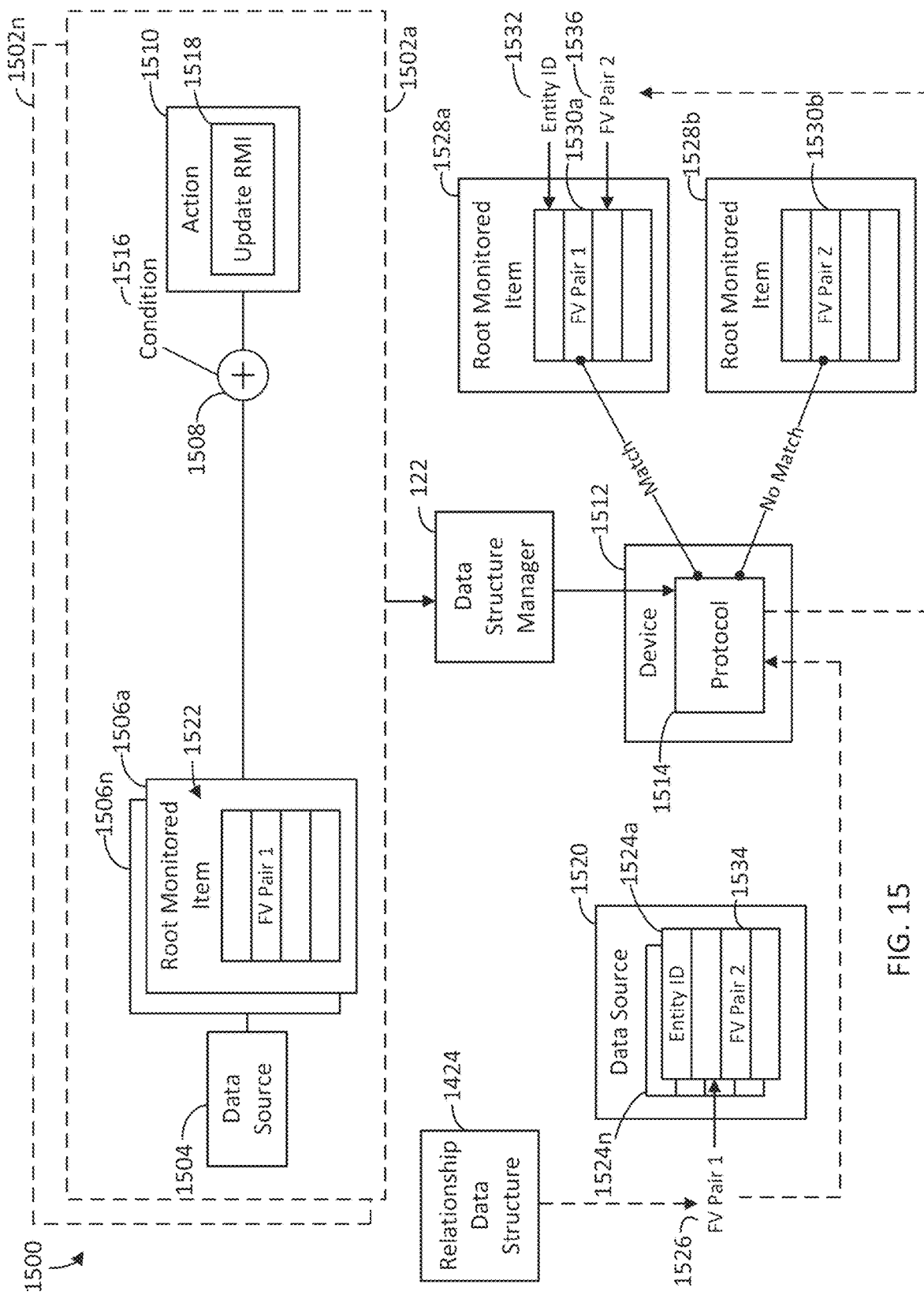
FIG. 15 is an example system for matching external entity updates to root monitored items, according to an illustrative embodiment.

Referring now to FIG. 15, depicted is a use case diagram of a system 1500 for matching external entity items to root monitored items. The system 1500 may include a plurality of workflows 1502*a*-1502*n* (generally referred to as workflows 1502 or workflow 1502). The workflows 1502 may each include a representation of a data source 1504, root monitored items 1506*a*-*n* (generally referred to as root monitored items 1506 or root monitored item 1506), a trigger 1508, and an action 1510. However, each workflow 1502 may include different combinations of data sources 1504, root monitored items 1506, triggers 1508, and/or actions 1510. The system is also shown to include a device 1512 and the data structure manager 122. The system 1500 is also shown to include a device 1212 and the data structure manager 122. The data structure manager 122 may generate and/or update one or more data structures (e.g., the custom trigger data structure 134, the trigger hierarchy 136, the field-to-trigger mapping 138, and the field-to-field mapping 140) based on the data and/or objects identified in the workflow 1502. Such data structures may be used upon a detection of an event to determine if triggers of the workflow 1502 are satisfied and/or whether to perform an action identified in the workflow 1502, as described herein. In brief overview the device 1512 may identify and monitor the root monitored items 1506 and determine when a trigger condition 1516 of the trigger 1508 is satisfied. Upon determining that the trigger condition 1516 is satisfied, the device 1512 may update the state of the workflow 1502 to execute the action 1510. Execution of the action 1510 may cause a change in state of the action 1510 to an update root monitored item (RMI) state 1518. Responsive to executing the action 1510 in the update RMI state 1518 the device 1512 may perform lookups in the root monitored items 1506 and identify any root monitored items 1506 that match an updated monitored external item of an external data source that caused the trigger condition 1516 to be satisfied.

In some embodiments, the trigger 1508 and/or action 1510 may not be defined as objects or modules of a workflow 1502. For example, the trigger 1508 and its corresponding condition 1516 may be configured to operate in the background of the device 1512 upon a user selecting an option in the workflow 1502 that instantiates a flag or setting that causes the device 1512 to monitor external items in external data sources for updates to initiate the process described herein. In some embodiments, the device 1512 may automatically monitor external items in external data sources for updates to perform the process described herein without a user selecting the option in the workflow 1502 to do so. In such embodiments, the trigger 1508 and/or the action 1510 may represent modules of instructions of the protocol 1514 that facilitate the process of automatically identifying an external entity item that has been updated and matching the external entity to a root monitored item based on the update to the external entity.

The systems and methods described herein may use, be implemented within, or be a component of the systems described above. For example, the workflow management system 102 may execute the data structure manager 122 of the workflow management system 102 to generate data structures for the workflow 1502, as described herein. In this regard, the workflow management system 122 may execute the interface manager 110, the trigger manager 118, the action manager 120, and the data structure manager 122 to generate and use data structures for the workflow 1502 to determine when and/or if to perform actions identified in the workflow 1502.

The device 1512 may be any device that includes a processor and memory. In some cases, the device 1512 may be the workflow management system 102. The protocol 1514 may be stored within memory of the device 1512 and may be a version of the workflow 1502. In other embodiments, the device 1512 may be a third device that receives the protocol 1514 from the workflow management system 102 and stores the protocol 1514 in memory. In such embodiments, the processor of the device 1512 may retrieve the protocol 1514 from memory and generate data structures that correspond to the protocol 1514, as described herein.

The data source 1504 may be an object or module of the workflow 1502 that indicates a data source for which the device 1512 monitors data. The data source 1504 may be any data source. The device 1512 may monitor the data source 1504 such as by polling the data source 1504 at set or random intervals. In some instances, the data source 1504 may transmit data to the device 1512 at set or random intervals or upon detecting a change to a field-value pair of an item of the data source 1504. The device 1512 may interface with the data source 1504 via an API (e.g., API 114) or one or more webbooks (e.g., webhook 116). An identifier (e.g., an address) of the data source 1504 may be input by a user as a data source for the device 1512 to monitor for data and/or changes in data.

The root monitored item 1506 may be an object or module of the workflow 1502 that represents an item of the data source 1504 for the device 1512 to monitor for data or changes in data. For example, the root monitored item 1506 may be a record object such as an opportunity record object of a Salesforce database, a cell of an Excel spreadsheet, a cell of a Google Sheet, an email of an email exchange server, etc. The root monitored item 1506 may include a set of field-value pairs 1522 that each include values for fields of the root monitored item 1506. For example, if the root monitored item 1506 is an opportunity record object, the root monitored item 1506 may have field-value pairs associated with the opportunity record object such as, but not limited to, due date, estimated time of completion, amount, probability, severity of the current status, type of the current status (e.g., done, active, risk, on-hold, etc.), etc.

In some embodiments, the device 1512 to monitor items of external data sources such as the data source 1520. As described herein, an external data source may be a data source that is different from the data source 1504, or the data source that is different from the data source that stores the root monitored item 1506. An external data source may be similar (e.g., be of the same type) to the data source 1504. The data source 1520 may be an external data source that stores items 1524*a-n* (generally referred to herein as item 1524 or items 1524). The items 1524 may be external items. The items 1524 may also be referred to herein as entity items. The items 1524 may be monitored external items in cases in which the device 1512 monitors the respective item. The device 1512 may monitor the data source 1520 by polling the data source 1520 for values or updates to any of the items 1524.

The trigger 1508 may be a trigger as generated by the trigger manager 118. The trigger 1508 may be any of a matched conditions trigger, a field changed trigger, an item added trigger, a form filled trigger, or an on-schedule trigger. Each of these triggers are described in detail above.

Upon detecting the condition 1516 is satisfied, the device 1512 may execute the instructions that correspond to the action 1510. The action 1510 may be an object or module that corresponds to a task, step or series of steps, or other form of an output which may occur based on the trigger 1508 being satisfied. The action 1510 may comprise the update RMI state 1518. The device 1512 may execute the instructions that correspond to the update RMI state 1518 to determine if there are any root monitored items 1506 identified in the workflow 1502 that match the monitored external item 1524 for which an update was detected. To do so, and as will be described in detail below, by executing the instructions that correspond to the update RMI state 1518, the device 1512 may identify the updated value of the monitored external item 1524 and the field of the field-value pair of the value. The device 1512 may perform lookups in each root monitored item 1506 of the workflow 1502 for a corresponding field-value pair with a value that matches the updated value of the monitored external item 1524.

As described above, the device 1512 may monitor the items 1524 of data sources such as the data source 1520 for updates to field-value pairs of the items 1524. Upon detecting an update to a field-value pair of a monitored external item 1524, the device 1512 may determine if the update to the field-value pair of the monitored external item 1524 causes the updated monitored external item 1524 to match any of the root monitored items 1506 of the respective workflow 1502. The device 1512 may determine a trigger condition 1516 of each workflow 1502 is satisfied upon detecting a change to a field of an item of an external data source and execute the instructions that correspond to the update RMI state 1518 of the action 1510 of each workflow 1502 to determine if the change to the field caused the item of the external data source to match with any root monitored items 1506 of the workflows 1502.

By executing the instructions that correspond to the update RMI state 1518 of the action 1510, for a workflow 1502, the device 1512 may perform a lookup of each root monitored item 1506 of the workflow 1502. The device 1512 may perform the lookup by comparing the updated value to one or more corresponding field-value pairs of the root monitored items 1506 of the workflow 1502. A corresponding field-value pair may be a field-value pair with a field that matches a field of the updated field-value pair of the updated value. For example, responsive to the device 1512 detecting an update to the "Created from Lead" field-value pair in an opportunity record object, the device may perform a lookup of each root monitored item 1506 to determine if the value of a "Lead Name" field-value pair of the root monitored item 1506 is the same as the updated value of the Created from Lead field-value pair. Fields may be matched based on rules of the workflow 1502. The device 1512 may determine there is a match between the updated item and a root monitored item 1506 when the value of the update matches the value of a corresponding field-value pair of the root monitored item 1506.

For example, the device 1512 may detect that the data source 1520 updated a monitored external item 1524 to include a field-value pair 1526 or another system updated the data source 1520 such that the monitored external item 1524 now includes the new field-value pair 1526. The device 1512 may detect the update occurred and/or the value of the field-value pair 1526. Responsive to detecting that the update occurred and/or the value of the field-value pair 1526, the device 1512 may execute the instructions of the action 1510 of the workflow 1502 and perform a lookup in root monitored items 1528*a-b* (which may represent the root monitored items 1506 of the workflow 1502) to determine if either of the root monitored items 1528*a-b* have a corresponding field-value pair that matches the field-value pair 1526. Root monitored item 1528*a* may be the same as root monitored item 1506*a* of the workflow 1502. Based on performing the lookup, the device 1512 may determine that the root monitored item 1528*a* has a matching field-value pair 1530*a* to the field-value pair 1526 because both field-value pairs 1526 and 1530*a* have the same or corresponding values. The device 1512 may determine that the root monitored item 1528*b* does not have a matching field-value pair to the field-value pair 1526. The device 1512 may do so responsive to identifying a field-value pair 1530*b* of the root monitored item 1528 with a field that corresponds to the field of the field-value pair 1526. The device 1512 may compare the values of the field-value pair 1526 and the field-value pair 1530*b* and determine the root monitored item 1528*b* does not match the monitored external item 1524 responsive to determining the values of the field-value pairs 1526 and 1530*b* do not match.

In some embodiments, the device 1512 may update the data source 1520 to include the field-value pair 1526 in the monitored external item 1524 responsive to an update to the entity relationship data structure 1424. For example, the monitored external item 1524 may be an opportunity record object. The device 1512 may update the relationship data structure 1424 after two entities exchange emails between each other regarding the monitored external item 1524. Using natural language processing techniques, the device 1512 may determine that one of the entities is the owner of the monitored external item 1524 and the other entity is the territory owner of the monitored external item 1524. The device 1512 may update the entity relationship data structure 1424 to indicate the entities have relationships with each other and with the monitored external item 1524. Based on their relationships with the monitored external item 1524, the device may update the field-value pairs (e.g., field-value pair 1526) of the monitored external item 1524 corresponding to the owner and the territory owner, respectively.

In some embodiments, for a root monitored item 1506, the device 1512 may monitor items of a particular type to determine if there is match between the root monitored item 1506 and monitored items of the particular type. Examples of types may include emails, spreadsheets, cells in spreadsheets, record objects, databases, accounts, or any other type of item. In some instances, the device 1512 may only monitor items of the particular type for the root monitored item 1506, which may cut down on the computational resources that monitoring external items requires and/or ensures that only relevant items may be matched to root monitored items (e.g., emails may not be extraneously matched to a Google Sheet when emails do not provide any relevant data to the Google Sheet). The specified types may be types input by a user.

In some embodiments, detecting an update to a field-value pair of a monitored item may include detecting a new item in a data source. The device 1512 may monitor a data source and detect when a new item is created and/or stored in the data source. For example, the device 1512 may detect when a data source such as an exchange storage device receives an email. The device 1512 may extract values of field-value pairs from the email (e.g., by using natural language processing techniques) and/or identifying values of the "To:" or "From:" fields of the email and compare values of the field-value pairs of the email to values of field-value pairs of a root monitored item 1506 of the workflow 1502. The device 1512 may determine the email matches the root monitored item 1506 responsive to identifying a match between corresponding field-value pairs of the root monitored item 1506 and the email.

Responsive to determining a monitored external item 1524 matches a root monitored item 1506 of a workflow 1502, the device 1512 may further execute instructions that correspond to the action 1510. The instructions that correspond to the action 1510 may cause the device 1512 to use the data that corresponds to the update in the field-value pair of the matched entity item to perform an action on the matched root monitored item 1506. The action may comprise writing an identifier (e.g., an address or pointer) of the matched entity item into the root monitored item 1506 to indicate that the matched entity item is a matched entity of the root monitored item 1506. For example, upon determining the monitored external item 1524 matches the root monitored item 1528*a*, the device 1512 may write the entity ID 1532, which may match an entity ID of the monitored external item 1524, into the root monitored item 1528*a* as a field-value pair. Upon becoming a matched entity to the matched root monitored item 1506, any change or update to fields of the matched monitored external item 1524 that the device 1512 detects may cause the device 1512 to update the matched root monitored item 1506 with the change or update. Consequently, the device 1512 may automatically populate the root monitored item 1506 with updates to ensure the root monitored item 1506 has up-to-date information.

In some embodiments, the action may comprise retrieving data or values of non-matched or other field-value pairs from the matched monitored external item 1524 and promulgating the retrieved data or values into corresponding field-value pairs of the matched root monitored item 1506. The device 1512 may identify the values of the field-value pairs of the matched monitored external item 1524 that correspond to fields of the matching root monitored item 1506. Responsive to identifying any differences between the values of the corresponding fields of the matching root monitored item 1506 and the matched monitored external item 1524, the device 1512 may update or overwrite the values of the matched monitored external item 1524. In some embodiments, responsive to identifying a corresponding field of the root monitored item 1506 without a value, the device 1512 may write the value of the corresponding field of the matched monitored external item 1524 into the corresponding field of the matched root monitored item 1506. For example, upon determining the monitored external item 1524 matches the root monitored item 1528*a*, the device 1512 may identify the field-value pair 1534 of the matched monitored external item 1524 and populate the root monitored item 1528*a* with an instance 1536 of the field-value pair 1534.

In some embodiments, to update values of field-value pairs of root monitored items 1506, the device 1512 may transmit instructions that include a flag or setting to the data source that stores the respective root monitored items 1506, receipt of the instructions may cause the data source to update the respective field-value pair with the values from the monitored external item in the external data source. The data source may identify the flag or setting of the instructions and update the corresponding field-value pair of the respective root monitored item with the new value based on the identified flag or setting. Consequently, the device 1512 may automatically ensure the data source has up-to-date information for root monitored items identified in workflows such as the workflow 1502.

In some embodiments, the device 1512 may add new field-value pairs to the root monitored item 1506 responsive to identifying a match with an monitored external item 1524 and identifying a field-value pair of the matched monitored external item 1524 that does not correspond to a field-value pair of the matched root monitored item 1506. Examples of field-value pairs of matched entity items that can be added to root monitored items include, but are not limited to, new rows in a spreadsheet, new field-value pairs of a record object, new fields in an application such as an application that stores account information, etc. The device 1512 may add new field-value pairs to the root monitored item 1506 by transmitting instructions to the data source 1504 that stores the matched root monitored item 1506, receipt of the instructions may cause the data source 1504 to update the root monitored item 1506 to include the new field-value pairs. The device 1512 may perform any action responsive to identifying a matched monitored external item 1524 to a root monitored item 1506.

In some embodiments, responsive to identifying the match between the monitored external item 1524 and the root monitored item 1506, the device 1512 may update the entity relationship data structure 1424 to indicate the two items 1506 and 1524 have a relationship with each other. The device 1512 may do so by generating an edge between nodes representing the two items or otherwise generating nodes for the items 1506 and 1524 within the entity relationship data structure 1424. In some embodiments, upon updating the entity relationship data structure 1424 to indicate the relationship, the device 1512 may identify the other relationships of the two nodes and propagate any information that the device 1512 can match together between the connected nodes. Consequently, by using the entity relationship data structure 1424, the device 1512 may automatically populate the different nodes by identifying the different connections between the nodes instead of comparing the update to sets of rules of every node of the entity relationship data structure 1424, substantially cutting down processing time and/or resources that would otherwise be required to continuously compare the new values to rules every time a value changed or a new value was input into a data source.

In one example embodiment, the device 1512 may monitor group entity profiles in a data source and automatically identify issues or complaints that are filed in external data sources and that are related to the group entities of the group entity profiles. For instance, the device 1512 may monitor a group entity profile of a group entity as a monitored item or a root monitored item. The group entity profile may be associated with a number or another identifier. The device 1512 may also monitor external data sources in which issues or complaints about the group entity may be created or maintained. The device 1512 may identify new issues or complaints that are created within the data sources along with the group entity identifiers to which the issues or complaints pertain. The group entity identifiers may be identified from text within the issues or complaints or otherwise from tagged metadata of the respective issue or complaint. The device 1512 may identify the group entity identifiers of the issues or complaints and compare the group entity identifiers to the group entity identifier of the group entity profile that the device 1512 is monitoring. Responsive to identifying a match between the identifiers, the device 1512 may determine the matching issue or complaint is associated with the group entity profile and assign the matching issue or complaint to the group entity profile in the data source of the group entity profile.

In another example embodiment, the device 1512 may enrich emails with data based on contextual content of the emails. For instance, a root monitored item of a workflow may be an email that the device 1512 monitors from a data source such as an email exchange server. The device 1512 may also monitor fields of spreadsheets such as Google Sheets. The device 1512 may identify a match between the fields of the Google Sheets and the email such as a match between a name field of the Google Sheet and a name of the email such as a name in to the "To:" field, the "From:" field, or based on the name in the signature block introductory section of the email. relThe device 1512 may do so by using natural language processing techniques on the email. The device 1512 may extract metadata from the email by doing so. Consequently, the device 1512 may identify the Google Sheet as a matched entity of the email. The device 1512 may extract a value from a title field in the Google Sheet and promulgate the extracted value to a title field of the email (e.g., as metadata) to indicate a person with the extracted title is associated with the email.

Figure 16:
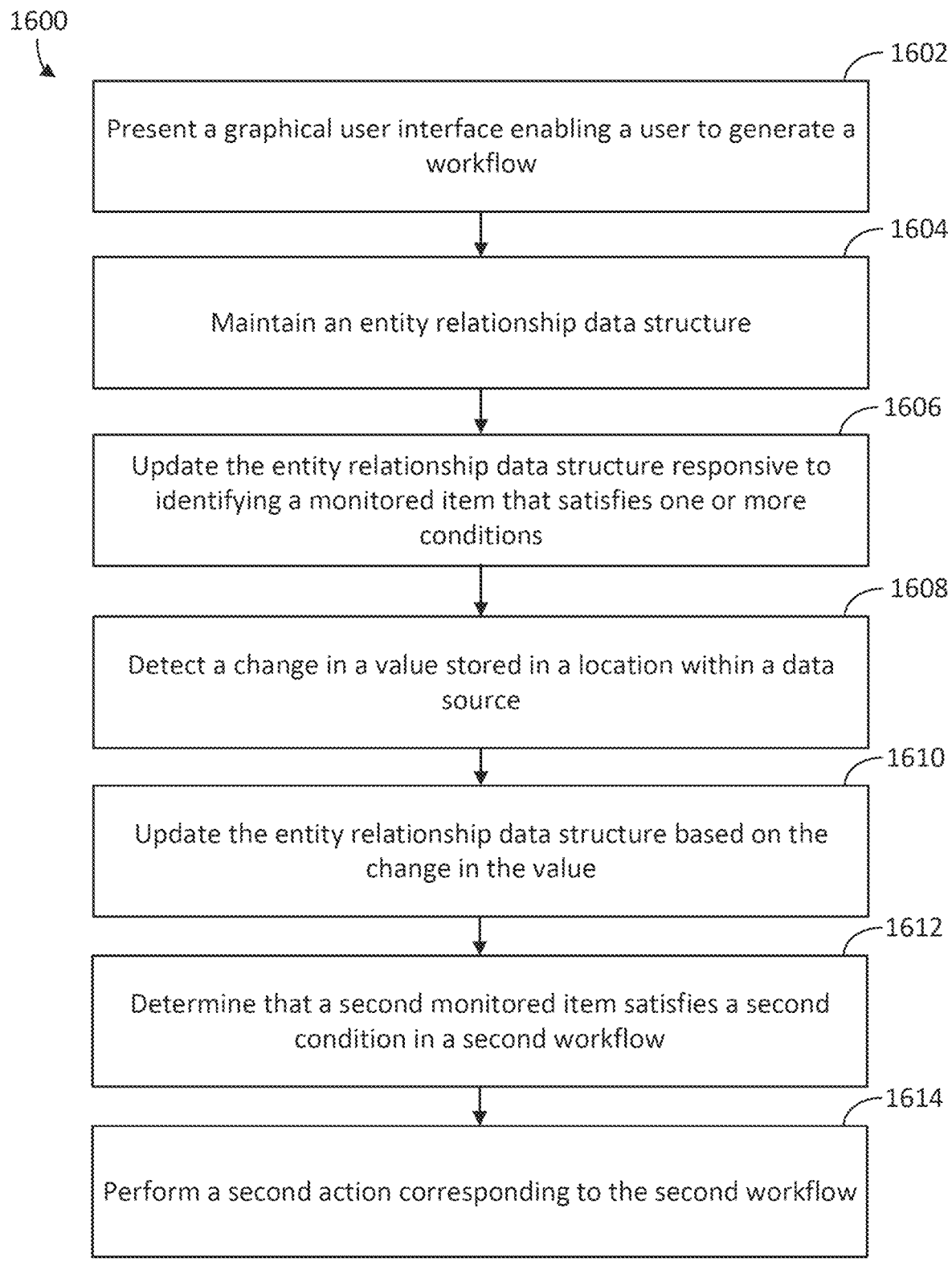
FIG. 16 is an example flowchart for updating an entity relationship data structure based on relationships between monitored items, according to an illustrative embodiment.

Referring now to FIG. 16, depicted is a block diagram of an example method 1600 for matching external entity updates to root monitored items according to embodiments of the present disclosure. The method 1600 can be implemented or performed using any of the components described above in conjunction with FIGS. 1-15 (e.g., the workflow management system 102, the device 1512, or the device 1514). In brief overview, a data processing system can present a graphical user interface enabling a user to generate a workflow that is configured to generate an executable (1602); maintain an entity relationship data structure (1604); update the entity relationship data structure responsive to identifying a monitored item that satisfies one or more conditions (1606); detect a change in a value stored in a location within a data source (1608); update the entity relationship data structure based on the change in the value (1610); determine that a second monitored item satisfies a second condition in a second executable (1612); and perform a second action corresponding to the second executable (1614).

In further detail, a data processing system (e.g., the workflow management system 102, the device 1512, or the device 1514) can present a graphical user interface enabling a user to generate a workflow (1602). The workflow can comprise a plurality of objects or modules such as data sources, root monitored items, triggers, and/or actions. Via the graphical user interface, the user may define one or more conditions to detect monitored items and actions to perform. The actions may identify one or more entity types. Data from the workflow may be used to generate data structures that can facilitate navigation of the objects of the workflow. The data processing system may detect monitored items in various data sources and perform the actions of the workflow responsive to detecting the monitored items and determining a condition was satisfied.

The data processing system can maintain an entity relationship data structure (1604). The entity relationship data structure may comprise a series of stored relationships between different nodes that represent items of various data sources and/or that represent people or entities. The data processing system may use the data structure to generate a relationship graph between the nodes. The relationship graph may include the nodes and edges that represent the relationships or connections between the nodes. The nodes of the graph may include pointers or addresses that point to addresses or locations in various data sources. The locations may include information (e.g., field-value pairs) about the nodes. The data processing system may identify and retrieve information from the locations and perform various actions on other items of the relationship graph. For example, the data processing system may receive information corresponding to a node from one location in a data source and propagate the information to a data source that corresponds to another node.

The data processing system can update the entity relationship data structure responsive to identifying a monitored item that satisfies one or more conditions (1606). The one or more conditions may be or include rules that are specified by a user via the graphical user interface when the user creates the workflow. A condition may be satisfied responsive to the data processing system identifying a field-value pair of a monitored item that satisfies a rule of the condition. Upon the data processing system identifying a satisfied condition, the data processing system may execute instructions that correspond to an action. The data processing system may identify any entities that are related to the action (e.g., that have entity types that were identified in the action) and the monitored item that caused the condition to be satisfied. The data processing system may update the entity relationship data structure to indicate relationships between the entities (e.g., matched entities) and/or the monitored item.

In some embodiments, the actions may identify entity types and data sources. An entity type may correspond to a characteristic (e.g., title) of an entity for which data is stored in a data source. Upon execution of an action, the data processing system may query a data source specified in the action for entities that are associated with an entity type that is also specified in the action. The data processing system may query the data source for a name or an address (e.g., location) where data is stored for the entity type. Responsive to identifying the location of an entity that corresponds to the entity type (e.g., a location that stores information about the entity), the data processing system can identify the name and/or address for the entity associated with the entity type from the data source. The data processing system may update the entity relationship data structure by generating a relationship between a node that is associated with the monitored item that satisfied the condition and a node that is associated with the entity identified at the location of the entity type. The nodes may be or include a name for the respective entity and item and/or one or more pointers to respective locations in data sources that include information about the node.

The data processing system can detect a change in a value stored in a location within a data source (1608). The location may be the location of the entity that corresponds to the entity type. The data processing system can monitor the field-value pair associated with the location for any changes or updates to the value. For example, the location may correspond to the manager field-value pair of an opportunity with a value that identifies the name of the manager of the opportunity. The data processing system may detect when the value changes (e.g., the manager changes) by monitoring the field-value pair at the location.

The data processing system can update the entity relationship data structure based on the change in the value (1610). The data processing system may identify the change by receiving a signal (e.g., via a webhook or an API). The change may be a new value or the deletion of the value at the location. Responsive to identifying the change, the data processing system may determine the entity that was previously associated with the location (e.g., that previously held the title of the respective entity) is no longer associated with the location. Consequently, the data processing system may update the entity relationship data structure by removing any relationships or connections the entity had with others based on the association with the location. If the value was changed with a new value representing a new entity, the data processing system may identify the node of the new entity within the entity relationship data structure and generate connections between the node and the other nodes that are associated with the monitored item. In some cases, the data processing system may adjust the connections that the previous entity had that were based on the entity's entity type to be connections with the new entity.

The data processing system can determine that a second monitored item satisfies a second condition in a second workflow (1612). The data processing system may do so responsive to updating the entity relationship data structure based on the change in value in the location. For example, the change in value at the location may cause the data processing system to generate new relationships between a new entity (e.g., the new entity that has the entity type) and any items or nodes that had stored relationships with the previous entity based on the previous entity's entity type (e.g., job or position). Upon generating the new relationships, the data processing system may retrieve and propagate information (e.g., values of field-value pairs) about the entity to the nodes associated with the new relationships. The data processing system may monitor at least one of such nodes by executing a second executable and determine a second condition of the second workflow is satisfied based on the new information.

The data processing system can perform a second action corresponding to the second workflow (1614). Responsive to the second condition being satisfied, the data processing system can identify and perform the second action of the second workflow. For example, upon populating an item with information about a matched entity and determining the population caused the second condition to be satisfied, the data processing system can cause an alert to be generated to other entities that have a relationship with the item indicating the item matched with the entity.

In some implementations, the entity relationship data structure may be created and/or updated based on relationships that are defined within various workflows. For example, when a user creates a workflow at a user interface displayed on a client device, the user may manually assign matched entities to monitored items of the workflow. After completing the workflow, the user may generate data structures from the workflow. In doing so, the data processing system may identify the pairs of manually assigned matched entities and monitored items create or update an entity relationship data structure with stored associations between the matched entities and the respective monitored items. Thus, in situations in which the data processing system creates an entity relationship data structure upon execution of the executable, the data processing system may automatically create the relationship data structure with specified relationships without using any processing resources that are required when analyzing and/or comparing the different monitored items of the manually assigned matched entities.

In some implementations, the data processing system may use data from multiple workflows and/or client devices to create and/or update the entity relationship data structure. The data processing system may continuously update the entity relationship data structure as users create workflows. For instance, continuing with the example above, after the data processing system updates the entity relationship data structure upon creation of a workflow, another user operating a second client device may access a user interface and create a second workflow that identifies monitored items and matched entities to the monitored items. The data processing system may generate a second workflow and update the entity relationship data structure to store associations between the monitored items and the respective matched entities that are identified in the second workflow. The data processing system may similarly update the entity relationship data structure as users create workflows to maintain a real-time entity relationship data structure that identifies relationships between matched entities and monitored items that the data processing system identifies based on the data in the monitored items and the manually assigned relationships within the workflows.

Section 12. Systems and Methods for Actions Triggered by Formula-Based Values

The present disclosure relates to systems and methods for actions triggered by formula-based values. The systems and methods described herein may present a graphical user interface to a client device, which is configured to receive one or more inputs from a user for generating a workflow by defining one or more triggers and one or more actions to perform responsive to the one or more triggers being satisfied. A trigger of the one or more triggers may be satisfied based on a formula which uses data from item(s) or field(s) of a data source. The workflow may be configured to detect updates to the field and perform the one or more actions responsive to the one or more triggers being satisfied. The systems and methods described herein may update a data object to store a field-value pair for the formula. The systems and methods described herein may establish the field-value pair including at least one value which is computed using the formula and the data from the item of the data source (which may be incorporated or otherwise included in a data object corresponding to a workflow). The systems and methods described herein may determine, based on a field being updated in a local data source corresponding to the data source, to compute a value of the field-value pair. The systems and methods described herein may compute, using the formula, the value of the field-value pair using data of the monitored item. The systems and methods described herein may determine that the computed value satisfies the trigger of the workflow. The systems and methods described herein may perform a first action specified in the workflow responsive to determining that the computed value satisfies the trigger of the workflow.

According to embodiments described herein, the systems and methods described herein can automatically perform various actions based on data corresponding to a formula. Additionally, according to the systems and methods described herein, a formula may be used for establishing a new field-value pair which does not otherwise exist in the system, and therefore is not being monitored. As such, the systems and methods described herein may provide extensible monitored items, to thereby provide a more adaptable and configurable workflow. The systems and methods described herein may be configured for formulas across multiple platforms and data sources, thereby increasing the adaptability and configuration of the system.

Figure 17:
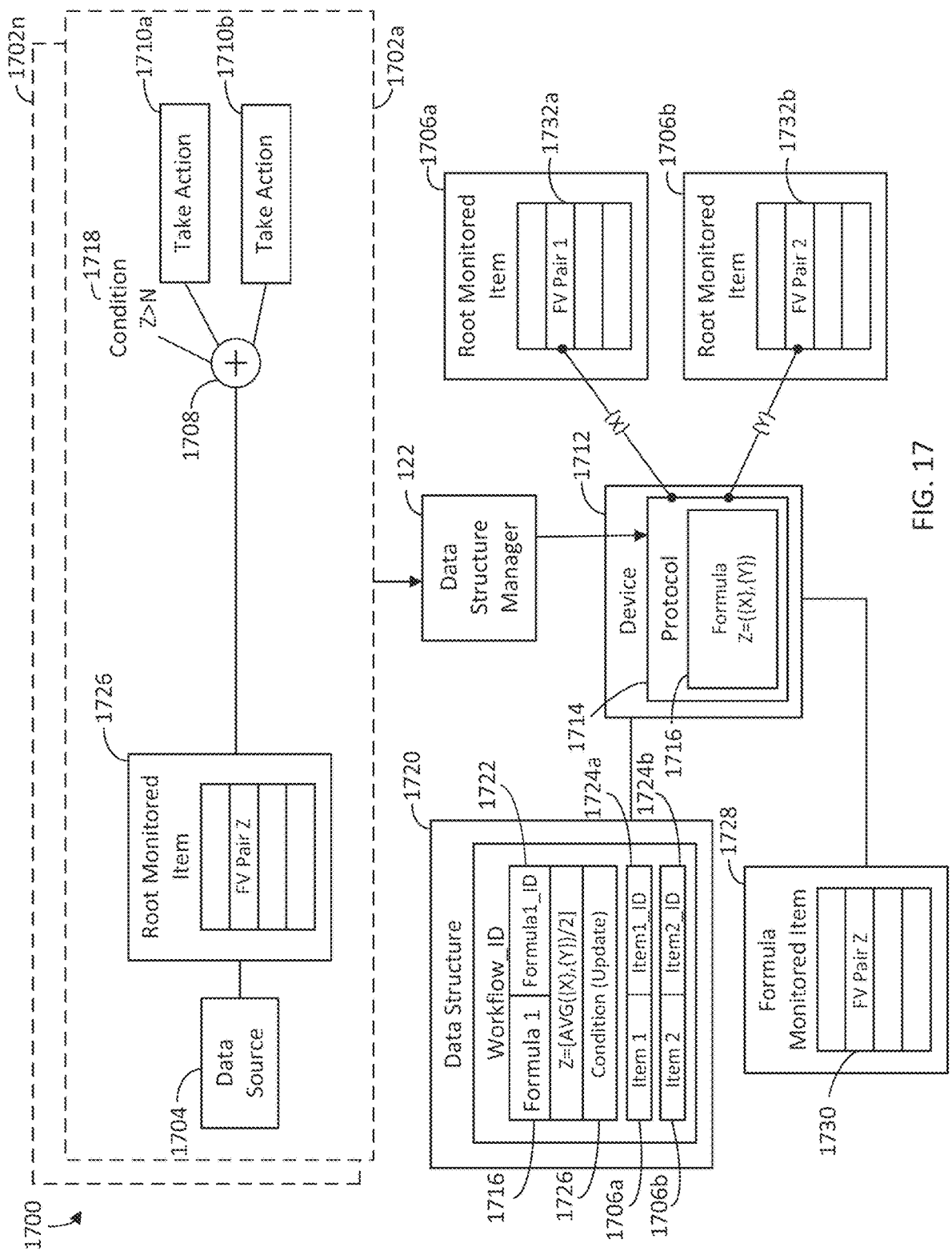
FIG. 17 is a use case diagram of a system for actions triggered by formula-based conditions, according to an illustrative embodiment.

Referring now to FIG. 17, depicted is a use case diagram of a system 1700 for actions triggered by formula-based conditions. Several of the elements shown in FIG. 17 are similar to those described above with respect to FIG. 14 and FIG. 15. As shown in FIG. 17, the system 1700 may include a plurality of workflows 1702a-1702n (generally referred to as workflows 1702 or workflow 1702). The workflows 1702 may each include a representation of a data source 1704, root monitored items 1706a-n (generally referred to as root monitored items 1706 or root monitored item 1706), a trigger 1708, and an action 1710. However, each workflow 1702 may include different combinations of data sources 1704, root monitored items 1706, triggers 1708, and/or actions 1710. The system is also shown to include a device 1712 and the data structure manager 122. The device 1712 may be a client device as described above in Section 1-Section 11, a computer as described below in Section 8, etc. The data structure manager 122 may execute the workflow 1702 into an executable 1714 that may be executed on the device 1712.

In some embodiments, one or more triggers 1708 may be satisfied based on a formula 1716. For example, as shown in FIG. 17, trigger 1708 may have a condition 1718 based on a formula 1716 (Z>N). The trigger 1708 may be established, generated, or otherwise provided as described above in Section 10. As described in greater detail below, when the workflow 1702a is constructed or configured (e.g., by the data structure manager at the device 1712), the executable 1714 for the workflow 1702a may include a trigger 1708 having a condition 1718 corresponding to the formula 1716. The device 1712 may be configured to compute values using the formula 1716 and monitored item(s) 1706 (or fields) corresponding to the formula 1716, which are configured for the trigger 1708 as described above in Section 1D.

The device 1712 may be configured to generate, establish, update, modify, or otherwise provide an entity relationship data structure 1720 to include various associations between monitored items 1706 (or fields) and formulas 1716. The entity relationship data structure 1720 may be similar in some aspects to the field-to-field mapping 140 described above with reference to FIG. 1B. In some embodiments, the data structure 1720 may be configured to maintain associations between monitored items 1706 and formulas 1716. For example, and as shown in FIG. 17, device 1712 may be configured to generate, determine, or otherwise provide an identifier 1722 for the formula 1716, which is linked to an identifier 1724a, 1724b for the monitored item(s) 1706a, 1706b, in the entity relationship data structure 1720. The identifiers 1722, 1724 may be or include a string of bits, bytes, or other structured data which is unique to the formula 1716/monitored items 1706. In some embodiments, the identifiers 1722, 1724 may be similar in some respects to the identifier of the data objects described above in Section 6.

The device 1712 may be configured to provide a condition 1726 in which the formula 1716 is to be applied to data of the monitored item(s) 1706 in the entity relationship data structure 1720 (e.g., to generate a value of new field-value pair). For example, the condition 1726 may be an update to the monitored item(s) 1706, a lapse of time, etc., as described above in Section 1D. As such, the entity relationship data structure 1720 may include data corresponding to the formula 1716 (e.g., including an identifier of the formula 1722) which is associated with or otherwise linked to data corresponding to the particular monitored item(s) 1706a, 1706b (e.g., identifiers 1724a, 1724b for the monitored items 1706a, 1706b), and data corresponding to the condition 1726 in which the formula 1716 is to be applied to data of the monitored item(s) 1706a, 1706b.

As described in greater detail below with respect to FIG. 17, the device 1712 may be configured to use the entity relationship data structure 1720 (e.g., the identifiers of the entity relationship data structure 1720) to identify associations between monitored items and formulas. For instance, where an update to a monitored item 1706 or field occurs and is detected or otherwise identified by the device 1712, the device 1712 may cross-reference data corresponding to the update with the entity relationship data structure 1720 to identify the formula 1716 corresponding to the update. The device 1712 may then compute a new value corresponding to the update using the formula 1716, as described in greater detail below.

As part of generating the workflow 1702a, the device 1712 may be configured to generate, establish, or otherwise provide a formula monitored item 1728 corresponding to the formula 1716. The formula monitored item 1728 may include a field-value pair 1730 corresponding to the formula of the trigger 1708. In this regard, the formula monitored item 1722 may be a new monitored item which did not previously exist (and was not previously monitored) within the system 1700. The device 1712 may be configured to compute, derive, determine, generate, or otherwise provide the field-value pair 1730 corresponding to the formula 1716 by applying the formula to data of the monitored item(s) 1706a, 1706b within data objects. Additionally, the device 1712 may update or otherwise generate data objects which include a field-value pair for the formula monitored item 1728. The device 1712 may be configured to generate the field-value pair 1730 for the formula monitored item 1728 by retrieving data corresponding to the monitored item(s) 1706 specified for the formula 1716 (e.g., from the data objects themselves or from the local data source prior to populating a given data object). The device 1712 may be configured to apply the formula 1716 to the data (e.g., the field-value pairs 1732a, 1732b of the monitored items 1706a, 1706b) to generate the field-value pair 1730 for the formula monitored item 1728. As such, the field-value pair 1730 of the formula monitored item 1728 may be a derived field-value pair 1730 using values from other field-value pairs 1732 of monitored item(s) 1706 (e.g., in respective data objects).

Figure 18:
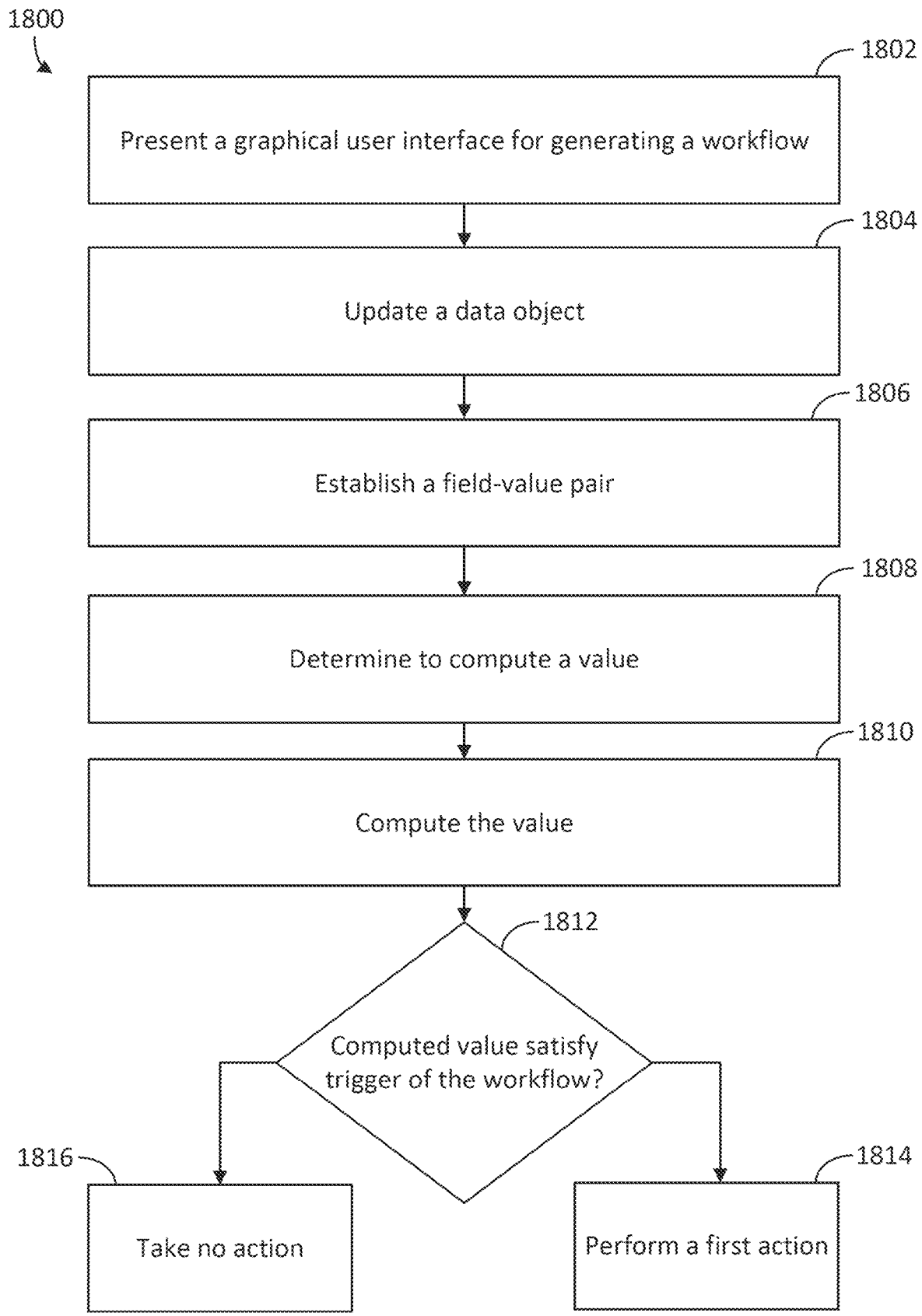
FIG. 18 is a block diagram of an example method for actions triggered by formula-based conditions, according to an illustrative embodiment.

Referring now to FIG. 18, depicted is a block diagram of an example method 1800 for actions triggered by formula-based conditions, according to embodiments of the present disclosure. The method 1800 can be implemented or performed using any of the components described above in conjunction with FIGS. 1-17 (e.g., the workflow management system 102 or the device 1712). In brief overview, a device can present a graphical user interface for generating a workflow (1802); update a data object (1804); establish a field-value pair (1806); determine to compute a value of the field-value pair (1808); compute the value (1810); determine whether the computed value satisfies a trigger of the workflow (1812); perform a first action specified in the workflow when the computed value satisfies the trigger of the workflow (1814); and take no action when the computed value does not satisfy the trigger of the workflow (1816).

In further detail, a device can present a graphical user interface (GUI) for generating a workflow (1802). In some embodiments, the device may present the GUI to a client device for receiving input(s) from a user for generating the workflow. The GUI may be similar in some respect to the visual programming interface shown FIG. 4 and FIG. 5 and described in Section 2 above. The device may receive inputs for defining the workflow, which include inputs for defining one or more triggers and inputs for defining one or more actions to perform responsive to the one or more triggers being satisfied. The device may receive inputs for defining a trigger which is satisfied based on values computed using a formula which is applied to data from a field or item of a data source. The formula may be configured by the user as described above in Section 1D.

In some embodiments, the device may receive various inputs for defining, configuring, or otherwise establishing the formula. For example, the device may receive a first input for selecting fields on which the formula is to be applied. The fields may be from or included in a data source, may be a time or temporal data, etc. In some embodiments, the device may receive an input (or a plurality of inputs) for selecting a plurality of fields, some of which may be from a data source, formula monitored items, time or temporal data, and so forth. The device may receive an input for selecting a function of the formula in relation to the monitored item. For example, the formula may include various functions which are to be applied to data corresponding to the fields. Various examples of functions are described above in Section 1D. The device may receive an input for selecting a condition in which the formula is to be applied to data of the selected field(s). The condition may be an update to the field(s), an interval of time elapsing, etc. In these and other embodiments, the selected monitored item(s), function(s), and condition(s) may together define the formula. The formula may be used to generate a formula monitored item, as described in greater detail below.

Once each of the inputs for configuring the workflow are received from the client device, the device may receive a request to publish the workflow. By publishing the workflow, a user may determine or select a particular version of the workflow which is to be deployed.

The device can generate, build, or otherwise update one or more data objects (1804). In some embodiments, the device may update the data objects to include a field-value pair corresponding to the formula. In some embodiments, the device may update a field-to-field mapping which associates various fields for the formula. The field-to-field mapping may be specific to the workflow. When an update to one field is identified, the device may determine whether the field corresponds to the formula based on the field being mapped to other fields. Additionally, the device may determine to compute a new value using the formula based on the field being matched to a field-to-trigger mapping, which may also be specific to the workflow. The device may query the field-to-trigger mapping using the updated field to identify any triggers (e.g., including the trigger corresponding to the formula) which are related to the updated field.

The device can establish a field-value pair (1806). In some embodiments, the device may establish a field-value pair by computing a new value using the formula. In some embodiments, the field-value pair may be computed by applying the formula to the data from the corresponding item (e.g., record object) included in the data object. Since the data object may be specific to a corresponding record object of a data source, and include field-value pairs of the record object, the device may compute the value using the formula, which may be specific to the record object. The device may define the field-value pair for the formula as a formula monitored item. The formula monitored item may be a monitored item which is created, generated, or otherwise established by the device using the formula (as opposed to maintained by a data source). The formula monitored items in a respective data object may include the field-value pair which are generated using data computed using the formula (e.g., with data from the monitored items as inputs to the formula). As such, the field-value pairs of the formula monitored item may be derived from other data.

The device can determine to compute a value of the field-value pair (1808). In some embodiments, the device may determine to compute a value of the field-value pair based on the condition corresponding to the monitored item being satisfied (e.g., based on a field used for the formula being updated). As noted above, the condition may be specified while configuring the formula. The condition may be an update to a field used for configuring the formula. In some embodiments, the condition may be a predetermined amount of time elapsing. Various other conditions may be provided for configuring when the formula is to be applied to data of the monitored item. The device may determine that the condition corresponding to a formula has been met. Continuing the example above, the device may identify an update to a data source which corresponds to a field used for defining the formula. The device may cross-reference data corresponding to the update with data from the entity relationship data structure to determine the condition corresponding to the formula is met (e.g., based on a match of an identifier of the update and an identifier for the monitored item in the entity relationship data structure). The device may determine to compute the value of the field-value pair for the formula responsive to the condition corresponding to the formula being satisfied.

The device can compute the value (1810). The device can compute the value for the field-value pair (e.g., established at step 1706) using the formula. In some embodiments, the device can compute the value for the field-value pair by applying the formula to data of the monitored item(s). The device can compute the value for the field-value pair responsive to the condition for the formula being met or satisfied. Continuing the example above, where the condition is an update to a monitored item corresponding to the formula, the device can compute the value by applying the formula to data for the update to the monitored item. As such, the device may derive the value of the field-value pair on a live basis (e.g., as the monitored item is updated).

The device can determine whether the computed value satisfies a trigger of the workflow (1812). As noted above in Section 1C and Section 1D, a trigger may use the computed value as a condition for a particular trigger. The device may apply the computed value (e.g., computed at step (1810) to the condition of the trigger to determine whether the computed value satisfies the trigger. Continuing the example shown in FIG. 17, the trigger 1008 has a condition 1018 in which Z (e.g., the computed value) is greater than N, and Z is computed using the formula 1016 applied to data ({X}, {Y}) from the root monitored items 1006a, 1006b (e.g., according to Z=[AVG({X},{Y})/2]). The device may apply the computed value (Z) to the condition (Z>N) to determine whether the computed value satisfies the condition of the trigger. Where the computed value satisfies the condition of the trigger, the method 1100 may proceed to step (1814). On the other hand, where the condition does not satisfy the condition of the trigger, the method 1100 may proceed to step (1816).

The device can perform a first action specified in the workflow when the computed value satisfies the trigger of the workflow (1814). In some embodiments, the device may perform a first action specified in the workflow responsive to determining that the computed value satisfies the trigger of the workflow. As noted above, the workflow generated at step (1802) may include triggers and actions which are to be performed responsive to a respective trigger being satisfied. The device may perform an action for a particular trigger responsive to the trigger being satisfied. The actions may include one or more of the actions specified in Section 1E. On the other hand, where the computed value does not satisfy the condition of the trigger, the device may not take action when the computed value (1816).

Section 13. Computer System

Figure 19:
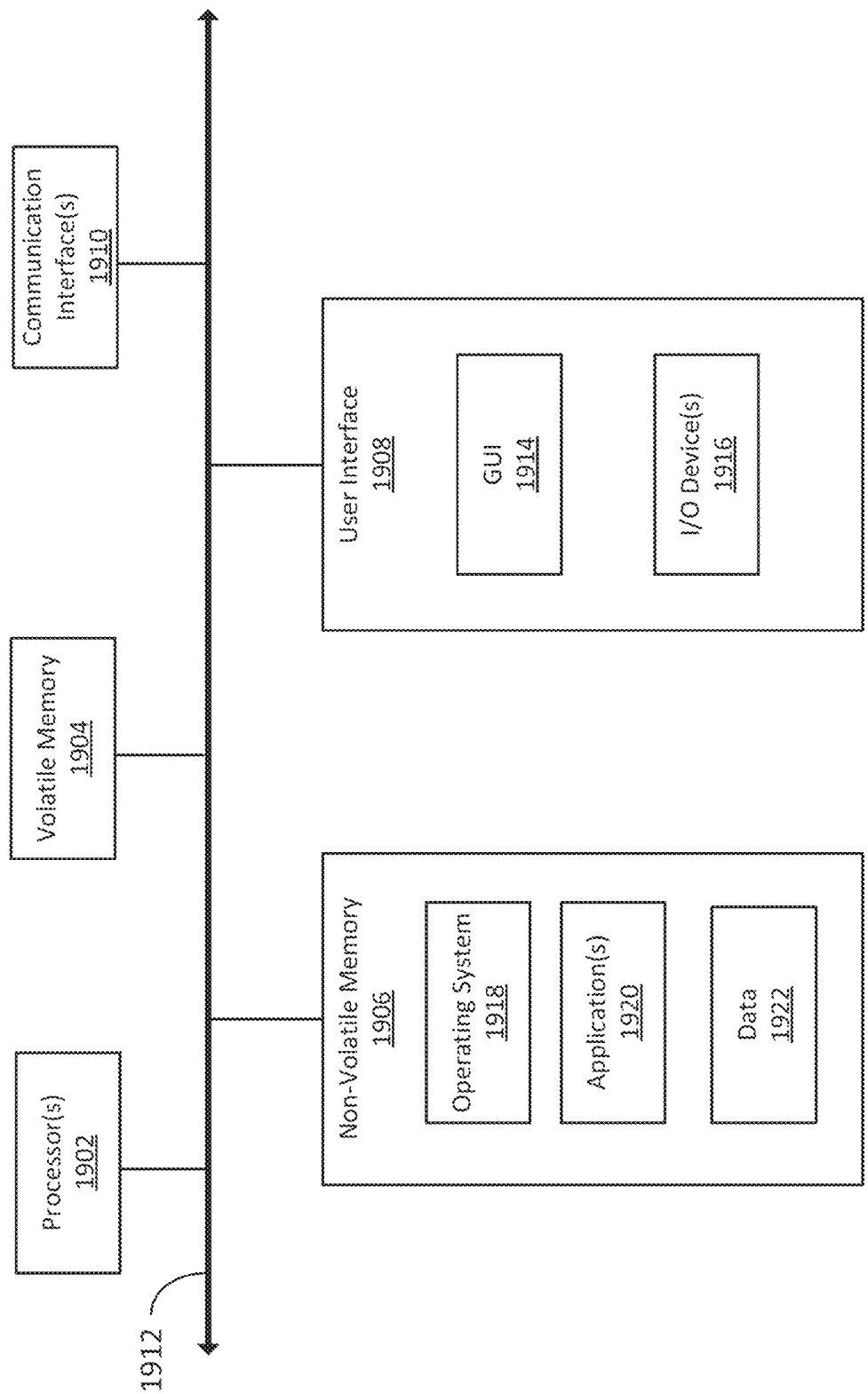
FIG. 19 is an example computer, according to an illustrative embodiment.

Referring now to FIG. 19, depicted is an example computer 1900 which may be used to implement the client devices 104 and/or workflow management system 102, according to various embodiments of the present disclosure. As shown in FIG. 19, computer 1900 may include one or more processors 1902, volatile memory 1904 (e.g., RAM), non-volatile memory 1906 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 1908, one or more communications interfaces 1910, and communication bus 1912. User interface 1908 may include graphical user interface (GUI) 1914 (e.g., a touchscreen, a display, etc.) and one or more input/output (I/O) devices 1916 (e.g., a mouse, a keyboard, etc.). Non-volatile memory 1906 stores operating system 1919, one or more applications 1920, and data 1922 such that, for example, computer instructions of operating system 1919 and/or applications 1920 are executed by processor(s) 1902 out of volatile memory 1904. Data may be entered using an input device of GUI 1914 or received from I/O device(s) 1916. Various elements of computer 1900 may communicate via communication bus 1912. Computer 1900 as shown in FIG. 19 is shown merely as an example, as client devices 104 and/or workflow management system 102 may be implemented by any computing or processing environment and with any type of machine or set of machines that may have suitable hardware and/or software capable of operating as described herein.

Processor(s) 1902 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 1910 may include one or more interfaces to enable computer 1900 to access a computer network such as a LAN, a WAN, or the Internet through a variety of wired and/or wireless or cellular connections.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It is further understood that the systems and methods described herein and embodied in one or more of the following claims can be embodied as one or more computer-readable instructions, stored on tangible medium, for execution by one or more processors. In some embodiments, these instructions can be stored on non-transitory computer readable medium.

It will be further understood that various changes in the details, materials, and arrangements of the parts that have been described and illustrated herein may be made by those skilled in the art without departing from the scope of the following claims.

What is claimed is:

1. A method comprising:
receiving, by one or more processors, from a data source, an event in a queue indicating a change to the data source;
obtaining, by the one or more processors, from the data source, data corresponding to the event;
determining, by the one or more processors, that a monitored item condition defined in a workflow is satisfied based on the data corresponding to the event;
generating, by the one or more processors, a data object responsive to the monitored item condition being satisfied, the data object including one or more fields defined in the workflow and one or more corresponding values that are obtained from the data corresponding to the event;
identifying, by the one or more processors, using a mapping between fields and triggers generated based on the workflow, a trigger defined in the workflow that uses a first field of the one or more fields;
determining, by the one or more processors, that the value of the first field satisfies a trigger condition of the trigger; and
performing, by the one or more processors, responsive to determining that the value satisfies the trigger condition, an action corresponding to the trigger defined in the workflow.

2. The method of claim 1 further comprising:
determining, by the one or more processors, using a graph maintaining a hierarchy of triggers based on the workflow, that an execution order of the trigger satisfies an execution order condition; and
wherein determining that the value of the first field satisfies the trigger condition of the trigger comprises determining that the value of the first field satisfies the trigger condition of the trigger responsive to determining that the execution order of the trigger satisfies the execution order condition.

3. The method of claim 1 further comprising:
identifying, by the one or more processors, using the mapping between fields and triggers generated based on the workflow, a second trigger defined in the workflow that uses the first field of the one or more fields;
determining, by the one or more processors, using the graph, that an execution order of the second trigger does not satisfy a second execution order condition; and
responsive to determining that the execution order of the second trigger does not satisfy the second execution order condition, restricting, by the one or more processors, determining that the value of the first field satisfies the second trigger condition of the second trigger.

4. The method of claim 1, wherein the event is a first event and the field is a first field, the method further comprising:
receiving, by one or more processors, from the data source, a second event in the queue subsequent to the first event;
determining, by one or more processors, that the second event relates to a second field which is matched to the first field in the workflow using a field-to-field data structure maintaining a relationship between the first field and the second field; and
updating, by one or more processors, the data object to include a second value for the second field, wherein the trigger condition of the trigger is satisfied based on the first value and the second value.

5. The method of claim 1, further comprising:
determining, by the one or more processors, that a second monitored item condition defined in a second workflow is satisfied based on the data corresponding to the event;
generating, by the one or more processors, a second data object responsive to the second monitored item condition being satisfied, the second data object including one or more second fields defined in the second workflow and one or more corresponding values that are obtained from the data corresponding to the event;
identifying, by the one or more processors, using a second mapping between fields and triggers generated based on the second workflow, a second trigger defined in the second workflow that uses a second field of the one or more second fields;
determining, by the one or more processors, that the value of the second field satisfies the second trigger condition of the second trigger; and
performing, by the one or more processors, responsive to determining that the value of the second field satisfies the second trigger condition, a second action corresponding to the second trigger defined in the second workflow.

6. The method of claim 1, further comprising:
determining, by the one or more processors, that a time condition is satisfied;
identifying, by the one or more processors, one or more triggers included in the workflow that satisfy the time condition; and
determining, by the one or more processors, that the one or more triggers satisfy a corresponding trigger condition based on values included in the data object; and
performing, by the one or more processors, actions corresponding to the one or more triggers satisfying the corresponding trigger conditions.

7. The method of claim 1, wherein identifying the update to the first item comprises:
reading, by the one or more processors, an event published to a queue from the first data source;
retrieving, by the one or more processors, a copy of data from the first data source corresponding to the event; and
identifying, by the one or more processors, the update to the first item based on a comparison of the copy of the data from the data source to a local copy of the data.

8. The method of claim 7, wherein identifying the update to the first item is based on a comparison of a computed hash for the copy of the data from the data source to a computed hash of the local copy.

9. The method of claim 1, further comprising:
querying, by the one or more processors, the data source for updates at one or more predetermined intervals to collect data from the data source.

10. The method of claim 1, wherein the workflow is a second version of the workflow, the method further comprising maintaining, by the one or more processors, a first version of the workflow, including a first graph showing a first hierarchy of triggers based on the first version of the workflow.

11. A system comprising:
one or more processors configured by machine-readable instructions to:
receive, from a data source, an event in a queue indicating a change to the data source;
obtain, from the data source, data corresponding to the event;
determine that a monitored item condition defined in a workflow is satisfied based on the data corresponding to the event;
generate a data object responsive to the monitored item condition being satisfied, the data object including one or more fields defined in the workflow and one or more corresponding values that are obtained from the data corresponding to the event;
identify, using a mapping between fields and triggers generated based on the workflow, a trigger defined in the workflow that uses a first field of the one or more fields;
determine that the value of the first field satisfies a trigger condition of the trigger; and
perform, responsive to determining that the value satisfies the trigger condition, an action corresponding to the trigger defined in the workflow.

12. The system of claim 11 further comprising:
determine, using a graph maintaining a hierarchy of triggers based on the workflow, that an execution order of the trigger satisfies an execution order condition; and
wherein the one or more processors are configured to determine that the value of the first field satisfies the trigger condition of the trigger by determining that the value of the first field satisfies the trigger condition of the trigger responsive to determining that the execution order of the trigger satisfies the execution order condition.

13. The system of claim 11 further comprising:
identify, using the mapping between fields and triggers generated based on the workflow, a second trigger defined in the workflow that uses the first field of the one or more fields;
determine, using the graph, that an execution order of the second trigger does not satisfy a second execution order condition; and responsive to determining that the execution order of the second trigger does not satisfy the second execution order condition, restrict determining that the value of the first field satisfies the second trigger condition of the second trigger.

14. The system of claim 11, wherein the event is a first event and the field is a first field, the method further comprising:
receiving, by one or more processors, from the data source, a second event in the queue subsequent to the first event;
determining, by one or more processors, that the second event relates to a second field which is matched to the first field in the workflow using a field-to-field data structure maintaining a relationship between the first field and the second field; and
updating, by one or more processors, the data object to include a second value for the second field, wherein the trigger condition of the trigger is satisfied based on the first value and the second value.

15. The system of claim 11, further comprising:
determining, by the one or more processors, that a second monitored item condition defined in a second workflow is satisfied based on the data corresponding to the event;
generating, by the one or more processors, a second data object responsive to the second monitored item condition being satisfied, the second data object including one or more second fields defined in the second workflow and one or more corresponding values that are obtained from the data corresponding to the event;
identifying, by the one or more processors, using a second mapping between fields and triggers generated based on the second workflow, a second trigger defined in the second workflow that uses a second field of the one or more second fields;
determining, by the one or more processors, that the value of the second field satisfies the second trigger condition of the second trigger; and
performing, by the one or more processors, responsive to determining that the value of the second field satisfies the second trigger condition, a second action corresponding to the second trigger defined in the second workflow.

16. The system of claim 11, further comprising:
determining, by the one or more processors, that a time condition is satisfied;
identifying, by the one or more processors, one or more triggers included in the workflow that satisfy the time condition;
determining, by the one or more processors, that the one or more triggers satisfy a corresponding trigger condition based on values included in the data object; and
performing, by the one or more processors, actions corresponding to the one or more triggers satisfying the corresponding trigger conditions.

17. The system of claim 11, wherein identifying the update to the first item comprises:
reading, by the one or more processors, an event published to a queue from the first data source;
retrieving, by the one or more processors, a copy of data from the first data source corresponding to the event; and
identifying, by the one or more processors, the update to the first item based on a comparison of the copy of the data from the data source to a local copy of the data.

18. The system of claim 11, wherein the one or more processors are configured to identify the update to the first item based on a comparison of a computed hash for the copy of the data from the data source to a computed hash of the local copy.

19. The system of claim 11, wherein the one or more processors are further configured to query the data source for updates at one or more predetermined intervals to collect data from the data source.

20. The system of claim 11, wherein the workflow is a second version of the workflow, and wherein the one or more processors are further configured to maintain a first version of the workflow, including a first graph showing a first hierarchy of triggers based on the first version of the workflow.

* * * * *